United States Patent
Li et al.

(10) Patent No.: US 10,893,543 B2
(45) Date of Patent: Jan. 12, 2021

(54) METHOD AND APPARATUS FOR RANDOM ACCESS DESIGN OF NR UNLICENSED

(71) Applicant: Samsung Electronics Co., Ltd., Suwon-si (KR)

(72) Inventors: Yingzhe Li, Sunnyvale, CA (US); Hongbo Si, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/171,309

(22) Filed: Oct. 25, 2018

(65) Prior Publication Data

US 2019/0132882 A1 May 2, 2019

Related U.S. Application Data

(60) Provisional application No. 62/740,110, filed on Oct. 2, 2018, provisional application No. 62/733,256, filed
(Continued)

(51) Int. Cl.
*H04W 4/00* (2018.01)
*H04W 74/08* (2009.01)
(Continued)

(52) U.S. Cl.
CPC ..... *H04W 74/0833* (2013.01); *H04L 27/2605* (2013.01); *H04L 27/2607* (2013.01);
(Continued)

(58) Field of Classification Search
CPC .............. H04W 72/042; H04W 76/27; H04W 72/0453; H04L 5/0053; H04L 5/0055; H04L 5/0007
See application file for complete search history.

(56) References Cited

U.S. PATENT DOCUMENTS

2006/0153282 A1* 7/2006 Jung ................... H04L 27/2613
375/146
2010/0067452 A1* 3/2010 Fischer ................ H04L 5/0058
370/329
(Continued)

FOREIGN PATENT DOCUMENTS

WO 2017/047973 A1 3/2017

OTHER PUBLICATIONS

"LTE; Evolved Universal Terrestrial Radio Access (E-UTRA); Physical channels and modulation (3GPP TS 36.211 version 14.2.0 Release 14)", ETSI TS 136 211 V14.2.0 Apr. 2017, 196 pages.
(Continued)

*Primary Examiner* — Atique Ahmed

(57) ABSTRACT

A user equipment includes a processor configured to generate a random access (RA) message comprising a preamble portion including one or more repeated preambles constructed using a same sequence, and a CP that precedes repeated preamble sequences, and a data portion including one or more data segments with each data segment including a number of repeated data symbols and a CP that precedes the repeated data symbols, wherein a UE-ID is included in the data portion, and perform an LBT operation for the RA message in an unlicensed spectrum. A transceiver is configured to transmit, when a result of the LBT operation for the RA message allows, the RA message to a base station (BS). BS includes a transceiver configured to receive an RA message in an unlicensed spectrum from a UE, and to transmit a responded RA message in response to the RA message within a RAR window.

19 Claims, 38 Drawing Sheets

Related U.S. Application Data on Sep. 19, 2018, provisional application No. 62/578,826, filed on Oct. 30, 2017.

(51) Int. Cl.
   *H04W 72/04* (2009.01)
   *H04L 27/26* (2006.01)
(52) U.S. Cl.
   CPC ....... *H04L 27/2613* (2013.01); *H04W 72/042* (2013.01); *H04W 74/0816* (2013.01)

(56) References Cited

U.S. PATENT DOCUMENTS

| | | | | |
|---|---|---|---|---|
| 2015/0057011 | A1* | 2/2015 | Di Girolamo | H04W 74/0808 455/454 |
| 2016/0338118 | A1* | 11/2016 | Vajapeyam | H04L 69/323 |
| 2017/0231011 | A1* | 8/2017 | Park | H04W 72/0446 |
| 2017/0238272 | A1* | 8/2017 | You | H04L 5/0082 370/350 |
| 2017/0332409 | A1* | 11/2017 | Yerramalli | H04L 5/00 |
| 2017/0332410 | A1* | 11/2017 | Babaei | H04B 17/318 |
| 2018/0027589 | A1* | 1/2018 | Yang | H04L 25/00 370/329 |
| 2018/0124626 | A1* | 5/2018 | Tsai | H04W 24/10 |
| 2018/0255578 | A1 | 9/2018 | Kim et al. | |
| 2018/0279375 | A1* | 9/2018 | Jeon | H04W 72/14 |

OTHER PUBLICATIONS

"LTE; Evolved Universal Terrestrial Radio Access (E-UTRA); Multiplexing and channel coding (3GPP TS 36.212 version 14.2.0 Release 14)", ETSI TS 136 212 V14.2.0, Apr. 2017, 206 pages.
"LTE; Evolved Universal Terrestrial Radio Access (E-UTRA); Physical layer procedures (3GPP TS 36.213 version 14.2.0 Release 14)", ETSI TS 136 213 V14.2.0, Apr. 2017, 456 pages.
"LTE; Evolved Universal Terrestrial Radio Access (E-UTRA); Medium Access Control (MAC) protocol specification (3GPP TS 36.321 version 14.2.1 Release 14)", ETSI TS 136 321 V14.2.1, May 2017, 108 pages.
"LTE; Evolved Universal Terrestrial Radio Access (E-UTRA); Radio Resource Control (RRC); Protocol specification (3GPP TS 36.331 version 14.2.2 Release 14)", ETSI TS 136 331 V14.2.2, May 2017, 727 pages.
3rd Generation Partnership Project; Technical Report; Technical Specification Group Services and System Aspects; Feasibility Study on New Services and Markets Technology Enablers; (Release 14), 3GPP TR 22.891 V14.2.0, Sep. 2016, 95 pages.
"5G; NR; Physical channels and modulation (3GPP TS 38.211 version 15.2.0 Release 15)", ETSI TS 138 211 V15.2.0, Jul. 2018, 98 pages.
"5G; NR; Physical layer procedures for control (3GPP TS 38.213 version 15.2.0 Release 15)", ETSI TS 138 213 V15.2.0, Jul. 2018, 101 pages.
Nokia et al., "NR Physical Random Access Channel", 3GPP TSG-RAN WG1#88, Feb. 13-17, 2017, 17 pages, R1-1702285.
ZTE Corporation et al., "Random access preamble structure and signaling", 3GPP TSG RAN WG1 Meeting #87, Nov. 14-18, 2016, 6 pages, R1-1611271.
Nokia et al. "Random access principles for new radio", 3GPP TSG-RAN WG1 #87, Nov. 14-18, 2016, 4 pages, R1-1612299.
Huawei et al., "Multiple/repeated PRACH preamble formats for NR", 3GPP TSG RAN WG1 Meeting #88bis, Apr. 3-7, 2017, 9 pages, R1-1705056.
International Search Report dated Jan. 29, 2019 in connection with International Patent Application No. PCT/KR2018/013035, 3 pages.
Extended European Search Report regarding Application No. 18872026.2, dated Jul. 7, 2020, 7 pages.
Ericsson, "NB-loT—Design Considerations for Single Tone Frequency Hopped NB-PRACH", 3GPP TSG-RAN1 NB-IOT Ad Hoc, R1-160093, Jan. 2016, 7 pages.

\* cited by examiner

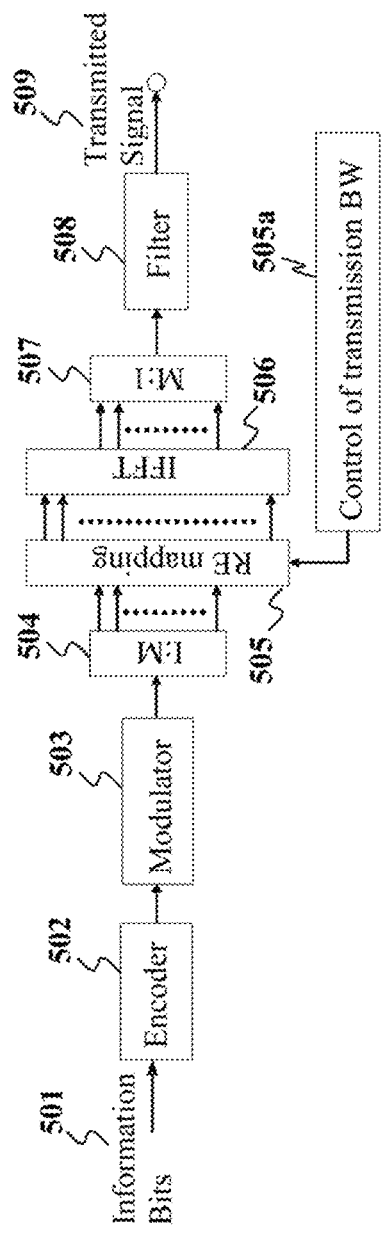
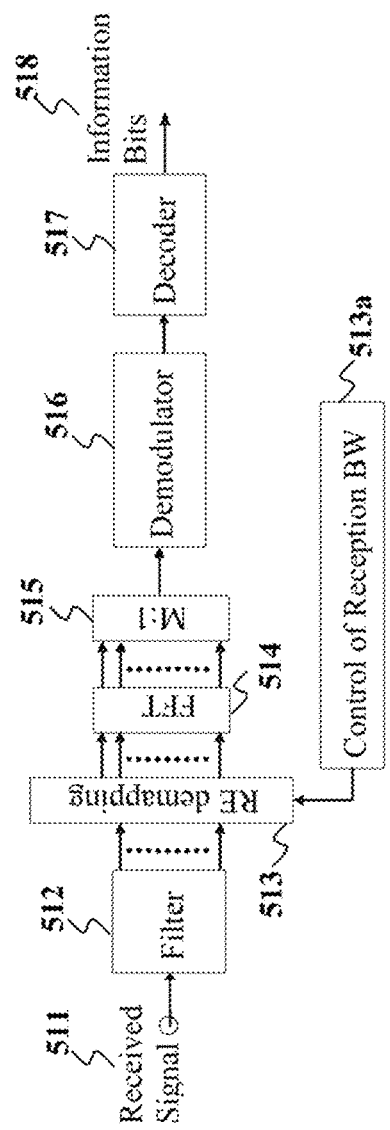
FIG. 5A
FIG. 5B

Data = Data 1 + Data 2 + ... + Data n

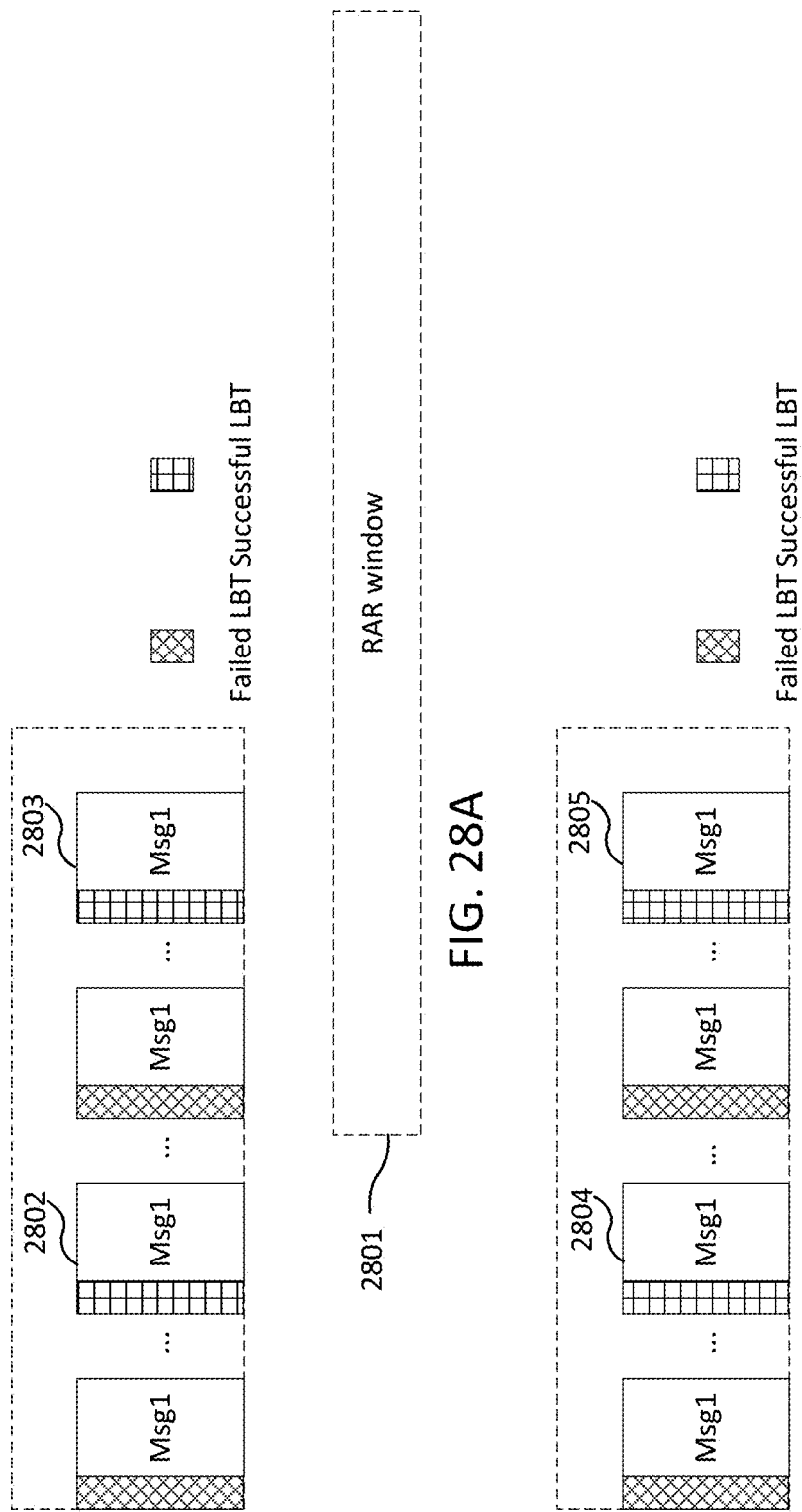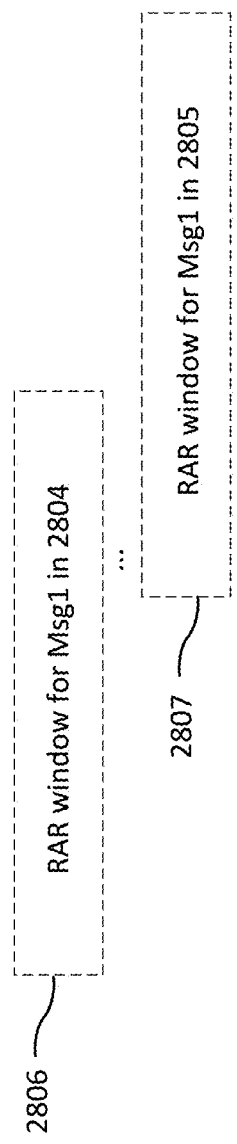
FIG. 28A
FIG. 28B

METHOD AND APPARATUS FOR RANDOM ACCESS DESIGN OF NR UNLICENSED

CROSS-REFERENCE TO RELATED APPLICATION AND CLAIM OF PRIORITY

This application claims priority under 35 U.S.C. § 119(e) to U.S. Provisional Patent Application No. 62/578,826 filed Oct. 30, 2017 entitled METHOD AND APPARATUS FOR RANDOM ACCESS DESIGN OF NR UNLICENSED, U.S. Provisional Patent Application No. 62/733,256 filed Sep. 19, 2018 entitled METHOD AND APPARATUS FOR RANDOM ACCESS DESIGN OF NR UNLICENSED, and U.S. Provisional Patent Application No. 62/740,110 filed Oct. 2, 2018 entitled METHOD AND APPARATUS FOR RANDOM ACCESS DESIGN OF NR UNLICENSED. The above-identified provisional patent applications are hereby incorporated by reference in their entirety.

TECHNICAL FIELD

This disclosure relates generally to wireless communication systems. More specifically, the present disclosure relates to methods and apparatus for a random access procedure for new radio (NR) in unlicensed spectrum.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

New radio access technology (RAT) may be deployed on an unlicensed frequency spectrum, which is also known as licensed assisted access (LAA). One of possible deployment scenarios for the LAA is to deploy LAA carriers as a part of carrier aggregations, where an LAA carrier is aggregated with another carrier on a licensed frequency spectrum. In a conventional scheme, a carrier on a licensed frequency spectrum is assigned as a primary cell (PCell) and a carrier on an unlicensed frequency spectrum is assigned as a secondary cell (SCell) for a UE. Since there may be other RATs operating on the same unlicensed frequency spectrum as the LAA carrier, there is a need to enable co-existence of other RAT with LAA on an unlicensed frequency spectrum without undesirable interference between heterogeneous RATs.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide transmission structures and format in advanced communication systems.

The present disclosure provides methods and apparatus for a random access procedure for new radio (NR) in unlicensed spectrum. In particular, the present disclosure provides 2-step random access procedures and 4-step random access procedures for NR in unlicensed spectrum.

In a first aspect, a user equipment (UE) in a wireless communication network includes a processor configured to generate a random access (RA) message comprising a preamble portion including one or more repeated preambles constructed using a same sequence, and a cyclic prefix (CP) that precedes repeated preamble sequences, and a data portion including one or more data segments with each data segment including a number of repeated data symbols and a CP that precedes the repeated data symbols, wherein a UE identity (UE-ID) is included in the data portion, and perform a listen-before-talk (LBT) operation for the RA message in an unlicensed spectrum, and a transceiver operably connected to the processor, the transceiver configured to transmit, when a result of the LBT operation for the RA message allows, the RA message in the unlicensed spectrum to a base station (BS).

In one embodiment, the preamble portion of the RA message includes one of 1, 2, 4, 6 and 12 repeated preamble sequences, each data segment in the data portion of the RA message includes one of 1, 2, 4, 6 and 12 repeated data symbols, a set of OFDM symbols are reserved prior to a configured starting time of the RA message in the unlicensed spectrum, and the set of OFDM symbols is one of a predefined set of OFDM symbols when the LBT operation is performed with a fixed sensing duration, a predefined set of OFDM symbols when the LBT operation is performed with a configurable sensing duration and a contention window size is one of adaptable and non-adaptable, and a configurable set of OFDM symbols when the LBT operation is performed with a configurable sensing duration and the contention window size is one of adaptable and non-adaptable.

In another embodiment, the preamble portion of the RA message and the data portion of the RA message are multiplexed in one of a frequency domain with sharing a same time domain resource allocation, a time domain with no gap between the preamble portion and the data portion, with sharing a same frequency domain resource allocation, or a combination of the time domain and the frequency domain, wherein the preamble portion and the data portion do not share the same time domain resource and the frequency domain resource.

Also, the transceiver is further configured with a RA message occasion burst that includes one or more RA message occasions in the time domain, and only a first RA message of the one or more RA message occasions within the RA message occasion burst is transmitted if the LBT operation is successful, or each of the one or more of RA messages within the RA message occasion burst is transmitted if a respective LBT operation is successful, and the LBT operation is successful if a result of the LBT operation associated with a RA message allows the RA message to be transmitted.

In addition, the processor is further configured to perform the LBT operation on an entire bandwidth to be searched, when the LBT operation on the entire bandwidth is failed, segment the entire bandwidth into multiple sub-bandwidths and perform LBT operations on each of the multiple sub-bandwidths, and when none of the LBT operations on each of the multiple sub-bandwidths is successful, repeat segmenting each of the sub-bandwidths into multiple next-level sub-bandwidths and re-performing the LBT operations on each of the multiple next-level sub-bandwidths, until at least one of the LBT operations on at least one sub-bandwidth is successful.

Further, the processor is further configured to cause the transceiver to receive a responded random access (Re-RA) message in response to the transmitted RA message within a random access response (RAR) window, wherein a first portion of the RAR message is carried by a physical downlink control channel (PDCCH) with a cyclic redundancy check (CRC) scrambled with a radio network temporary identified (RNTI) of the UE, and a second portion of the Re-RA message is carried by a physical downlink shared channel (PDSCH) scheduled by the PDCCH.

Furthermore, the processor is further configured to determine that a random access procedure is successful if the Re-RA message in response to the transmitted RA message is received within a RAR window, and the Re-RA message includes an indication for a physical random access channel (PRACH) preamble sequence included in the preamble portion of the RA message, an identity for the UE that is the same as a UE-identifier (ID) included in the data portion of the RA message, and an indication for the radio resource that was included one of the preamble portion of the RA message, and both of the preamble and the data portion of the RA message.

Additionally, the RNTI of the UE is determined based on at least one of a radio resource used to transmit the preamble of the RA message, a radio resource used to transmit the data portion of the RA message, a PRACH preamble sequence included in the preamble portion of the RA message; and at least a part of a UE-identification (ID) carried in the data portion of the RA message.

In addition, the processor is further configured to cause the transceiver to monitor a single RAR window after a first RA message is transmitted within a RA message occasion window or individual RAR windows corresponding to each of one or more RA messages transmitted within the RA message occasion window.

Further, the processor is configured to suspend decoding operations if an RAR message is detected, or continue to perform the decoding operations until an RAR message is detected that corresponds to a successful random access procedure, or includes an indication for a radio resource and a PRACH preamble sequence that were included in a preamble portion of a first RA message within an RA message occasion burst, wherein the decoding operations for the RAR message are suspended if all of RAR windows for the decoding operations for an RAR message are complete.

In another embodiment, if the Re-RA message includes the indication for the radio resource and the PRACH preamble sequence that were included in the preamble portion of the RA message and the random access procedure is determined not to be successful, the processor is further configured to transmit in a third message including the identity of the UE included the data portion of the RA message if an LBT operation associated with the third message allows the third message to be transmitted, and perform decoding operations for a fourth message including the identity of the UE that is included in the third message, and the random access procedure is successful if an identity of the UE included in the fourth message is same as the identity of the UE included in the third message.

In a second aspect, a base station (BS) includes a transceiver configured to receive a random access (RA) message in an unlicensed spectrum from a user equipment (UE), the RA message comprising a preamble portion including one or more repeated preambles constructed using a same sequence, and a data portion including one or more data segments with each data segment including a number of repeated data symbols, wherein a UE identity (UE-ID) is included in the data portion, and a processor operably connected to the transceiver, the processor configured to control the transceiver to transmit a random access response (RAR) message in response to the RA message within a random access response (RAR) window, wherein transmission of the Re-RA message in the unlicensed spectrum is subject to a result of a listen-before-talk (LBT) operation in the unlicensed spectrum.

In a third aspect, a method for operating a user equipment (UE) in a wireless communication network includes generating a random access (RA) message comprising a preamble portion including one or more repeated preambles constructed using a same sequence, and a data portion including one or more data segments with each data segment including a number of repeated data symbols, wherein a UE identity (UE-ID) is included in the data portion, and performing a listen-before-talk (LBT) operation for the RA message in an unlicensed spectrum; and when a result of the LBT operation for the RA message allows, transmitting the RA message in the unlicensed spectrum to a base station (BS).

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 5A illustrates an exemplary transmitter block diagram for a PDSCH in a subframe according to one embodiment of the present disclosure.

FIG. 5B illustrates a receiver block diagram for a PDSCH in a subframe according to one embodiment of the present disclosure.

FIGS. 28A and 28B illustrate exemplary timing relations between Msg1 transmission and RAR window according to embodiments of the present disclosure.

DETAILED DESCRIPTION

FIGS. 1 through 37, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v14.2.0, "E-UTRA, Physical channels and modulation" (REF1); 3GPP TS 36.212 v14.2.0, "E-UTRA, Multiplexing and Channel coding" (REF2); 3GPP TS 36.213 v14.2.1, "E-UTRA, Physical Layer Procedures" (REF3); 3GPP TS36.321 v14.2.0, "E-UTRA, Medium Access Control (MAC) protocol specification" (REF4); 3GPP TS 36.331 v14.2.0, "E-UTRA, Radio Resource Control (RRC) Protocol Specification" (REF5); 3GPP TR 22.891 v14.2.0, "Feasibility Study on New Services and Markets Technology Enablers.", September 2016 (REF6); 3GPP TS 38.211, V15.2.0, "NR; Physical channels and modulation", June 2018 (REF7); and 3GPP TS 38.213, V15.2.0, "NR; Physical layer procedures for control", June 2018 (REF8).

In next generation cellular systems, various use cases are envisioned beyond the capabilities of LTE. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described. Those use cases can be roughly categorized into three different groups. A first group is termed 'enhanced mobile broadband' (eMBB), targeted to high data rate services with less stringent latency and reliability requirements. A second group is termed 'ultra-reliable and low latency' (URLL) targeted for applications with less stringent data rate requirements, but less tolerant to latency. A third group is termed 'massive MTC' (mMTC) targeted for large number of low-power device connections such as 1 milion per $km^2$ with less stringent the reliability, data rate, and latency requirements.

In order for the 5G network to support such diverse services with different quality of services (QoS), called network slicing. To utilize PHY resources efficiently and multiplex various slices (with different resource allocation schemes, numerologies, and scheduling strategies) in DL-SCH, a flexible and self-contained frame or subframe design is utilized.

Figure 1:
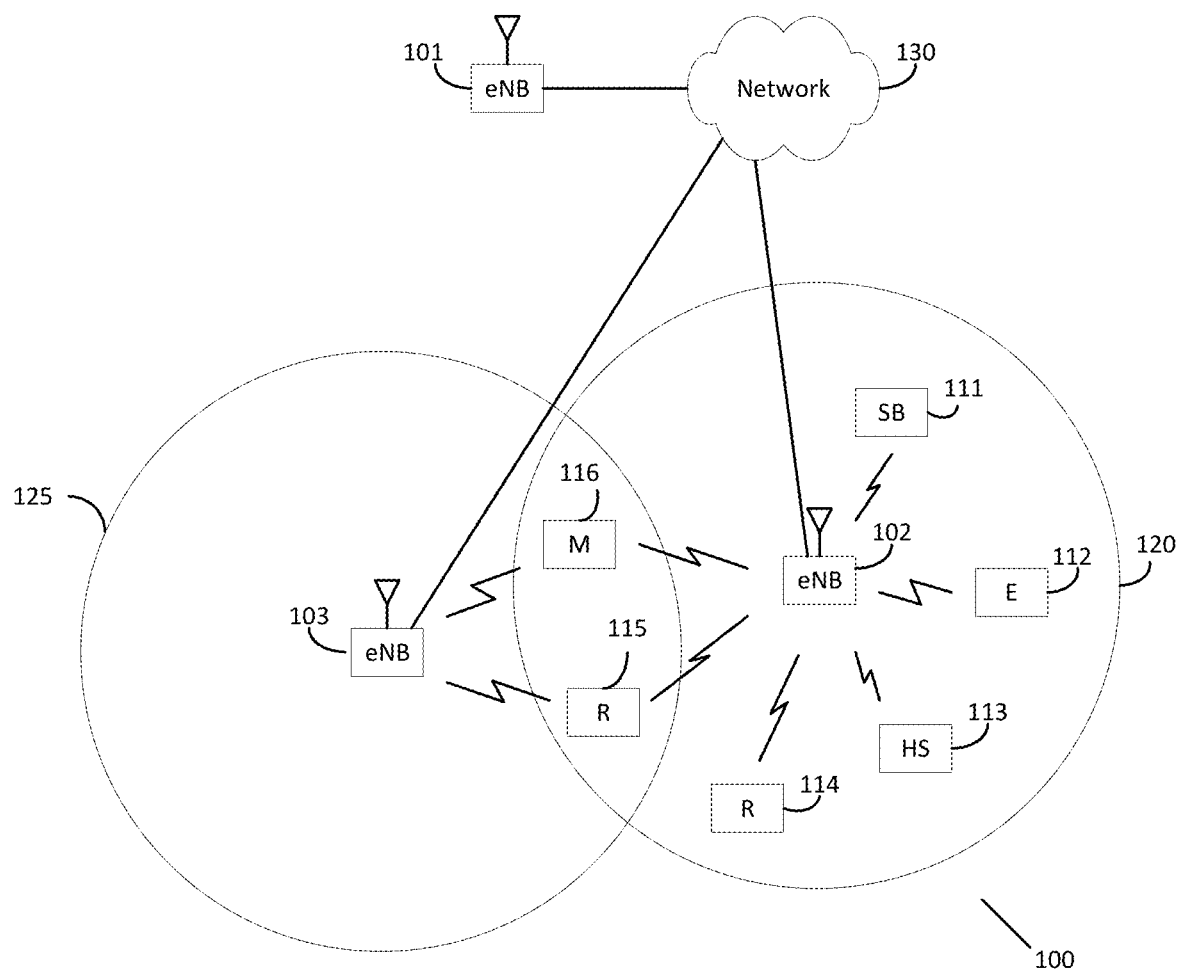
FIG. 1 illustrates an example wireless network according to embodiments of the present disclosure.
Figure 2:
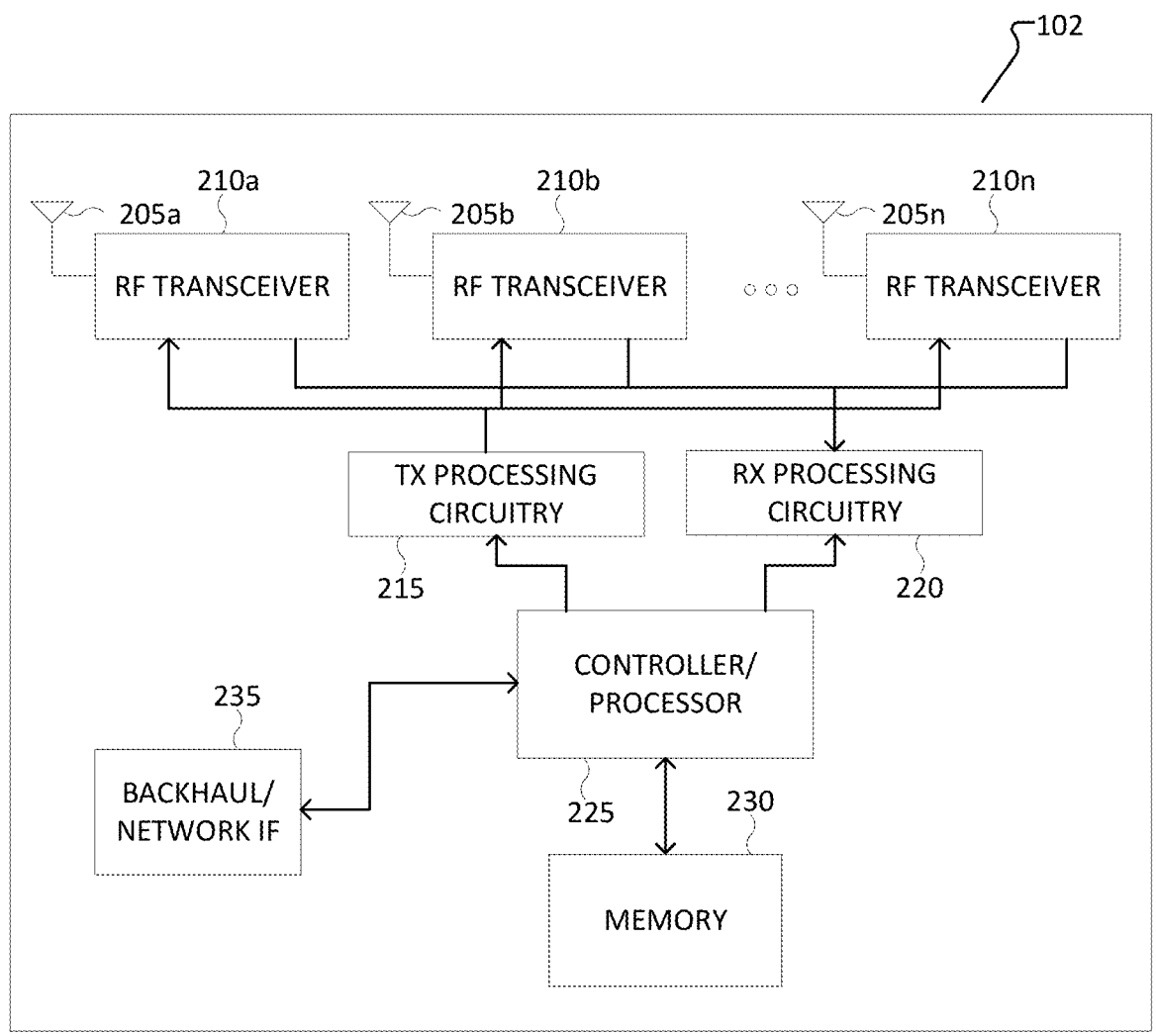
FIG. 2 illustrates an example eNodeB (eNB) according to embodiments of the present disclosure.
Figure 3:
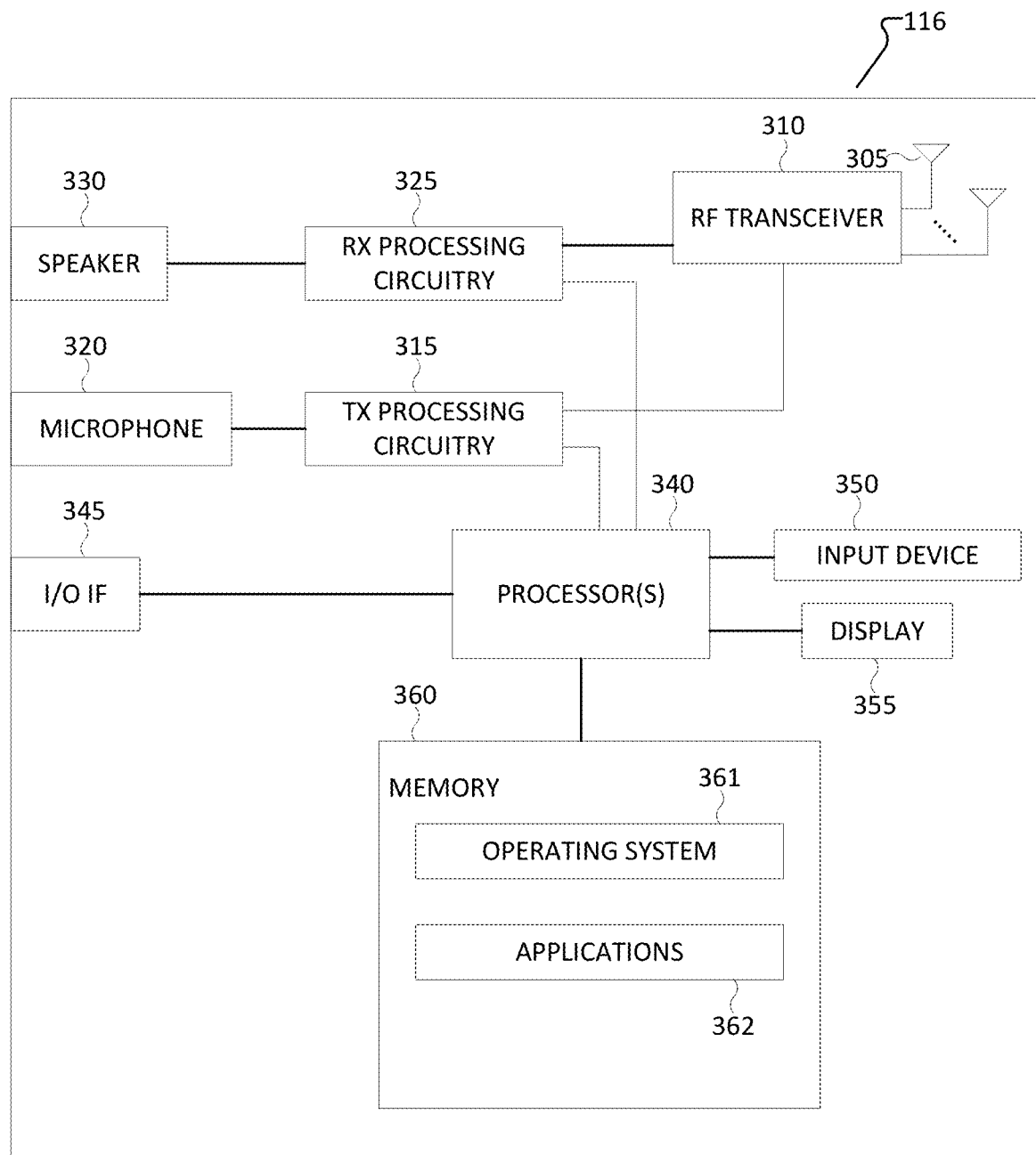
FIG. 3 illustrates an example user equipment (UE) according to embodiments of the present disclosure.

FIGS. 1-4B below describe various embodiments implemented in wireless communication systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless personal digital assistance (PDA), or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U(LAA) or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for processing of a received multiplexed UL grant with DL data from an eNodeB (eNB) 101-103 for UL transmission on a licensed assisted access (LAA).

In some embodiments, the UEs 111-116 receive, from the eNBs 101-103, an indication of a partial subframe configuration over an unlicensed spectrum in a licensed assisted access (LAA) cell. In addition, the UEs 111-116 receives multiplexed UL grant with DL data from an eNodeB (eNB) for UL transmission on a licensed assisted access (LAA), identify a UL grant message included in the UL grant and DL data and perform UL resource down-selection operation in resource blocks (RBs) included in at least one UL channel, wherein the transceiver is further configured to transmit UL data, to the eNB, based on the RBs that have been down-selected and information of the UL grant message.

In some embodiment, the UEs 111-116 determine feedback information and transmit, to the eNB, the feedback information based on the RBs that have been down-selected and the information of the UL grant message, wherein the feedback information comprises at least one of a number of repeated scheduling request (SR), or physical uplink shared channel (PUSCH) and discontinuous transmission (DTX) information.

In some embodiments, the UEs 111-116 determine a plurality of CW sizes each of which includes different values based on a level of quality of service (QoS) corresponding to the UL data and transmit, to the eNB, the UL data based on each of the plurality of CW sizes corresponding to the level of QoS.

In some embodiments, the UEs 111-116 receive, from the eNB, a plurality of DL channels that is prioritized and ordered based on a carrier scheduling operation, wherein the UL resource down-selection operation comprises at least one sub RB group in a frequency domain.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple radio frequency (RF) transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

In some embodiments, the RF transceivers 210a-210n are configured to transmit the multiplexed UL grant with the DL data transmission to the UE.

In some embodiments, the RF transceiver 210a-210n are configured to receive feedback information from the UE, wherein the feedback information comprises at least one of a number of repeated scheduling request (SR), or physical uplink shared channel (PUSCH) and discontinuous transmission (DTX) information.

In some embodiments, the RF transceiver 210a-210n are configured to transmit at least one downlink signal associated with the prioritized and ordered plurality of LBT operations. In some embodiments, the RF transceiver 210a-210n are configured to receive at least uplink signal associated with the prioritized and ordered plurality of LBT operations.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 includes at least one microprocessor or microcontroller. In some embodiments, the controller/processor 225 is configured to trigger an LBT request to transmit, to a user equipment (UE), at least one of an uplink (UL) grant or downlink (DL) data over a licensed assisted access (LAA), determine an adaptive contention window (CW) size comprising a predetermined minimum value and maximum value for transmitting the DL data, perform an DL data LBT operation in accordance with the adaptive CW size, multiplex the UL grant with the DL data based on the DL data LBT operation.

In some embodiments, the controller/processor 225 is configured to perform a UL grant LBT operation, which is more aggressive (e.g., higher priority) than DL data LBT on the same carrier, to transmit a UL grant message to the UE an suspend a transmission of the DL data to the UE when the eNB transmits the UL grant message to the UE, wherein the method of claim 15, wherein the UL grant LBT operation comprises at least one of a random backoff time, a fixed contention window size, or a variable contention window size.

In some embodiments, the controller/processor 225 is configured to determine an random backoff value with an adjustable contention window size for a UL grant LBT operation based on the feedback information, wherein the feedback information comprises at least one of a number of repeated scheduling request (SR), or physical uplink shared channel (PUSCH) and discontinuous transmission (DTX) information.

In some embodiments, the controller/processor 225 is configured to prioritize and order a plurality of LBT operations based on a transmission direction and carrier scheduling operation.

In some embodiments, the controller/processor 225 is configured to determine a plurality of groups of UEs in the LAA based on at least one of a level of QoS being served or channel conditions between at least one of the UE or a group of UEs and the eNB and allocate a different CW size to each group of UEs for at least one of the DL data LBT operation or a UL grant LBT operation.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, LTE-A, or LTE-U(LAA)), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal.

In some embodiment, the RF transceiver 310 is configured to receive multiplexed UL grant with DL data from an eNodeB (eNB) for UL transmission on a licensed assisted access (LAA).

In some embodiment, the RF transceiver 310 is configured to transmit, to the eNB, the feedback information based on the RBs that have been down-selected and the information of the UL grant message, wherein the feedback information comprises at least one of a number of repeated scheduling request (SR), or physical uplink shared channel (PUSCH) and discontinuous transmission (DTX) information.

In some embodiment, the RF transceiver 310 is configured to transmit, to the eNB, the UL data based on each of the plurality of CW sizes corresponding to the level of QoS or channel conditions between at least one of the UE or a group of UEs, wherein the transceiver is further configured to receive, from the eNB, a plurality of LBT operations that is prioritized and ordered based on a transmission direction and carrier scheduling operation.

In some embodiments, the RF transceiver 310 is configured to transmit at least one uplink signal associated with the prioritized and ordered plurality of LBT operations. In some embodiments, the RF transceiver 310 is configured to receive at least one downlink signal associated with the prioritized and ordered plurality of LBT operations.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360.

In some embodiments, the processor 340 is configured to identify a UL grant message included in the UL grant and DL data and perform UL resource down-selection operation in resource blocks (RBs) included in at least one UL channel, wherein the transceiver is further configured to transmit UL data, to the eNB, based on the RBs that have been down-selected and information of the UL grant message, and wherein the UL resource down-selection operation comprises at least one sub RB group in a frequency domain.

In some embodiments, the processor 340 is configured to determine feedback information, wherein the feedback information comprises at least one of a number of repeated scheduling request (SR), or physical uplink shared channel (PUSCH) and discontinuous transmission (DTX) information.

In some embodiments, the processor 340 is configured to determine a plurality of CW sizes each of which includes different values based on a level of quality of service (QoS) corresponding to the UL data or channel conditions between at least one of the UE or a group of UEs.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the UE 116 may include only one antenna 305 or any number of antennas 305. Also, while FIG. 3 illustrates the UE 116 configured as a mobile telephone or smartphone, UEs could be configured to operate as other types of mobile or stationary devices.

Figure 4A:
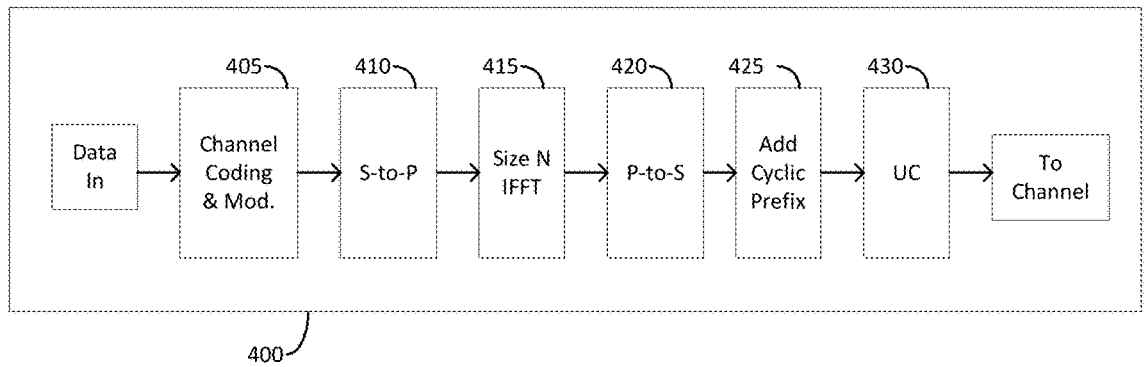
FIG. 4A illustrates a high-level diagram of an orthogonal frequency division multiple access transmit path according to embodiments of the present disclosure.
Figure 4B:
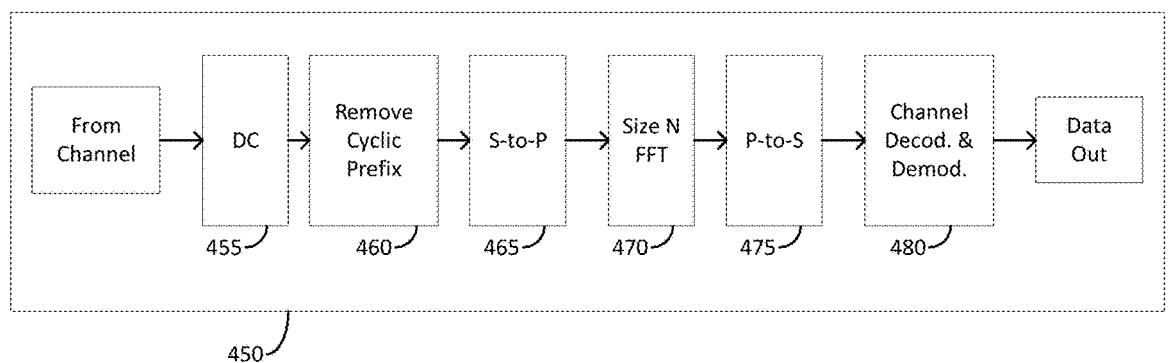
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an OFDMA communication. FIG. 4B is a high-level diagram of receive path circuitry 450. For example, the receive path circuitry 450 may be used for an OFDMA communication. In FIGS. 4A and 4B, for downlink communication, the transmit path circuitry 400 can be implemented in a base station (eNB) 102 or a relay station, and the receive path circuitry 450 may be implemented in a user equipment (such as user equipment 116 of FIG. 1). In other examples, for uplink communication, the receive path circuitry 450 can be implemented in a base station (such as 102 of FIG. 1) or a relay station, and the transmit path circuitry 400 can be implemented in a user equipment (such as user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B can be implemented in software, while other components can be implemented by configurable hardware or a mixture of software and configurable hardware. In particular, it is noted that the FFT blocks and the IFFT blocks described in this disclosure document can be implemented as configurable software algorithms, where the value of Size N can be modified according to the implementation.

In transmit path circuitry 400, channel coding and modulation block 405 receives a set of information bits, applies coding (such as low-density parity-check (LDPC) coding) and modulates (such as Quadrature Phase Shift Keying (QPSK) or Quadrature Amplitude Modulation (QAM)) the input bits to produce a sequence of frequency-domain modulation symbols. Serial-to-parallel block 410 converts (such as de-multiplexes) the serial modulated symbols to parallel data to produce N parallel symbol streams where N is the IFFT/FFT size used in base station (BS) 102 and UE 116. Size N IFFT block 415 then performs an IFFT operation on the N parallel symbol streams to produce time-domain output signals. Parallel-to-serial block 420 converts (such as multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (such as up-converts) the output of add cyclic prefix block 425 to RF frequency for transmission via a wireless channel. The signal can also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 can implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM). This disclosure of disclosure covers multiple embodiments which can be used in conjunction or in combination with one another, or can operate as standalone schemes.

A communication system includes a DownLink (DL) that conveys signals from transmission points such as Base Stations (BSs) or NodeBs to User Equipments (UEs) and an UpLink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL Control Information (DCI), and Reference Signals (RS) that are also known as pilot signals. An eNodeB transmits data information through a Physical DL Shared CHannel (PDSCH). An eNodeB transmits DCI through a Physical DL Control CHannel (PDCCH) or an Enhanced PDCCH (EPDCCH). An eNodeB transmits acknowledgement information in response to data Transport Block (TB) transmission from a UE in a Physical Hybrid ARQ Indicator CHannel (PHICH). An eNodeB transmits one or more of multiple types of RS including a UE-Common RS (CRS), a Channel State Information RS (CSI-RS), or a DeModulation RS (DMRS). A CRS is transmitted over a DL system BandWidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a Broadcast CHannel (BCH) when it conveys a Master Information Block (MIB) or to a DL Shared CHannel (DL-SCH) when it conveys a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with a special System Information RNTI (SI-RNTI). Alternatively, scheduling information for a SIB transmission can be provided in an earlier SIB and scheduling information for the first SIB (SIB-1) can be provided by the MIB.

UL signals can include data signals conveying data information, control signals conveying UL Control Information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective Physical UL Shared CHannel (PUSCH) or a Physical UL Control CHannel (PUCCH). If a UE needs to transmit data information and UCI in a same UL subframe, it may multiplex both in a PUSCH. UCI includes Hybrid Automatic Repeat reQuest ACKnowledgement (HARQ-ACK) information, indicating correct (ACK) or incorrect (NACK) detection for a data TB in a PDSCH or absence of a PDCCH detection (DTX), Scheduling Request (SR) indicating whether a UE has data in its buffer, Rank Indicator (RI), and Channel State Information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

FIG. 5A illustrates an exemplary transmitter block diagram for a PDSCH in a subframe according to one embodiment of the present disclosure. The embodiment of the PDSCH transmitter block diagram shown in FIG. 5A is for illustration only. Other embodiments could be used without departing from the scope of the present disclosure.

Information bits 501 are encoded by encoder 502, such as a turbo encoder, and modulated by modulator 503, for example using Quadrature Phase Shift Keying (QPSK) modulation. A Serial to Parallel (S/P) converter 504 generates M modulation symbols that are subsequently provided to a mapper 505 to be mapped to REs selected by a transmission BW selection unit 505a for an assigned PDSCH transmission BW, unit 506 applies an Inverse Fast Fourier Transform (IFFT), the output is then serialized by a Parallel to Serial (P/S) converter 507 to create a time domain signal, filtering is applied by filter 508, and a signal transmitted 509. Additional functionalities, such as data scrambling, cyclic prefix insertion, time windowing, interleaving, and others are well known in the art and are not shown for brevity.

FIG. 5B illustrates a receiver block diagram for a PDSCH in a subframe according to one embodiment of the present disclosure. The embodiment of the PDSCH receiver block diagram shown in FIG. 5B is for illustration only. Other embodiments could be used without departing from the scope of the present disclosure.

A received signal 511 is filtered by filter 512, REs 513 for an assigned reception BW are selected by BW selector 513a, FFT unit 514 applies a Fast Fourier Transform (FFT), and an output is serialized by a parallel-to-serial converter 515. Subsequently, a demodulator 516 coherently demodulates data symbols by applying a channel estimate obtained from a DMRS or a CRS (not shown), and a decoder 517, such as a turbo decoder, decodes the demodulated data to provide an estimate of the information data bits 518. Additional functionalities such as time-windowing, cyclic prefix removal, de-scrambling, channel estimation, and de-interleaving are not shown for brevity.

Figure 5C:
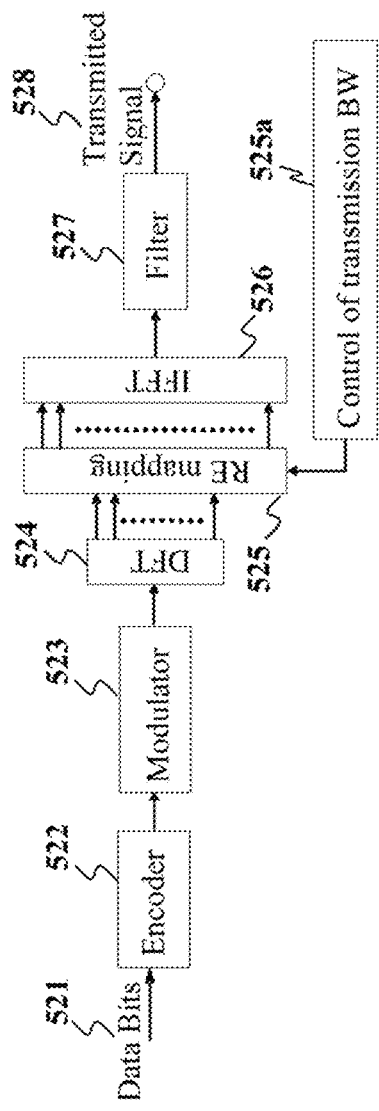
FIG. 5C illustrates an exemplary transmitter block diagram for a PUSCH in a subframe according to one embodiment of the present disclosure.

FIG. 5C illustrates an exemplary transmitter block diagram for a PUSCH in a subframe according to one embodiment of the present disclosure. The embodiment of the PUSCH transmitter block diagram shown in FIG. 5C is for illustration only. Other embodiments could be used without departing from the scope of the present disclosure.

Information data bits 521 are encoded by encoder 522, such as a turbo encoder, and modulated by modulator 523. A Discrete Fourier Transform (DFT) unit 524 applies a DFT on the modulated data bits, REs 525 corresponding to an assigned PUSCH transmission BW are selected by transmission BW selection unit 525a, unit 526 applies an IFFT and, after a cyclic prefix insertion (not shown), filtering is applied by filter 527 and a signal transmitted 528.

Figure 5D:
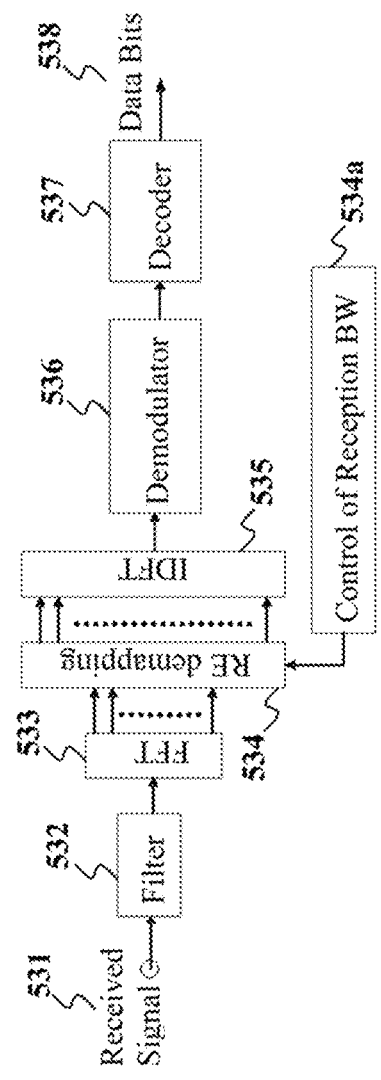
FIG. 5D illustrates an exemplary receiver block diagram for a PUSCH in a subframe according to one embodiment of the present disclosure.

FIG. 5D illustrates an exemplary receiver block diagram for a PUSCH in a subframe according to one embodiment of the present disclosure. The embodiment of the PUSCH receiver block diagram shown in FIG. 5D is for illustration only. Other embodiments could be used without departing from the scope of the present disclosure.

A received signal 531 is filtered by filter 532. Subsequently, after a cyclic prefix is removed (not shown), unit 533 applies a FFT, REs 534 corresponding to an assigned PUSCH reception BW are selected by a reception BW selector 534a, unit 535 applies an Inverse DFT (IDFT), a demodulator 536 coherently demodulates data symbols by applying a channel estimate obtained from a DMRS (not shown), a decoder 537, such as a turbo decoder, decodes the demodulated data to provide an estimate of the information data bits 538.

Figure 6A:
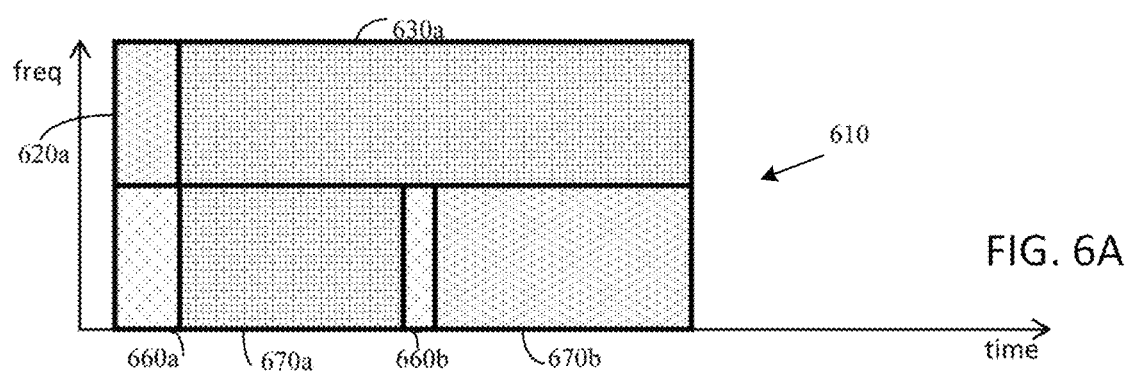
FIGS. 6A and 6B illustrate two exemplary instances of multiplexing two slices within a common subframe or frame.
Figure 6B:
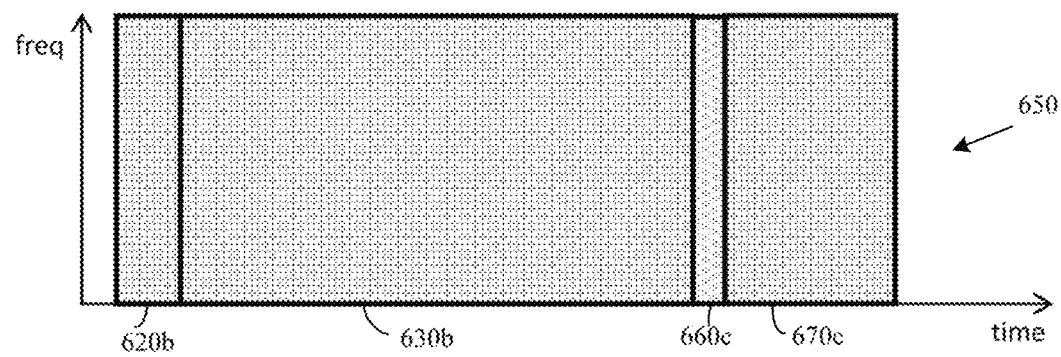

FIGS. 6A and 6B illustrate two exemplary instances 610, 650 of multiplexing two slices within a common subframe or frame according to one embodiment of the present disclosure. The embodiments shown in FIGS. 6A and 6B are for illustration only. Other embodiments could be used without departing from the scope of the present disclosure.

In the exemplary embodiments, a slice can be composed of one or two transmission instances where one transmission instance consists of a control (CTRL) component (620a, 660a, 660b, 620b, or 660c) and a data component (630a, 670a, 670b, 630b, or 670c). In embodiment 610, the two slices are multiplexed in frequency domain whereas in embodiment 650, they are multiplexed in time domain. These two slices can be transmitted with different sets of numerology.

In the present disclosure, numerology refers to a set of signal parameters which can include subframe duration, sub-carrier spacing, cyclic prefix length, transmission bandwidth, or any combination of these signal parameters.

After the UE detects a synchronization signal and decodes the broadcasted system information, the UE will initiate the random access process by transmitting a physical random access channel (PRACH) preamble in uplink, based on the PRACH configuration that would indicate at which resources that UE is allowed to transmit a PRACH preamble as well as the PRACH preamble type. In NR, an association exists between one or multiple occasions of the SS/PBCH blocks and a subset of RACH resources. UE can select the subset of RACH resources through its downlink measurement and this association.

Figure 7A:
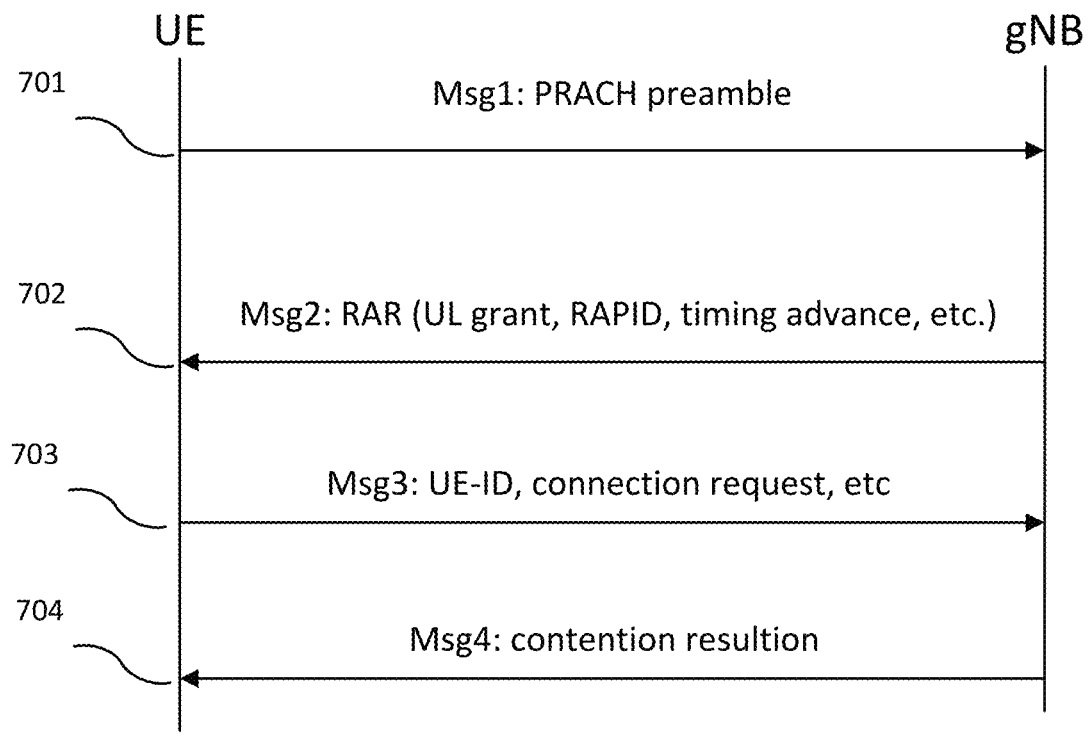
FIG. 7A illustrates an exemplary procedure for the 4-step random access (RA).

FIG. 7A illustrates an exemplary procedure for the 4-step random access (RA). Random access in NR is based on a 4-step procedure, where UE first transmits a physical random access channel (PRACH) preamble (Msg1) to gNB through its selected RACH resources at step 701. The gNB replies with the random access response (RAR) in Msg2 at step 702. Then, the UE transmits an Msg3 in the uplink at step 704, and gNB transmits the Msg4 in the downlink at step 705.

NR supports PRACH preambles with either long sequence length of L=839 symbols and subcarrier spacing (SCS) of 1.25 KHz or 5 KHz, or short sequence length of L=139 symbols with SCS of 15, 30, 60, or 120 kHz. In particular, for the short preamble sequence, NR supports transmission of multiple/repeated preamble sequences to enhance the coverage or supports gNB receiver beam-sweeping, and also CP/GP are required.

Figure 7B:
FIG. 7B illustrates a structure of the short preamble format.

FIG. 7B illustrates a structure of the short preamble format. The detailed supported preamble formats with short sequence length for 15 KHz subcarrier spacing in NR are shown in TABLE 1 below.

TABLE 1

| Preamble format | # of sequence | TCP | TSEQ | TGP | Path profile (Ts) | Path profile (us) | Maximum Cell Radius (m) | Use case |
|---|---|---|---|---|---|---|---|---|
| A0 | 1 | 144 | 2048 | 0 | 48 | 1.56 | 469 | TA is known or very small cell (not used by Rel-15 NR) |
| A1 | 2 | 288 | 4096 | 0 | 96 | 3.13 | 938 | Small cell |
| A2 | 4 | 576 | 8192 | 0 | 144 | 4.69 | 2109 | Normal cell |
| A3 | 6 | 864 | 12288 | 0 | 144 | 4.69 | 3516 | Normal cell |
| B1 | 2 | 192 | 4096 | 96 | 96 | 3.13 | 469 | Small cell |
| B2 | 4 | 360 | 8192 | 216 | 144 | 4.69 | 1055 | Normal cell |
| B3 | 6 | 504 | 12288 | 360 | 144 | 4.69 | 1758 | Normal cell |
| B4 | 12 | 936 | 24576 | 792 | 144 | 4.69 | 3867 | Normal cell |
| C0 | 1 | 1240 | 2048 | 0 | 144 | 4.69 | 5300 | Normal cell |
| C2 | 4 | 2048 | 8192 | 2912 | | | | Normal cell |

As shown in TABLE 1, unit is Ts where Ts=1/30.72 MHz, and PRACH preambles are aligned with OFDM symbol boundary for data with same numerology. For format A, GP can be defined within the last RACH preamble among consecutively transmitted RACH preambles. For other SCS values (e.g., 30, 60, and 120 kHz), preamble formats can be defined similar to TABLE 1 by scaling Ts according to SCS. One exception of TABLE 1 is Format A0, which coincides with the nominal PUSCH/PUCCH OFDM symbol format and is not utilized by Rel-15 NR PRACH.

Extend 5G NR into the unlicensed spectrum is an important component of the beyond Rel-15 NR. In order to operate NR in unlicensed spectrum, unlicensed spectrum regulations across different unlicensed bands and different regions need to be satisfied, such as the listen-before-talk (LBT), occupied channel bandwidth (OCB) regulation, and power spectral density (PSD) regulation. For example, the ETSI regulation in the 5 GHz unlicensed band requires that the OCB (i.e., bandwidth containing 99% of the power of the signal) shall be at least 80% of the declared nominal bandwidth. However, each Rel-15 NR short PRACH preamble sequence only occupies 12 consecutive physical resource blocks (PRBs), which may not satisfy the OCB regulation. In addition, LBT also needs to be implemented by NR in unlicensed system to fulfill the regulation.

This disclosure mainly focuses on the design of Msg1 and Msg2 for the random access of beyond Rel-15 NR unlicensed, including the support of the 2-step random access, the resource configuration for preamble and data part in Msg1 of 2-step random access, PRACH waveform, the LBT design for PRACH transmissions, as well as the random access response design. In this disclosure, the unlicensed bands for NR-U can include sub-7 GHz unlicensed bands as well as above-7 GHz unlicensed band. Specifically, sub-7 GHz unlicensed band can include the unlicensed and shared bands including the 5 GHz unlicensed bands, the 6 GHz unlicensed/shared bands, and unlicensed/shared bands below 5 GHz. The above-7 GHz bands for NR-U can include the unlicensed and shared bands above 6 GHz, including the 60 GHz unlicensed bands, 37 GHz unlicensed/shared bands, etc.

1. 2-step Random Access for NR Unlicensed

The LBT regulation in unlicensed spectrum requires UE and gNB to perform LBT before each transmission. In one embodiment, the 4-step random access of NR is a reference random access procedure for NR unlicensed. Due to the LBT requirement, the 4-step random access procedure needs to perform at least 4 LBTs, and failure of any LBT can lead to a significantly increased access delay and resource overhead. In a first example, enhancements to Msg1 and Msg2 of 4-step RA can be adopted to increase a probability for transmitting Msg1 and Msg2. This is described in detail in Section 6 titled "Two-step Random Access Procedure Design for Beyond Rel-15 NW" below. In a second example, a 2-step based RA for NR unlicensed can be utilized as an alternative to a 4-step based RA to reduce an initial access latency compared to the 4-step RA.

Figure 8:
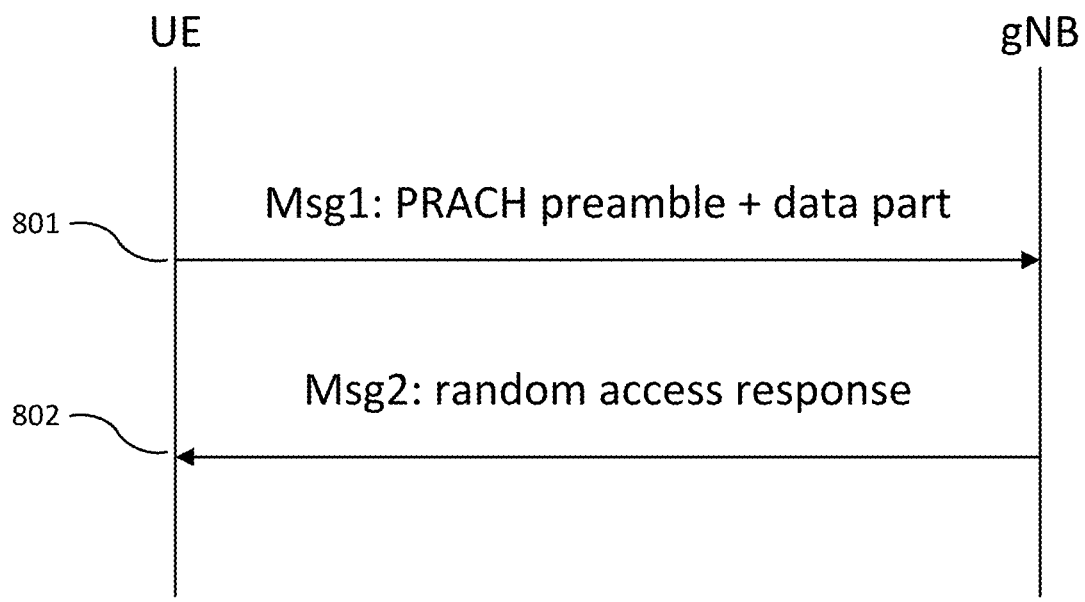
FIG. 8 illustrates an exemplary flowchart for of a 2-step RA procedure according to one embodiment of the present disclosure.

FIG. 8 illustrates an exemplary flowchart for of a 2-step RA procedure according to one embodiment of the present disclosure. The embodiment shown in FIG. 8 is for illustration only. Other embodiments could be used without departing from the scope of the present disclosure.

In step 1 of the 2-step RA 801, a UE transmits to a gNB a random access preamble (PRACH) and a data part that can include an identity for the UE (UE-ID), and other information such as RRC connection request, etc., subject to a successful LBT on unlicensed band. In step 2 of the 2-step RA 802, the gNB transmits a random access response that can include a timing advance value, a detected UE-ID, a detected PRACH preamble ID and a contention resolution message, subject to successful LBT on unlicensed band. The transmission contents in step 801 and step 802 of the 2-step RA are called Msg1 and Msg2, respectively.

In addition to reducing a latency of a RA process, a 2-step RA is also beneficial for NR unlicensed for the following reasons. (1) NR unlicensed mainly targets cells with small coverage area, wherein a timing advance is less critical for correctly decode a data part in Msg1. (2) The LBT requirement in an unlicensed band can potentially reduce a number of UEs that simultaneously attempt random access and this can reduce a collision probability among Msg1 transmissions from different UEs. As a result, possibly in addition to a 4-step RA procedure of NR, NR unlicensed can also support a simplified 2-step RA for a faster RA procedure especially for operation in small cell where an effect of a need for a timing advance is less detrimental to a reception reliability for data transmitted in Msg1.

In one example, a 2-step RA process for NR unlicensed can be utilized for both contention-based random access and contention-free RA. Specifically, besides supporting 2-step RA for contention-based random access of UEs in RRC IDLE state (e.g., for initial access), 2-step RA can also be used for several other scenarios for NR unlicensed as listed in TABLE 2 together with the corresponding triggering events and main reasons.

TABLE 2

| Scenario | Triggering event | Main reason to use 2-step RA |
|---|---|---|
| RRC_IDLE UEs | Initial access from RRC_IDLE UEs | Reduce RA delay by requiring fewer LBTs |
| RRC_CONNECTED and non-synchronized UEs | For DL data arrival or UL data arrival when UL is "non-synchronized" | UE already has an ID that is typically short, and 2-step RA requires fewer LBTs |
| RRC_CONNECTED and synchronized UEs | For transmitting scheduling request if there is no PUCCH resource for scheduling request | Use data part to transmit SR for faster RA process |
| OTHER | RRC connection re-establishment procedure; beam failure recovery; handover; transition from RRC_INACTIVE; request for other system information (SI) | Reduce RA delay |

Figure 9:
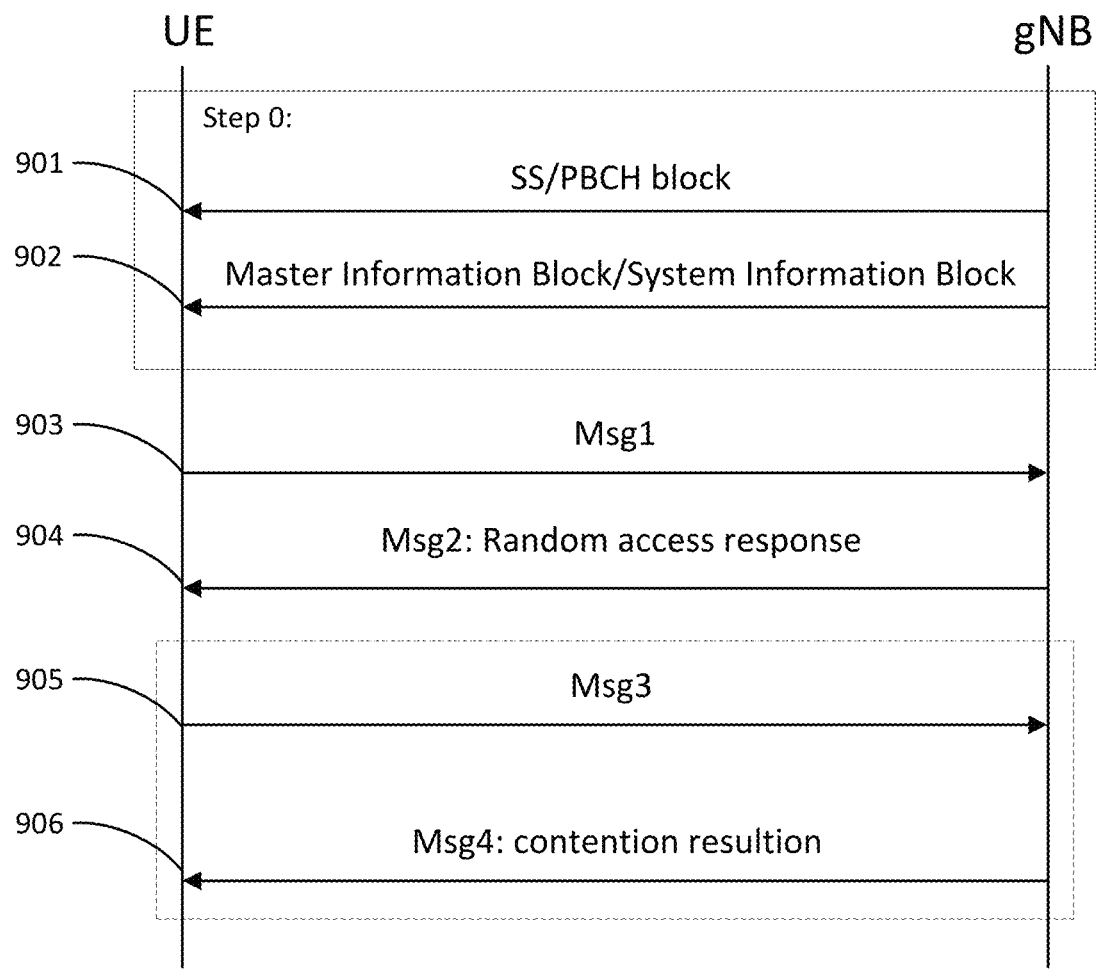
FIG. 9 illustrates an exemplary flowchart of the random access procedure according to embodiments of the present disclosure.

FIG. 9 illustrates an exemplary flowchart of the random access procedure according to embodiments of the present disclosure. The embodiment shown in FIG. 9 is for illustration only. Other embodiments could be used without departing from the scope of the present disclosure.

In steps 901 and 902, a UE first detects the SS/PBCH block(s) from the gNB and selects a suitable SS/PBCH block for the RACH procedure. Then UE obtains the configuration of a control resource set (CORESET) for receiving PDCCH, which schedules the system information blocks that contain the PRACH configuration. From the PRACH configuration, the UE obtains one or multiple of the following RA related parameters, such as a PRACH preamble format, indicator to use the 2-step RA or the 4-step RA, a configuration of Msg1 occasion burst, a configuration of slot structure for Msg1 transmission, an indicator to support wideband LBT down-selection for PRACH, and the like. From the Msg1 configuration, the mapping rule between the selected SS block and Msg1 occasions, the UE obtains the time and frequency resources to transmit Msg1.

In step 903, the UE transmits Msg1 over the determined RACH occasion, wherein the Msg1 includes a randomly selected RA preamble sequence from the available sequences, and a data part that includes at least a UE ID if the 2-step RA is used. Msg1 transmission waveform can be enhanced from Rel-15 Msg1 waveform (e.g., repetitions of Msg1 across frequency domain) to satisfy unlicensed band regulations. The Msg1 transmission is subject to LBT for NR-U, and multiple Msg1 transmission occasions can be allocated together to form a burst of Msg1 occasions.

Upon detecting Msg1 from a UE, the gNB scrambles the CRC of PDCCH by a 2-step random access radio network temporary identifier (RA2-RNTI) for transmission of PDSCH containing a random access response (RAR) addressed to the UE. A RAR along with its corresponding PDCCH includes at least the following information for the detected Msg1: the radio resource of the Msg1 (e.g., through RA2-RNTI), the PRACH preamble sequence of the Msg1 (e.g., through random access preamble ID, or RAPID). In addition, the RAR can also include the UL grant for the UE, a timing advance command, etc. In addition, when using the 2-step RA, a RAR along with its corresponding PDCCH can include the UE identity (UE-ID) that the gNB decoded from Msg1, when an Msg1 is received by the gNB. RAR transmission is subject to LBT for NR-U.

UE detects RAR within RAR window, and within the UE monitored RAR window(s), one or more than one RAR occasions are supported. The 2-step RA process is successful if a RAR is detected, which contains correct information about the radio resource for Msg1, PRACH preamble sequence, and the UE-ID that UE used in transmitting Msg1. UE transmits HARQ-ACK information in PUCCH or PUSCH in response to the correct Msg2 reception.

Otherwise, the UE behavior depends on the reception status of RAR and content of the RAR message. For example, when UE detects a RA2-RNTI which corresponds to the correct PRACH resource, and then receives a RAR message with only a correct RAPID but an incorrect UE-ID, UE can fall back to a 4-step RA procedure. Specifically, when falling back to the 4-step RA, in 905, UE transmits Msg3 (subject to LBT) over PUSCH that contains at least a UE-ID; in 906, the gNB responds a contention resolution message to the UE in PDSCH subject to LBT that contains at least the UE-ID it detected from Msg3. The details of the RA procedure are illustrated in the rest of the disclosure.

2. Resource Configuration for Preamble and Data in Msg1 of 2-step Random Access

As shown in the above section 1, the RA message (e.g., Msg1) of 2-step RA includes both a PRACH preamble and a data part. Therefore, an important design aspect of a 2-step RA is a resource configuration for preamble and data in Msg1. This component is focused on the channel and format designs of the Msg1 for 2-step random access, which includes the format designs for the PRACH part and data part respectively. By default, the designs in this component apply to the 2-step RA of NR unlicensed, unless otherwise mentioned in which some of the designs can apply to 4-step RA or NR in licensed.

In a first example, the preamble part and data part of an Msg1 for 2-step RA can be multiplexed in the frequency domain (FDM) and share a same time domain resource allocation.

Figure 10A:
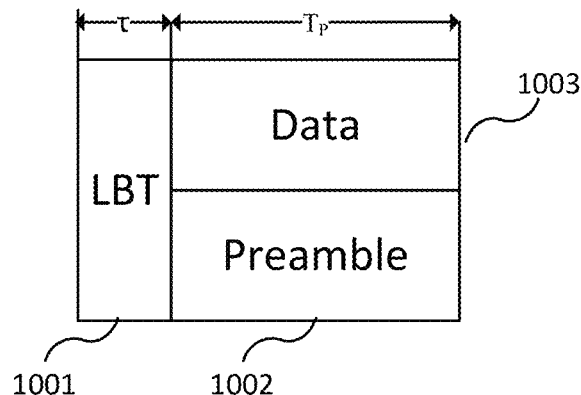
FIG. 10A illustrates an exemplary resource structure for a 2-step RA message according to one embodiment of the present disclosure.

FIG. 10A illustrates an exemplary resource structure for a 2-step RA message according to one embodiment of the present disclosure. In the embodiment, the preamble part and data part of an Msg1 are multiplexed in FDM, sharing a same time domain resource allocation. The embodiment shown in FIG. 10A is for illustration only. Other embodiments could be used without departing from the scope of the present disclosure.

The PRACH preamble part 1002 and data part 1003 of an Msg1 are multiplexed in FDM (FDM'ed). For NR-U, an LBT operation 1001 is required before transmitting Msg1, while for NR in licensed band, the LBT operation 1001 is not required in transmitting Msg1.

In one sub-example, the data symbols can have the same numerology as the preamble sequences, and no extra guard band is needed when preamble and data are multiplexed in frequency domain.

In another sub-example, the frequency domain resources for the PRACH preamble part and the data part of the Msg1 can be either consecutive; or non-consecutive with a gap between PRACH preamble part and data part of the Msg1.

In another sub-example, in order for a gNB to decode data in Msg1, a UE needs to transmit a DM-RS in the data part and the gNB needs to buffer the data while the gNB is detecting the PRACH preamble.

In another sub-example, some preamble formats (e.g., those in TABLE 1) use multiple repeated preamble symbols to facilitate UL receive beam-sweeping at the gNB. In such cases, the gNB can use different receive beam directions at different preamble symbols. This increases a decoding complexity for the data part when the data part is frequency multiplexed with the preamble.

In another sub-example, a mapping rule to implicitly or explicitly indicate the frequency allocation of the data part needs to be defined for FDM between preamble and data. For instance, the frequency domain bandwidth for the data part, and the relative frequency position of the data part and the preamble part, can be indicated through PBCH or the remaining minimum system information (RMSI) from system information block 1 (SIB1).

In another sub-example, with the FDM'ed PRACH preamble and data part, the time-domain resource for each Msg1 is the same as that of the PRACH preamble of the Msg1.

In another sub-example, for NR-U, FDM'ed PRACH preamble and data part in Msg1 is beneficial in meeting the OCB regulation, such that the bandwidth of the Msg1, which is the combined bandwidth of PRACH preamble and data part of Msg1, meets the OCB regulation. For instance, in 5 GHz unlicensed band, within the 20 MHz initial active UL BWP, the bandwidth of the data part can be at least 29 PRBs, such that the Msg1 bandwidth can be at least 41 PRBs which meets the OCB regulation.

In a second example, the PRACH preamble part and the data part of an Msg1 for 2-step RA can be multiplexed in the time domain (TDM) and share a same frequency domain resource allocation.

Figure 10B:
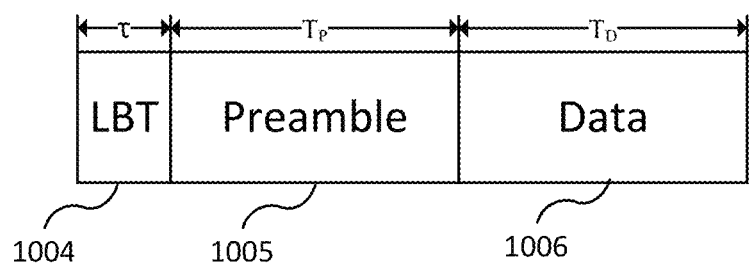
FIG. 10B illustrates another exemplary resource structure for a 2-step RA message according to one embodiment of the present disclosure.

FIG. 10B illustrates another exemplary resource structure for a 2-step RA message according to one embodiment of the present disclosure. In the embodiment, the PRACH preamble part and the data part of an Msg1 are multiplexed in the time domain (TDM), sharing a same frequency domain resource allocation, according to one embodiment of the present disclosure. The embodiment shown in FIG. 10B is for illustration only. Other embodiments could be used without departing from the scope of the present disclosure.

The preamble 1005 and data part 1006 of Msg1 are multiplexed in the TDM (TDM'ed). For NR-U, an LBT operation 1004 is required before transmitting Msg1, while for NR in licensed band, the LBT operation 1004 is not required in transmitting Msg1.

In one sub-example, for NR-U, as LBT 1004 is required before the transmission of Msg1, transmission of the data can immediately follow transmission of the preamble in Msg1 in order to avoid a need for extra LBT for the data transmission; or the gap for the PRACH preamble part and data part of Msg1 that is smaller than the SIFS (i.e., 16 μs for 5 GHz unlicensed band and 8 μs for 60 GHz unlicensed band) duration.

In another sub-example, upon correct detection of a preamble, a gNB can use the preamble 1005 as demodulation reference signal (DM-RS) for decoding the data part 1006.

In another sub-example, a same center frequency and FFT size can be used for the transmission of the preamble sequence and the data part.

In another sub-example, when the gNB performs UL receive beam-sweeping for preamble formats in TABLE 1, TDM between preamble and data transmissions can allow the gNB to select a desirable receive beam direction, that the gNB determines for preamble reception, to receive the data part and this reduces a decoding complexity compared to FDM of RA preamble and data and improves a data reception reliability.

In another sub-example, with the TDM'ed PRACH part and data part in Msg1, the frequency domain resource for the Msg1 is the same as the PRACH part.

In a third example, the radio resources for PRACH preamble part and the data part of an Msg1 for 2-step RA can follow a mixture of TDM and FDM, such that both the time domain resource and the frequency domain resource do not completely overlap for the preamble part and the data part of the Msg1.

Figure 10C:
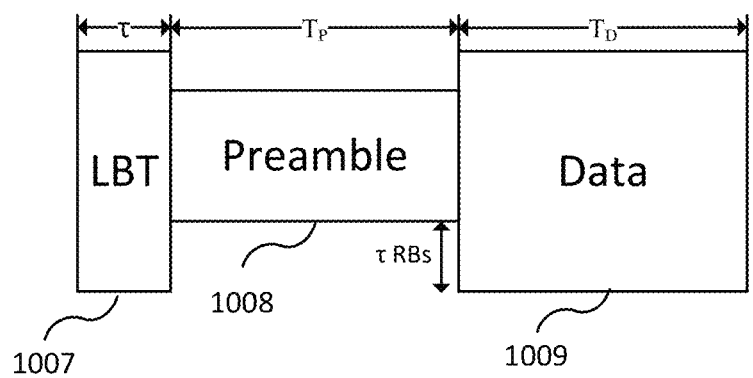
FIG. 10C illustrates an exemplary resource structure for a 2-step RA message according to one embodiment of the present disclosure.

FIG. 10C illustrates an exemplary resource structure for a 2-step RA message according to one embodiment of the present disclosure. In the embodiment, the PRACH preamble part and the data part of an Msg1 are multiplexed in a combination of TDM and FDM. The embodiment shown in FIG. 10C is for illustration only. Other embodiments could be used without departing from the scope of the present disclosure.

As illustrated, the preamble part and data part of Msg1 occupy non-overlapping time-domain resource, while the lowest frequency domain resource for the preamble part and the frequency domain resource for the data part has an offset of τ RBs, wherein τ can be either a non-negative value; or a negative value. For instance, τ can be number of PRBs for the data part, or negative number of PRBs for the preamble part; in which cases the frequency domain resources for preamble and data part are non-overlapping. For NR-U, an LBT operation 1007 is required before transmitting Msg1, while for NR in licensed band, the LBT operation 1007 is not required in transmitting Msg1.

In one sub-example, for NR-U, as LBT 1007 is required before the transmission of Msg1, the time domain resource for Msg1 should be either consecutive, or at least there exists no time-domain gap for the Msg1 that is larger than the SIFS (i.e., 16 μs for 5 GHz unlicensed band and 8 μs for 60 GHz unlicensed band) duration.

In another sub-example, the time-domain duration for the data part and the PRACH preamble part of the Msg1 can be the same or different.

In another sub-example, the frequency-domain bandwidth for the data part and the PRACH preamble part of the Msg1 can be same or different. For instance, in the example of FIG. 10C, the bandwidth for the data part can be larger than that of the PRACH preamble, in order to transmit the information of the data part which can be large (e.g., more than 48 bits).

In another sub-example, a frequency-hopping approach for PRACH and data part of the Msg1 can be used, such that the overall frequency range of the Msg1 can meet the OCB regulation.

In another sub-example, in order for a gNB to decode data in Msg1, a UE needs to transmit a DM-RS in the data part.

For the three radio resource relations of preamble and data part of Msg1 for 2-step RA, another design consideration how the selected resource configuration is indicated to the UE.

In one example, only one of three radio resource relations can be selected and fixed by specification.

In another example, when more than one radio resource relations are supported, the selected radio resource relation can be indicated to the UE through PBCH.

In another example, when more than one radio resource relations are supported, the selected radio resource relation can be indicated to the UE through the remaining system information (RMSI), or equivalently the system information block 1 (SIB1).

In another example, when more than one radio resource relations are supported, the selected radio resource relation can be indicated to the UE through higher layer parameter (e.g., RRC parameters). This can be applied to when UE was already assigned a C-RNTI.

Given the resource allocation for the PRACH preamble part and data part of the Msg1, another design consideration is the format for the PRACH preamble part and the data part respectively, which determines the time-domain resource configuration for the PRACH preamble part and the data part. The following examples are applicable to 2-step RA for both NR-U and NR in licensed band.

In one example, the preamble for a 2-step RA can use same preamble formats for short preamble sequences as for 4-step RA of Rel-15 NR as defined in TABLE 1. Compared to defining new preamble formats for 2-step RA, using the preamble formats in TABLE 1 for 2-step RA conforms with NR and reduces a UE or gNB implementation complexity to transmit or detect, respectively, preamble sequences. Compared to adopting preambles with long sequence length, short preamble sequences have a same SCS as the data part in Msg1 and this facilitates the decoding of the data part. In one sub-example, either all preamble formats in TABLE 1, or a subset (e.g., preamble formats that correspond to a small cell radius) can be supported for 2-step RA. In another sub-example, the total time domain resource for the PRACH preamble can occupy 12 PRBs, while the exact frequency domain positions for the PRACH preamble can either be continuous; or follow an interlace-based structure.

In another example, the preamble part of the 2-step RA can follow the same general structure as the short preamble formats of Rel-15 NR, which is illustrated in FIG. 8, with the PRACH preamble consists of multiple/repeated preamble sequences with CP appended at the beginning of the PRACH, and GP potentially added at the end of the PRACH. In one sub-example, compared to the short preamble formats of Rel-15 NR, the 2-step RA can have different length for PRACH preamble sequence such that the number of PRBs for PRACH can be different from that of Rel-15 NR (e.g., larger than 12 PRBs); and/or different number of multiple/ repeated symbols for the PRACH format; and/or different CP/GP length. In another sub-example, the exact frequency domain positions for the PRACH preamble can either be continuous; or follow an interlace-based structure.

In another example, the time-domain resources for data part of 2-step RA Msg1 can include one or multiple data segments, wherein all data segment(s) follow the same general structure as the short preamble formats of Rel-15 NR as in FIG. 7B, i.e., each data segment consists of one or multiple repeated data symbols, with CP appended at the beginning of the data segment, and GP potentially added to the end of each segment, or the end of the data part. In addition, different data symbols can be included across the one or multiple data segments of the data part of 2-step RA Msg1.

Figure 11A:
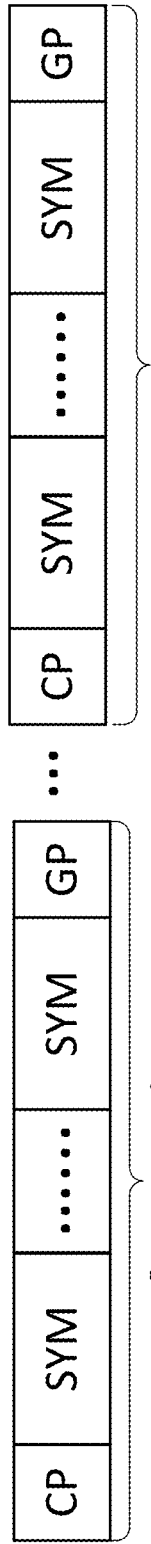
FIGS. 11A and 11B illustrate exemplary data formats for the 2-step RA message according to embodiments of the present disclosure.
Figure 11B:
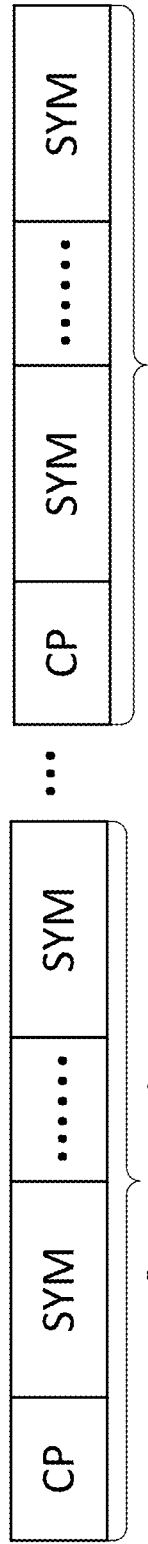

FIGS. 11A and 11B illustrate exemplary data formats for the 2-step RA message according to embodiments of the present disclosure. The embodiments shown in FIGS. 11A and 11B are for illustration only. Other embodiments could be used without departing from the scope of the present disclosure.

In particular, FIG. 11A shows a data format where a guard period (GP) is appended to the end of each data segment. FIG. 11B shows another data format where the data segment 1 to data segment n−1 does not have a GP, while a GP can potentially be added to data segment n, such as to fill in the end of an NR-U slot that contains the Msg1. Each data part of the RA messages is composed of n>=1 data segments multiplexed in time domain, and each data segment consists of multiple/repeated symbols denoted by SYM.

In one sub-example, data part can also be composed of n>=1 data segments multiplexed in the frequency domain, with each data segment having the same format (i.e., CP/GP length, number of symbols). This can be equivalent to when there is only one data segment in the time domain as the examples in FIGS. 11A and 11B, but increase the number of PRBs for the data segment by n-fold.

In one sub-example, each data segment can choose from one of the formats in TABLE 1, i.e., a certain number of repetitions of data symbols and the CP and GP lengths are chosen, for example, according to a cell radius and can be broadcasted by a gNB in a system information block.

In another sub-example, when there are more than 1 data segments within an Msg1, each data segment can use the same format; or potentially different formats can be used among the data segments.

In another sub-example, a UE does not have a valid timing advance value when transmitting Msg1, the data part of Msg1 can be subject to inter-symbol interference when the data uses same OFDM symbol structure as PUSCH/PUCCH. Thus, the data part of 2 step RA can choose the CP and GP lengths to be larger than or equal to the corresponding PRACH part of the Msg1 to alleviate potential inter-symbol interference due to timing misalignment.

In another sub-example, for each data segment the UE can encode Msg1 data into one symbol and repeat over the other symbols of the data segment. Such repetitions can provide time domain diversity for data decoding and protect against inter-symbol interference.

In another sub-example, the scenarios when the number of data segments larger than 1 within an Msg1 can be used to carry large amount of information in the data part of the Msg1 (e.g., when the data part needs to carry more than 48 bits information).

In another sub-example, a choice for preamble format A0 in TABLE 1 for the data part of Msg1 is equivalent to using a same symbol structure for PUSCH/PUCCH.

In another example, given PRACH preamble and data part can follow similar structure, the time-domain resource configuration Msg1 formats for 2-step RA can also be defined according to the formats for the preamble, formats for the data part, and number of data segments within each Msg1.

In one sub-example, when the formats for both PRACH preamble and data part follow those formats defined in TABLE 1; then the Msg1 formats for 2-step RA can be defined as Ax_Ay_n, where x={0,1,2,3}, y={0,1,2,3}, and n≥1. The preamble uses format Ax and the data part includes n data segments with each segment using format Ay. Similarly, other Msg1 formats such as Ax_By_n (x={0,1,2,3}, y={1,2,3,4}, n≥1); Bx_Ay_n (x={1,2,3,4}, y={0,1,2,3}, n≥1); Bx_By_n (x={1,2,3,4}, y={1,2,3,4}, n≥1); Cx_Cy_n (x={0,2}, y={0,2}, n≥1) can also be supported. When n=1, n can be omitted. In addition, in this scenario, same subcarrier spacing for the PRACH preamble and data part of the Msg1 is used.

In one sub-example, the Msg1 formats for 2-step RA can be included a separate Msg1 configuration table for 2-step RA, wherein the Msg1 configuration table indicates the time-domain resources for the Msg1 of the 2 step RA. For example, each entry of the Msg1 configuration table can include all or a subset of the following information: an Msg1 configuration index; Msg 1 format (including both PRACH preamble format and data part format); Msg1 configuration period (e.g., 1/2/4/8/16 system frames or more than 16 system frames); system frame number (SFN) modulus the Msg1 occasion period for the SFN that contains Msg1; the subframe number within the SFN that contains Msg1; the starting symbol for the Msg1 (e.g., for NR in licensed or when LBT for Msg1 is single-shot); number of Msg1 slots within a subframe; number of time-domain Msg1 occasions within a Msg1 slot (i.e., the slot that contains Msg1); and the Msg1 duration in number of NR-U symbols. For NR-U, the Msg1 configuration table can further contains the information about resources for LBT, such as the symbol positions for LBT of Msg1, or the starting symbol of LBT.

In another sub-example, when the PRACH preamble part and data part within an Msg1 are FDM'ed, the format for each data segment can choose same time-domain configuration as the PRACH preamble format, i.e., same CP/GP length, and same number of repetitions for data symbols as PRACH sequences, with same numerology for preamble and data part; while the frequency domain configuration for data part can potentially be different (e.g., larger bandwidth) compared to that of the PRACH preamble part.

Another design consideration is the frequency domain resources for the Msg1 of 2-step RA. The following examples can be applied to the 2-step RA of NR-U and NR in licensed.

In one example, the Msg1 for initial access UEs can be contained within the initial active UL bandwidth part (BWP).

In another example, the frequency domain resources for the Msg1 depends on the radio resource configuration of PRACH and data part of Msg1 (e.g., multiplexing pattern); the number of PRBs for the data part of the Msg1 and the number of PRBs for the PRACH part respectively. In one sub-example, the radio resource configuration of Msg1, the number of PRBs for data part of the Msg1 and PRACH respectively, can either be fixed by specification, or can be indicated through higher layer parameters (e.g., through SIB1).

In another example, more than one FDM'ed Msg1 occasions can be allowed; and a higher layer parameter can be used to indicate the number of supported FDM'ed Msg1 occasions, which can be referred to as Msg1-FDM. Msg1-FDM can depend on the resource configuration mode for PRACH preamble and data part of the Msg1. In one instance, when PRACH and data are TDM'ed, the number of PRBs in an Msg1 is same as that of the PRACH, thus Msg1-FDM can be {1, 2, 4, 8} same as that for 4-step RA. In another instance, Msg1-FDM can be up to floor(UL bandwidth/(sum of PRBs in an Msg1*PRB bandwidth)), wherein UL bandwidth can be supported frequency range that can contain Msg1 occasions, such as the initial active UL BWP. Thus, when the number of PRBs in an Msg1 is larger than that of the corresponding PRACH, maximum supported Msg1-FDM can be smaller than when PRACH and data part are TDM'ed in Msg1.

In one example, a higher layer parameter can be used to indicate the start frequency position of the Msg1 with respect to common PRB of the resource grid of the carrier (e.g., PRB 0 of resource grid). This parameter can be referred to as Msg1-frequency-start. When more than one FDM'ed Msg1 occasions are supported, Msg1-frequency-start can refer to offset of lowest Msg1 occasion in frequency domain.

In addition, an LBT constraint on unlicensed spectrum also needs to be incorporated when designing Msg1. The LBT design for transmitting Msg1, and correspondingly the number of symbols for LBT, also is an important design consideration for an RA process. Specifically, a UE need to perform an LBT process with at least energy detection (ED) and the UE needs to sense a total energy in the channel below energy level $F_{ed}$ for certain amount of time prior to the UE transmitting Msg1.

A first design consideration for LBT of Msg1 is the directionality of the LBT. In one example, the LBT can be performed omni-directionally or quasi-omni-directionally. In another example, the LBT can be performed over the intended UE transmit beam direction for Msg1.

Another design consideration is the frequency unit over which the LBT is performed over with. In one example, the frequency unit for Msg1 LBT, regardless of the Msg1 bandwidth, can be the UL BWP over which the Msg1 is intended to be transmitted, such as initial active UL BWP for the initial access UE. In another example, the frequency unit for Msg1 LBT can be the bandwidth of the Msg1.

Another design consideration for Msg1 LBT is the type of LBT that is used in granting Msg1 transmission, and the following examples are possible.

In one example, a UE can use a single-shot LBT with fixed duration τ to transmit Msg1. This is helpful in increasing channel access opportunities for NR unlicensed. The duration τ can be within SIFS and DIFS (i.e., SIFS+2 Wi-Fi slot duration) of a coexisting IEEE 802.11 system.

In one sub-example, for a NR unlicensed system that operates in the below 7 GHz unlicensed band, τ can be set to SIFS+1 Wi-Fi slot duration for IEEE 802.11ac or 25 μsec. The corresponding maximum channel occupancy time (MCOT) upon successful LBT can be up to 1 msec and this is same as for LTE-LAA.

In another sub-example, for a NR unlicensed system that operates in unlicensed bands above 7 GHz unlicensed bands, τ can be set to SIFS+1 Wi-Fi slot duration for IEEE 802.11ad or 8 μsec. The MCOT upon successful LBT can be up to 0.25 msec.

In another sub-example, with the single-shot LBT duration and MCOT as described above, a LBT process requires a fixed LBT duration, which will occupy 1 symbol for SCS of 15 kHz and 30 kHz for sub-7 GHz NR-U Msg1, and 60 kHz and 120 kHz for above 7 GHz NR-U Msg1; the corresponding MCOT is 1 slot for 15 KHz SCS of sub-7 GHz NR-U and 60 KHz SCS of above-7 GHz NR-U, and 2 slots for 30 KHz SCS of sub-7 GHz NR-U and 120 KHz SCS of above-7 GHz NR-U.

In another sub-example, with the single-shot LBT duration and MCOT as described above, a LBT process requires a fixed LBT duration, which will occupy 2 symbols for SCS of 60 kHz for sub-7 GHz NR-U Msg1 and 240 kHz for above 7 GHz NR-U Msg1; the corresponding MCOT is 4 slots for 60 KHz SCS for sub-7 GHz NR-U and 240 kHz SCS for above-7 GHz NR-U.

In another sub-example, within a symbol for LBT, a UE can transmit a reservation signal upon successful LBT until the UE transmits Msg1 in a next symbol.

In another sub-example, LBT can start at the beginning of an LBT symbol for every UE. In another sub-example, since an LBT duration is smaller than a symbol period, a starting position of an LBT process can also be randomized within a symbol for each UE in order to reduceMsg1 collision probability among UEs. A gNB can configure UEs to select a random time within a symbol for respective LBTs process, instead of always using the beginning of a symbol, through system information, such as a system information block.

In another example, a category 4 (CAT-4) type of LBT similar to that of LTE-LAA can be applied for Msg1 transmission, which is an LBT process with random back-off with a contention window of variable size.

In one sub-example, CAT-4 LBT with high LBT priority class, e.g., LBT priority class 1 can be considered, wherein the minimum contention window size (i.e. CWmin) is 3 Wi-Fi slots and the maximum contention window size (i.e. CWmax) is 7 Wi-Fi slots. For a NR unlicensed system operating in sub-7 GHz unlicensed spectrum, the MCOT upon successful LBT can be 2 msec, as for LTE-LAA. In addition, the CAT-4 LBT duration is non-deterministic and flexible, which depends on the LBT results at each step of the CAT-4 LBT process. If the CAT-4 LBT is successful in every step, a number of symbols required for CAT-4 LBT can be 2 and 3 for 15 KHz SCS and 30 KHz SCS, respectively. For NR unlicensed system operating in the above 7-GHz bands, the MCOT upon successful LBT can be 1 ms. A number of symbols required for LBT, if the CAT-4 LBT is successful in every step, is 3 symbols and 6 symbols for 60 KHz SCS and 120 KHz SCS respectively.

In another sub-example, adopting CAT-4 LBT is useful in situations where longer MCOT than that of single-shot LBT is required. For example, if preamble format is B4 where gNB RX beam-sweeping is applied, Msg1 needs to span 2 slots to transmit both the preamble part and the data part. This MCOT requirement is longer than that for single-shot LBT with 15 KHz SCS and 60 KHz SCS, but can be fulfilled by the CAT-4 LBT as described above. In addition, the random back-off mechanism of CAT-4 LBT can also reduce the Msg1 collision probability among UEs, since UEs with larger contention window size are less likely to succeed LBT.

In another sub-example, the contention window size (CWS) adaptation rule for CAT-4 LBT of NR-U Msg1 of 2-step RA, can be based on whether or not a collision happens during the 2-step RA procedure. For instance, a UE can treat a collision happens if the UE does not detect a RAR corresponding to its transmitted Msg1; or if UE detected RAR(s) within its monitored RAR window(s), but the RAR does not correspond to its transmitted Msg1 (e.g., in terms of radio resource of Msg1, PRACH sequence, or UE-ID). In the case when a collision happens, UE can increase its CWS to the next available value. If a 2-step RA is successful, the UE re-set the CWS to minimum value.

In another example, a category 3 (CAT-3) type of LBT similar to that of LTE-LAA can be applied for Msg1 transmission, which is an LBT process with random back-off with a contention window of fixed size. In one sub-example, the LBT duration with CAT-3 LBT is non-deterministic and flexible, which depends on the LBT results at each step of the CAT-3 LBT process.

Another consideration for LBT is how it affects the starting position of the Msg1.

In one example, within the configured (e.g., by higher layer parameter) time-domain NR-U slot(s) that contains the Msg1 (i.e., Msg1 slot(s)), the starting symbol position for Msg1 can be flexible and there can be multiple supported candidate starting OFDM symbol positions for the Msg1 of 2-step RA; and the Msg1 can be transmitted at the earliest candidate starting OFDM symbol after the LBT is completed. If the LBT cannot be completed after certain duration, the Msg1 transmission can be dropped.

For instance, when the LBT is of CAT-3 or CAT-4 type for NR-U, the LBT for Msg1 is of non-deterministic and flexible duration, and Msg1 can be transmitted after the first supported OFDM symbol after the LBT is completed.

In another instance, when LBT is of single-shot type for NR-U and the single-shot LBT fails, the UE can retry the single-shot LBT such that the Msg1 can be transmitted at the supported starting symbol position within the configured Msg1 slot.

In another example, within the configured (e.g., by higher layer parameter) Msg1 slot(s), the starting symbol position for Msg1 can be fixed, such that if LBT is not completed before the Msg1 starting position, the UE needs to retry LBT at its next available Msg1 occasion. For instance, this can be applied when single-shot LBT is used for Msg1. In another instance, this can be applied to CAT-3 or CAT-4 LBT, and the LBT can be started before the fixed Msg1 starting position, by the number of OFDM symbols assuming each step of the CAT-3/CAT-4 LBT is successful.

Based on the time and frequency resource configurations for the PRACH part and data part of the Msg1, as well as the considerations for LBT overhead as specified in previous examples, another design consideration is the combined overall Msg1 format.

FIGS. 12A to 12D illustrate exemplary RA message formats for 2-step RA when PRACH and data part are multiplexed in time domain, according to embodiments of the present disclosure. FIGS. 12A to 12D are for illustration purpose only, data part and preamble part either share the same frequency domain resources or have different frequency domain resources. In addition, the CP/GP length of preamble part and the CP/GP length of data part can be different.

Figure 12A:
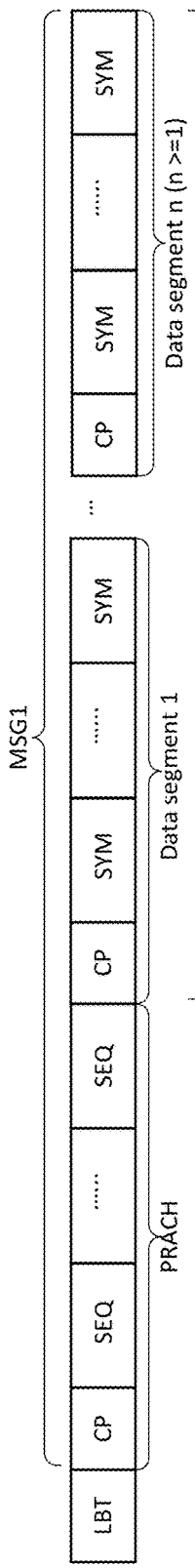
FIGS. 12A to 12D illustrate exemplary RA message formats for 2-step RA when PRACH and data part are multiplexed in time domain.
Figure 12B:
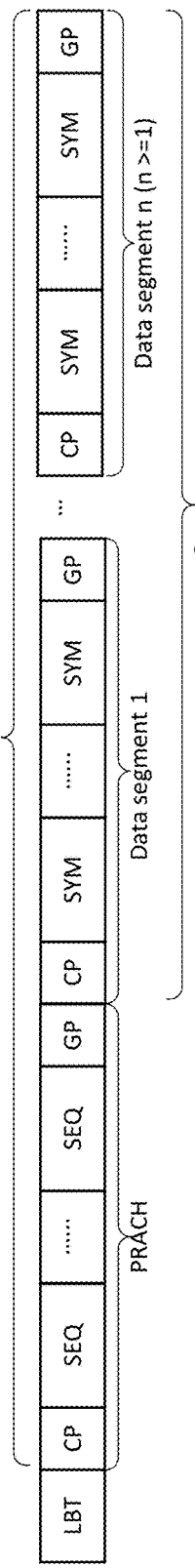
Figure 12C:
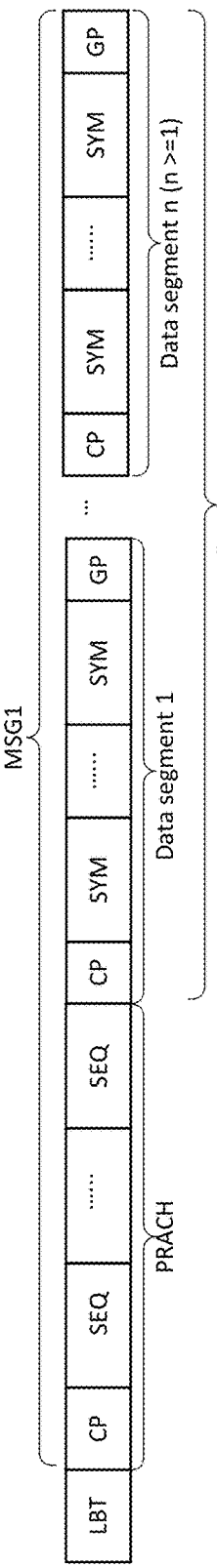
Figure 12D:
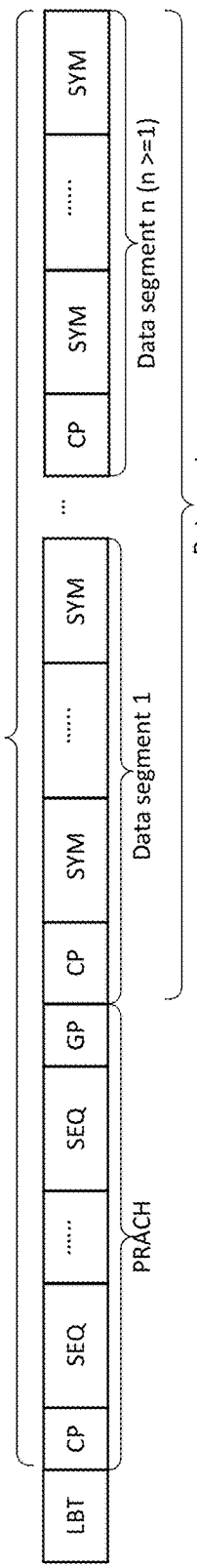

FIG. 12A shows a Msg1 comprising a PRACH preamble beginning with a CP and repeated data segments, each data segment beginning with a CP. FIG. 12B shows a Msg 1 comprising a PRACH preamble beginning with a CP and ending with a GP, and repeated data segments, each data segment beginning with a CP and ending with a GP. FIG. 12C shows a Msg 1 comprising a PRACH preamble beginning with a CP and repeated data segments, each data segment beginning with a CP and ending with a GP. FIG. 12D shows a Msg 1 comprising a PRACH preamble beginning with a CP and ending with a GP, and repeated data segments, each data segment beginning with a CP.

In the embodiments, the LBT can be performed for NR-U, while the LBT is not required for 2-step RA in licensed band. The LBT process type, and the format for PRACH and data part, as well as the time/frequency resource for LBT, and PRACH and data part of the Msg1 can follow one of the examples or sub-examples or instances illustrated in this component.

In one sub-example, the data part and preamble part can have different frequency domain resources. For instance, the data part can have a different number of PRBs compared to the preamble part, and/or that the lowest PRB index for PRACH part and the lowest PRB index for the data part can be different.

In another sub-example, for NR in licensed band, the PRACH and data part of Msg1 can be either consecutive in time domain and can also be non-consecutive in time domain.

In another sub-example, the time-domain duration of an Msg1, which is the sum of the time-domain duration of PRACH (including the GP after PRACH part if any) and time-domain duration of data part (including the GP after data part if any) respectively, can be an integer number of OFDM symbol(s) with respect to the NR-U uplink slot(s). For instance, this can be achieved by the time-domain duration of PRACH to be an integer number of OFDM symbol(s) with respect to the NR-U uplink slot(s); and each data segment of the data part in 2-step Msg1 to also be an integer number of OFDM symbol(s) with respect to the NR-U uplink slot(s).

In another sub-example, a supported cell radius for Msg1 format is the minimum of the supported ones of the preamble format and data format. In another sub-example, several Msg1 formats can be time-multiplexed within the configured (e.g., by higher layer parameter) Msg1 slot(s). Therefore, a starting symbol location within the Msg1 slot(s) of the Msg1 format can be specified, similar to the preamble formats in Rel-15 NR.

In another sub-example, for a specific instance, each data segment can have a format with 2 repeated symbols exist in each data segment, with CP and GP length chosen such that each data segment occupies 2 NR-U OFDM symbols. Preamble format A1 or B1 in TABLE 1 are two examples of this instance. In this case, the gNB can decode the data part of Msg1 with a propagation delay of up to one symbol period.

Figure 13A:
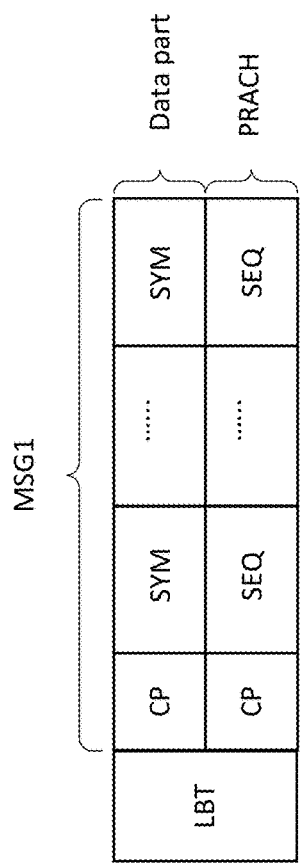
FIGS. 13A to 13C illustrate exemplary Msg1 formats for the 2-step RA when PRACH and data part are multiplexed in the frequency domain, according to embodiments of the present disclosure.
Figure 13B:
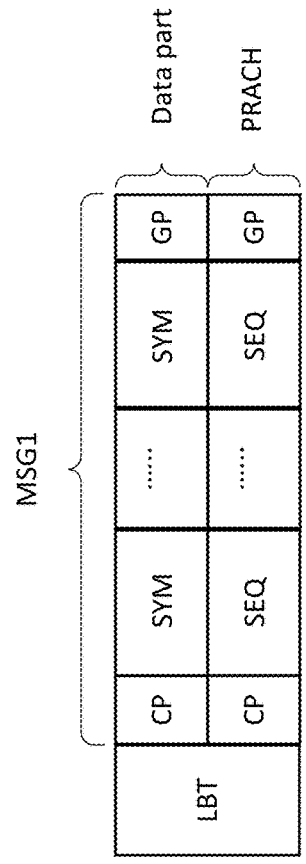
Figure 13C:
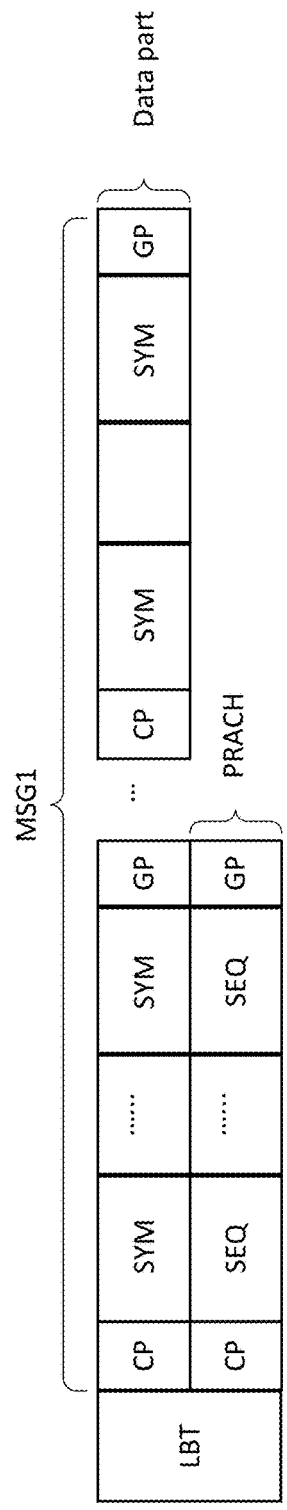

FIGS. 13A to 13C illustrate exemplary Msg1 formats for the 2-step RA when PRACH and data part are multiplexed in the frequency domain, according to embodiments of the present disclosure. The embodiments shown in FIGS. 13A to 13C are for illustration only. Other embodiments could be used without departing from the scope of the present disclosure.

In the embodiments, the LBT can be performed for NR-U, while the LBT is not required for 2-step RA in licensed band. FIGS. 13A to 13C is for illustration purpose only. The frequency resources for data part and preamble part can either be consecutive or be non-consecutive and separated by a gap in frequency domain, and the relative frequency position of PRACH part and data part of the Msg1 can be configurable (e.g., PRACH can also have higher PRB indexes than data part). In addition, the LBT process type, and the format for PRACH and data part, as well as the time/frequency resource for LBT, and PRACH and data part of the Msg1 can follow one of the examples or sub-examples or instances illustrated in this component.

In one sub-example as illustrated in FIG. 13C, the frequency resource of different data segments can potentially be different. For instance, the data segments that are using different time domain resource from the PRACH part can have larger number of PRBs compared to the data segment that share the time-domain resource as the PRACH part.

In another sub-example, the time-domain duration of Msg1 can be an integer number of OFDM symbol(s) with respect to the NR-U uplink slot(s). For instance, this can be achieved by the time-domain duration of PRACH to be an integer number of OFDM symbol(s) with respect to the NR-U uplink slot(s); and each data segment of the data part in 2-step Msg1 to also be an integer number of OFDM symbol(s) with respect to the NR-U uplink slot(s).

In another sub-example, for the 2-step RA Msg1 with format given by the examples as illustrated in FIG. 13A and FIG. 13B, the time-domain resource is the same as that for the PRACH; therefore, for 2-step RA of NR in licensed band, the time-domain resource configuration can follow the same configuration as that of PRACH for Rel-15 NR; and for 2-step RA of NR in unlicensed band, the time-domain resource configuration can be enhanced from the time-domain configuration of PRACH for Rel-15 NR, by considering the time-domain overhead for LBT on the available time-domain PRACH occasions within the PRACH/Msg1 slot(s).

In another example, some specific instances of the resource configurations for preamble and data of 2-step RA Msg1 within the configured (e.g., by higher layer parameter) Msg1 slot(s) can be specified. In the following examples, the preamble part and data part that are multiplexed in time domain are provided (i.e., instances of FIGS. 12A to 12D), with both the preamble part and the data part can choose according to the formats of TABLE 1.

FIGS. 14 to 17 illustrate exemplary formats and configurations for the LBT and Msg1 according to embodiments of the present disclosure. The embodiments shown in FIGS. 14 to 17 are for illustration only. Other embodiments could be used without departing from the scope of the present disclosure.

The exact symbol positions for LBT and Msg1 that are shown in FIG. 14 to FIG. 17 can be shifted by one or few NR-U OFDM symbol(s) respectively since the LBT outcome may not be guaranteed. When LBT is of CAT-3 or CAT-4 type in the following examples, the duration of the LBT can be longer than that shown in FIG. 14 to FIG. 17, and the starting OFDM symbol position of Msg1 can be shifted to the symbol after LBT is completed accordingly. All or a subset of the Msg1 formats in FIG. 14, FIG. 15, FIG. 16, FIG. 17 can be applied to a 2-step RA process in NR unlicensed bands.

Figure 14:
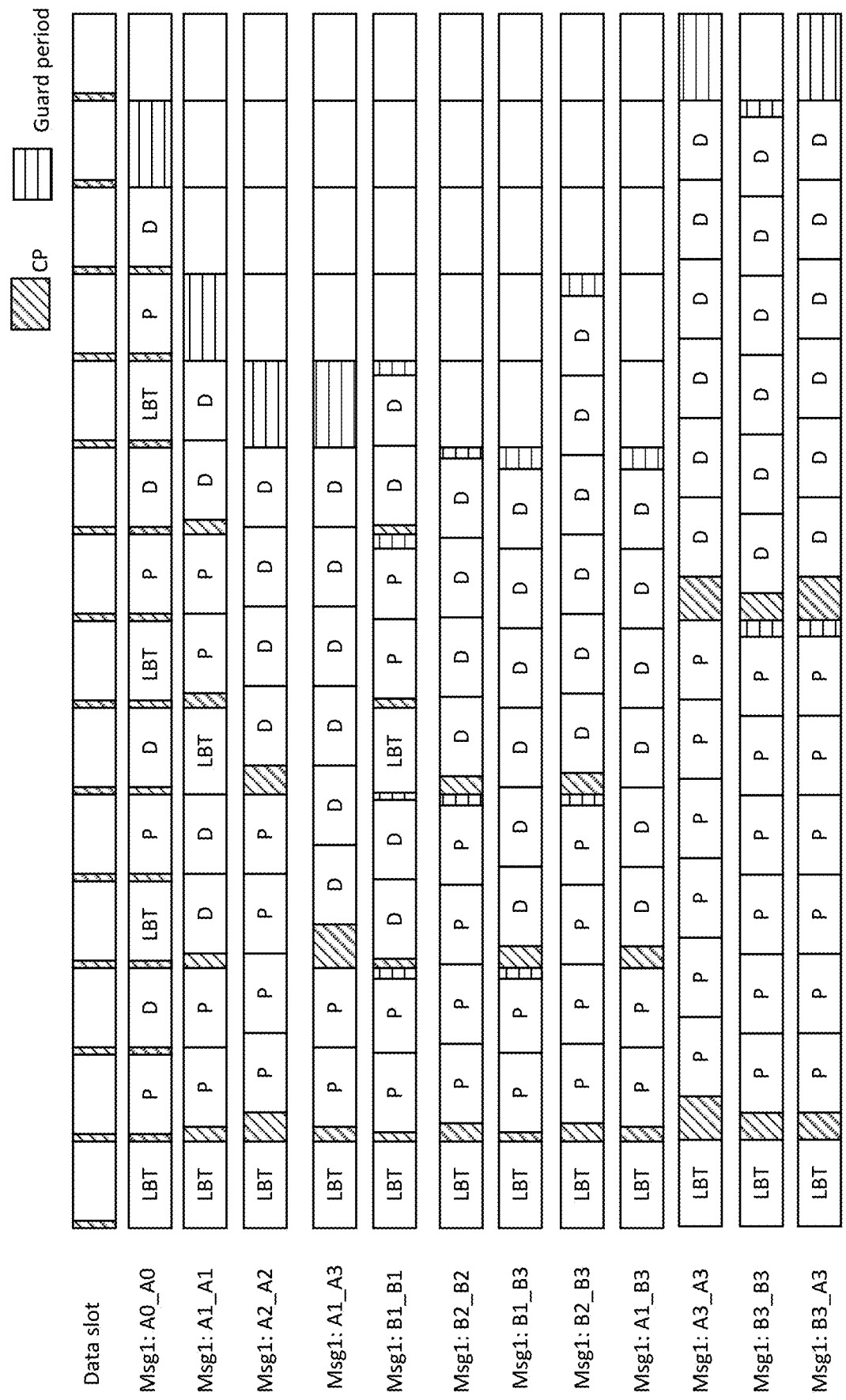
FIG. 14 illustrates an exemplary format and configuration for LBT and Msg1 according to embodiments of the present disclosure.
Figure 15:
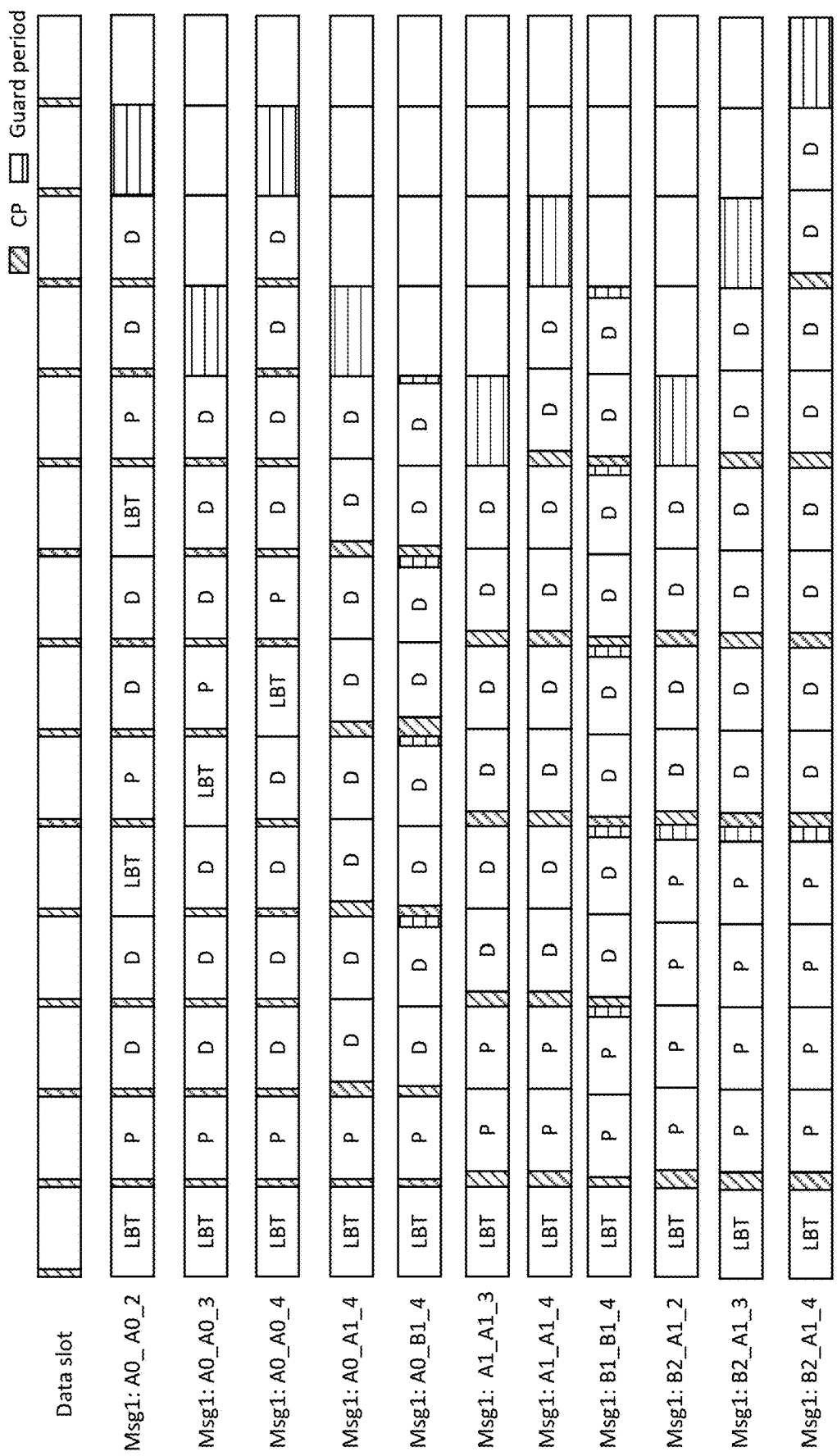
FIG. 15 illustrates an exemplary format and configuration for LBT and Msg1 according to embodiments of the present disclosure.

In one sub-example, the Msg1 can be allocated within one slot of 14 symbols according to the formats and configurations specified in FIG. 14 and FIG. 15. In particular, each Msg1 consists of 1 data segment in FIG. 14, and each Msg1 consists of multiple data segments in FIG. 15.

In addition, since only one data segment is included in the Msg1 formats of FIG. 14, these formats are suitable for scenarios where the amount of data to transmit in Msg1 is not large (e.g., below 40 bits).

Another example is that the data part of Msg1 formats in FIG. 15 includes multiple data segments in order to accommodate scenarios where larger amount of data (e.g., more than 40 bits) needs to be transmitted in the Msg1 compared to formats in FIG. 14.

In another example, Msg1 formats in FIG. 14 and FIG. 15 with repeated preamble transmission over OFDM symbols can facilitate UL RX beam-sweeping at a gNB when beam-correspondence between the UE and the gNB is not available.

Figure 16:
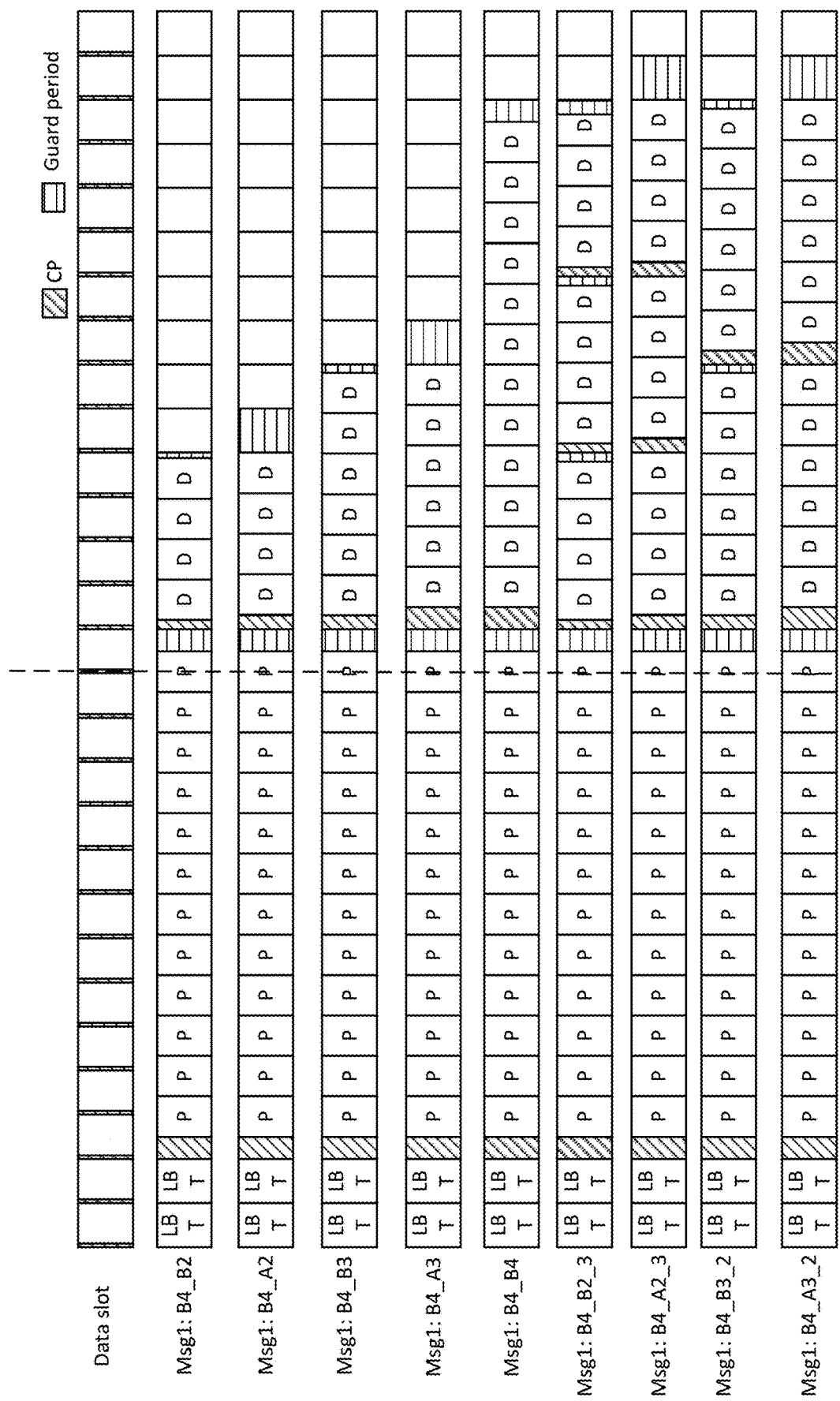
FIG. 16 illustrates another exemplary format and configuration for LBT and Msg1 according to embodiments of the present disclosure.

In another sub-example, Msg1 can be allocated across two consecutive slots, wherein the preamble format is B4 to facilitate UL RX beam-sweeping at a gNB, as shown in FIG. 16. Since the Msg1 formats span 2 slots, longer LBT can be required compared to the formats in FIG. 14 and FIG. 15. For example, for Msg1 with 15 KHz and 60 KHz SCS with CAT-4 LBT, at least 2 symbols need to be allocated for LBT whereas, for Msg1 with 30 KHz and 120 KHz SCS, 1 symbol is sufficient for single-shot LBT and MCOT of 2 slots. Therefore, the first LBT symbol in FIG. 16 can be vacant. In another example, the preamble format in FIG. 16, can be used for performing UL RX beam-sweeping at the gNB. This is useful in scenarios where the gNB does not have beam-correspondence with the UE, so that the UL RX beam direction for Msg1 needs to be trained at the gNB. In addition, format B4 supports a repetition of 12 preamble symbols and is therefore useful for scenarios where the maximum number of beams at the gNB is large (e.g., L=64 for operation in the above 6 GHz NR unlicensed bands).

Figure 17:
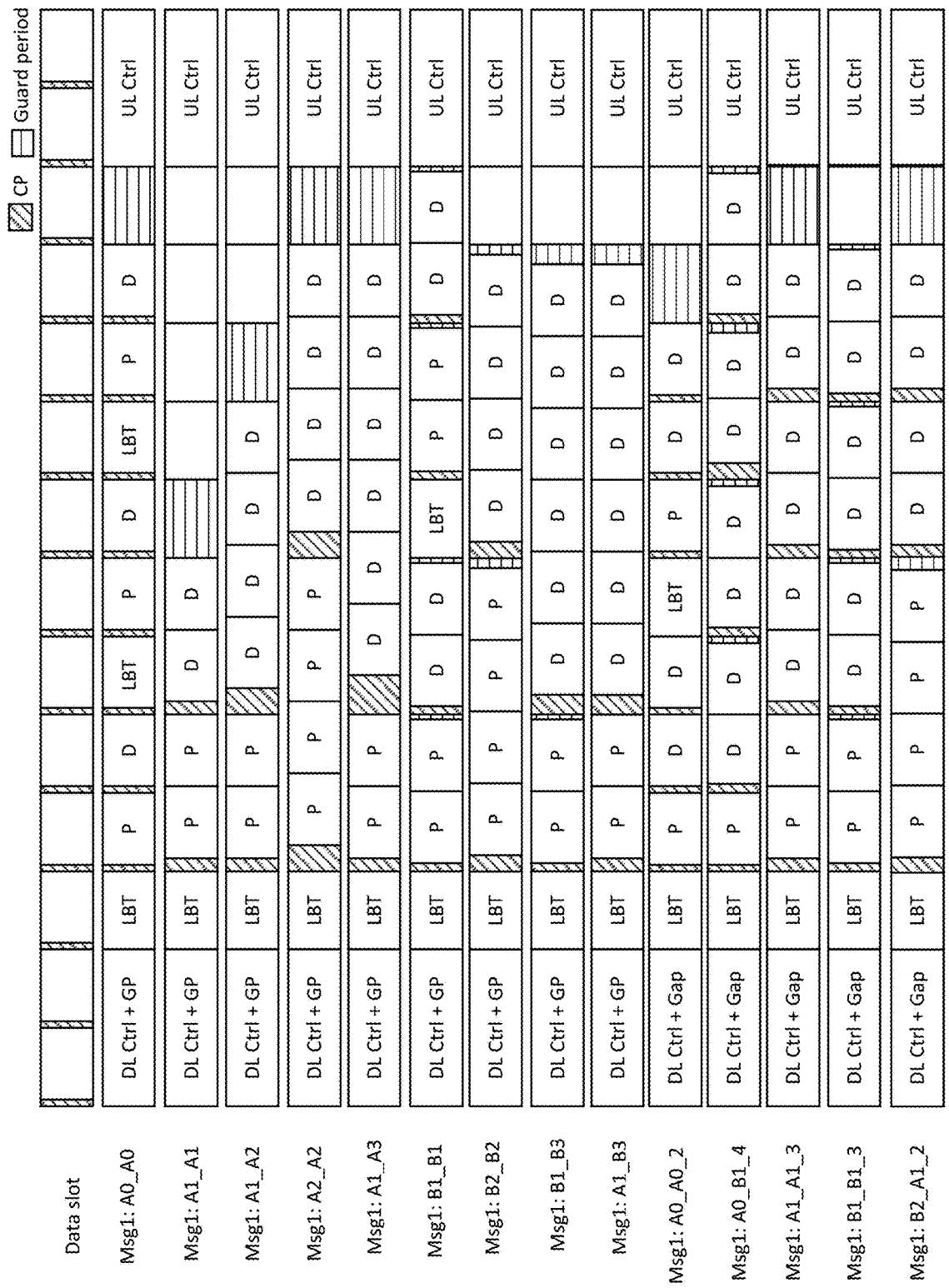
FIG. 17 illustrate another exemplary format and configuration for LBT and Msg1 according to embodiments of the present disclosure.

In another sub-example, Msg1 can be allocated within an uplink centric slot, wherein Msg1 should avoid to overlap with the downlink control and guard period, as well as uplink control and SRS symbols, when any. A configuration of the slot structure for Msg1 transmission can be indicated through system information together with the PRACH configuration parameters. For instance, the first 2 or 3 symbols of the slot can be reserved for downlink control and GP, while the last 2 or 4 symbols of the slot can be reserved for uplink control or SRS transmissions. In one example, FIG. 17 illustrates supported formats and configurations of Msg1 within an uplink centric slot, with 2 first symbols reserved, for example for downlink control and GP, and 2 last symbols reserved, for example for uplink control and SRS transmissions. A starting symbol position of Msg1 within the slot can be configured and indicated by the gNB. Compared to FIG. 14 and FIG. 15, a smaller number of Msg1 formats is supported for an uplink centric slot structure since some Msg1 formats with long duration (e.g. A3_A3, B3_B3, B3_A3) cannot fit in the remaining symbols of the slot after excluding the reserved symbols. However, configuring Msg1 within an uplink centric slot provides better flexibility for a gNB to schedule DL/UL data, especially during a long RACH occasion (e.g., when the gNB and/or the UE does not have beam correspondence, or only supports analog beamforming). In addition, since NR unlicensed system operation is mainly targeted for small cells, supporting preamble formats that correspond to a short small cell radius within the uplink-centric slot is meaningful.

3. Indication and Determination of 2-step RA

This section is regarding how the usage of 2-step random access is determined and indicated. For both NR in unlicensed and NR in licensed, if both a 2-step RA process and a 4-step RA process are supported, then the usage of 2-step RA process or a 4-step RA process can be determined as follows.

In one example, a gNB can explicitly indicate the use of a 2-step RA process through higher layer parameters. Specifically, the usage of 2-step RA can be indicated explicitly by the gNB to UEs through PRACH configuration parameters in a system information block. Then, after UE selects a SS/PBCH block index k after initial synchronization, the UE receives the PRACH configuration (e.g., from system information). From the PRACH configuration, the UE can determine use of 2-step RA, as well as the format for preamble sequence and the format for the data part in Msg1.

In one sub-example, the higher layer parameter can indicate the use of 2-step RA process through an indicator, which can be transmitted in PBCH or SIB 1.

In another sub-example, the higher layer parameter can indicate to the UE to use Msg1 formats dedicated to 2-step RA process, rather than for a 4-step RA process. For instance, this can be achieved by adding new entries to the PRACH configuration table of Rel-15 NR; or add a new Msg1 configuration table dedicated for 2-step RACH.

In another sub-example, this can be achieved through a multi-level indication, first the indication of the multiplexing pattern of PRACH and data, which ca be fixed by specification or can be derived from higher layer parameter, then the format for PRACH and data part of the Msg1 respectively can be derived from other higher layer parameters.

In another example, a UE can implicitly indicate the usage of 2-step RA by choosing dedicated preamble sequences for 2-step RA.

In one sub-example, for each supported preamble formats for 2-step RA, a UE can choose a subset of all available preamble sequences to be dedicated for 2-step RA, and the remaining sequences to be dedicated to 4-step RA. When the UE uses the 2-step RA, the UE first determines the preamble format from the PRACH configuration, and then transmits the preamble sequence that correspond to the 2-step RA. A gNB side can become aware of the 2-step RA process after detecting the preamble sequence corresponding to 2-step RA. The format for data part cannot be explicitly indicated with this method. One approach is for the UE to be specified to use the same format for data part as for the preamble format, and the PRACH and data part use a TDM'ed approach.

When both 2-step RA and 4-step RA are supported by a NR unlicensed system, another design consideration is a procedure for selecting between 2-step RA and 4-step RA. As a main motivation for 2-step RA is to reduce a latency caused by potential failure of multiple LBT operations with 4-step RA, a 2-step RA can be used when such latency reduction over 4-step RA is effective.

In one example, when the 2-step RA procedure is either configured by a gNB or is default operation, a 4-step RA can still be used when the gNB detects only the preamble in Msg1 but fails to detect the data part. A RA response transmitted by the gNB to the UE can identify an index of a detected preamble and an UL grant in the RA response for the UE can indicate either an initial transmission for a data transport block from the UE or a retransmission of the data included in Msg1 and possibly additional data.

In another example, a choice between 2-step RA and 4-step RA can be dynamically adjusted.

Figure 18:
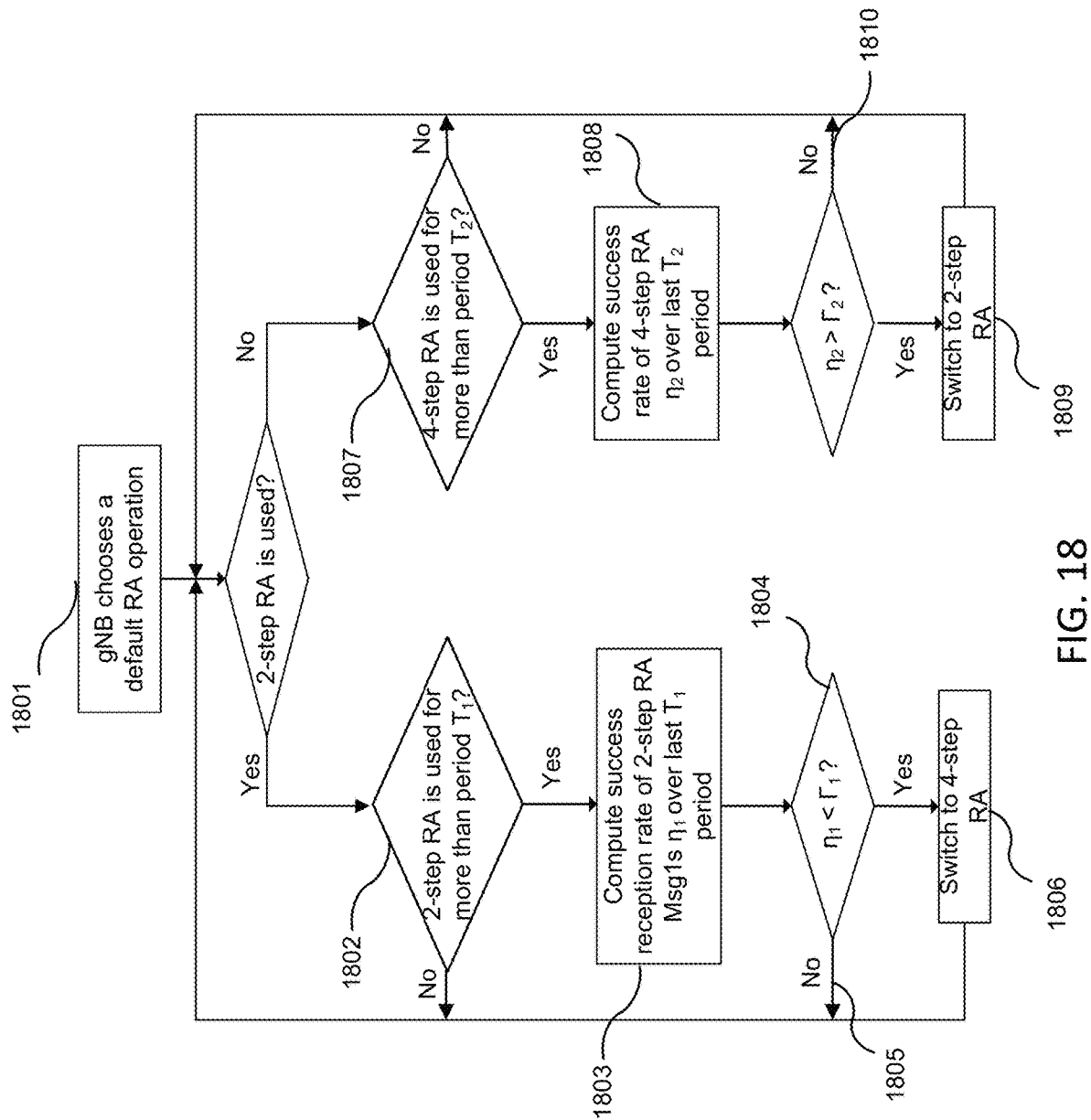
FIG. 18 illustrates an exemplary flowchart for a gNB initiated switching between 2-step RA and 4-step RA according to one embodiment of the present disclosure.

FIG. 18 illustrates an exemplary flowchart for a gNB initiated switching between 2-step RA and 4-step RA according to one embodiment of the present disclosure. The embodiment shown in FIG. 18 is for illustration only. Other embodiments could be used without departing from the scope of the present disclosure.

The gNB can initiate switching between 2-step RA and 4-step RA. Specifically, When the UEs use 2-step RA, the gNB can monitor the success reception rate $\eta_1$ of RA Msg1s over certain period of time $T_1$ 1802-1803, wherein the rate can be collected from multiple UEs that initiate 2-step RA to the gNB. When the rate $\eta_1$ is smaller than a threshold $\Gamma_1$ (e.g., 30%) 1806, the gNB can determine that there exists for high collision rate for the Msg1 transmissions (e.g., the data part of Msg1) among UEs using 2-step RA, and either Msg1 needs to be re-transmitted or fallback to 4-step RA is triggered frequently. Then, a benefit from using 2-step RA is small or non-existent and the gNB can indicate use of 4-step RA through PRACH configuration 1806. Conversely, when 4-step RA is used, the gNB can also monitor the success rate $\eta_2$ of the RA processes initiated over certain period $T_2$ 1807-1808. When the success rate $\eta_{12}$ is greater than a threshold $\Gamma_2$ (e.g., 80%) 1809, this can be interpreted as the cell not being congested and the gNB can indicate use of 2-step RA 1809 through the PRACH configuration to reduce random access latency. The above process for gNB to dynamically switch between 2-step RA and 4-step RA is transparent to UEs.

Figure 19:
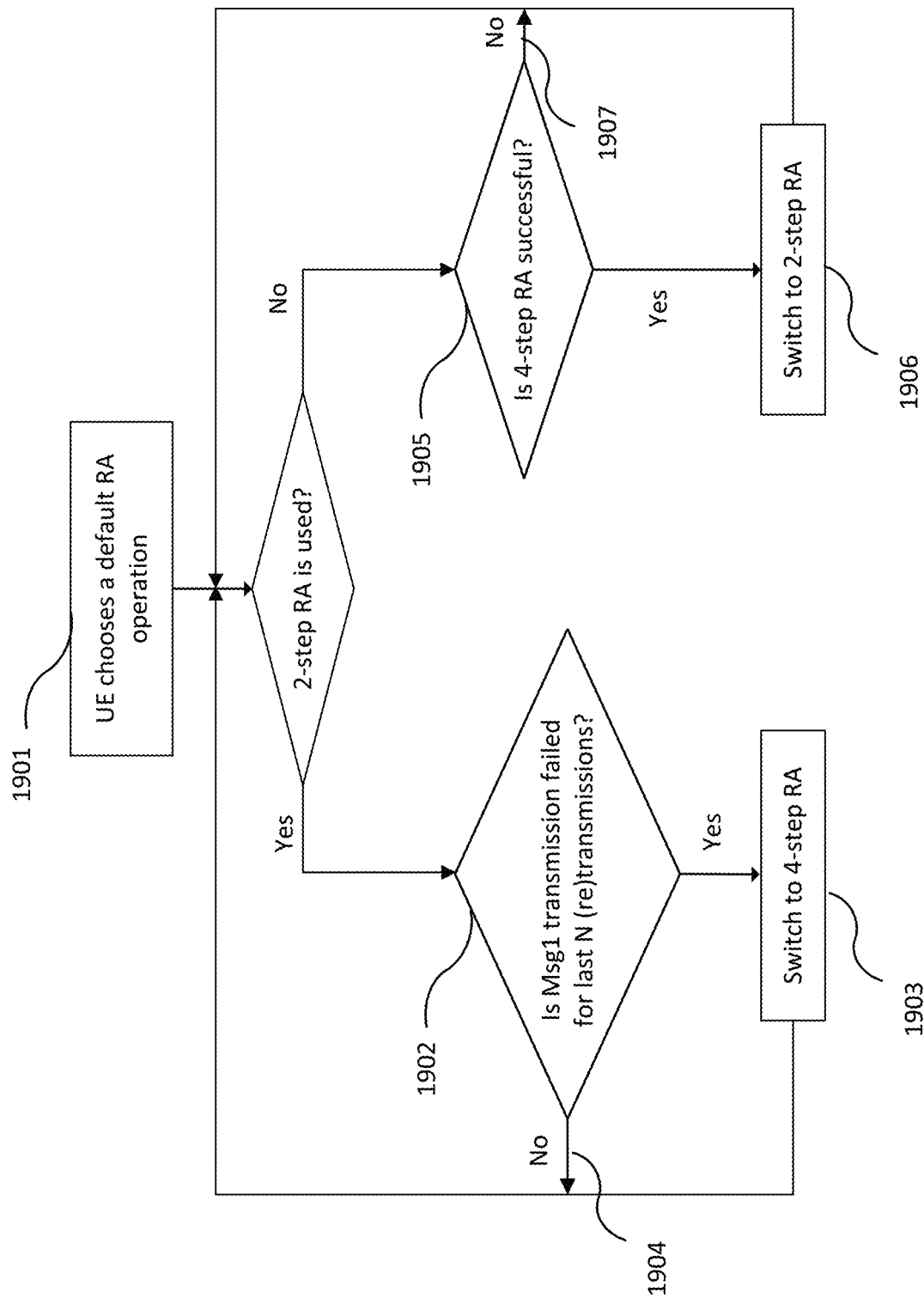
FIG. 19 illustrates an exemplary flowchart for a UE initiated switching between 2-step RA and 4-step RA according to one embodiment of the present disclosure.

FIG. 19 illustrates an exemplary flowchart for a UE initiated switching between 2-step RA and 4-step RA according to one embodiment of the present disclosure. The embodiment shown in FIG. 19 is for illustration only. Other embodiments could be used without departing from the scope of the present disclosure.

Switching between 2-step RA and 4-step RA can be initiated by a UE. When a UE uses 2-step RA, the UE can determine to switch to 4-step RA 1903 when Msg1 transmission is unsuccessful after a number of (re)transmissions N 1902 that, for example, a gNB can indicate by system information through a configuration of random access parameters. When the UE uses 4-step RA and is successful 1905, the UE can use a 2-step RA 1906 when the UE needs to re-establish synchronization with the gNB. In both cases, the UE can indicate a choice of 2-step RA or 4-step RA through a selection of a RA preamble sequence that is dedicated to 2-step RA or 4-step RA.

4. PRACH Waveform for NR Unlicensed

This section is regarding the PRACH waveform design for NR unlicensed. In general the designs of this component can be applied to both 2-step RA and 4-step RA, unless otherwise mentioned.

A waveform of PRACH transmission for NR unlicensed may need to be modified in order to satisfy the regulatory requirements over the unlicensed spectrum. In particular, EU regulations require that PRACH occasions need to span at least 80% or 70% of the nominal bandwidth in order to satisfy the OCB requirement in the 5 GHz or 60 GHz unlicensed band, respectively. The PRACH waveform used for operation in NR licensed does not meet the EU regulations.

Figure 20:
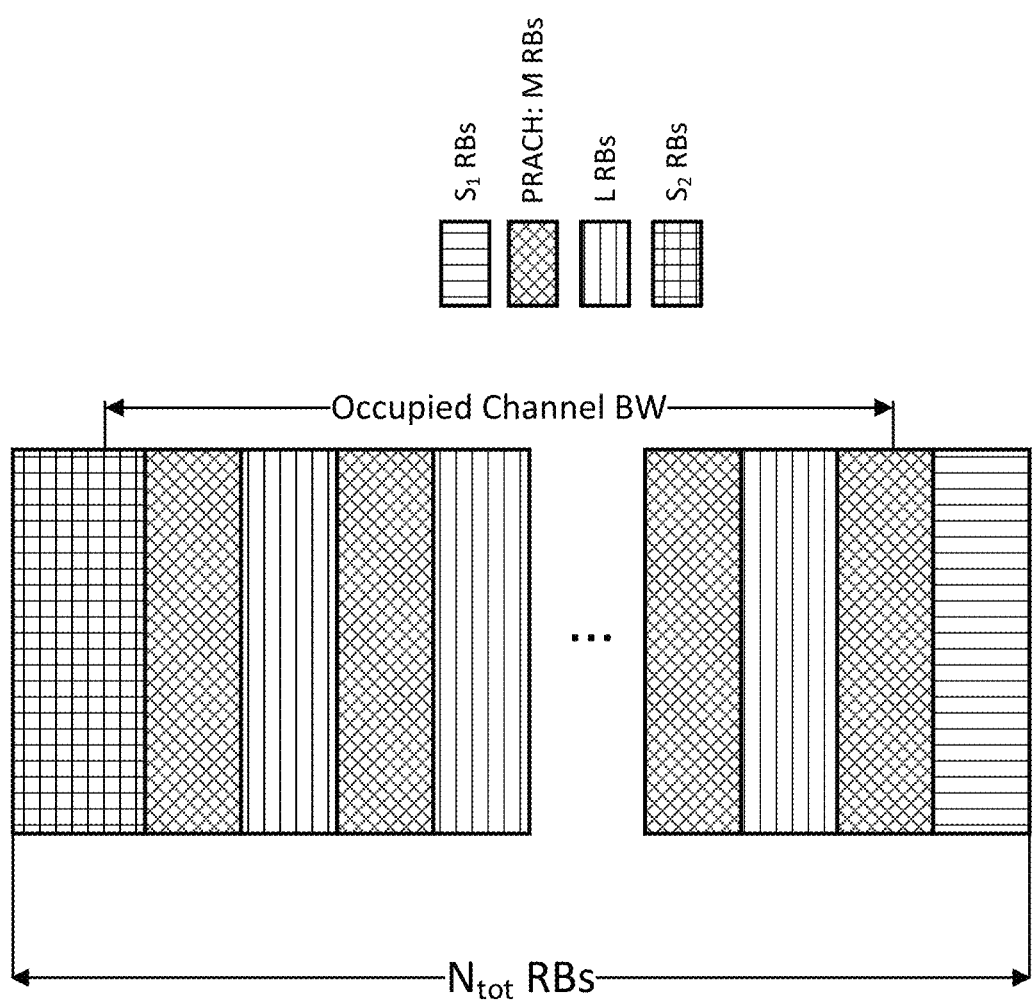
FIG. 20 illustrates an exemplary PRACH waveform for operation in unlicensed spectrum according to one embodiment of the present disclosure.

FIG. 20 illustrates an exemplary PRACH waveform for operation in unlicensed spectrum according to one embodiment of the present disclosure. The embodiment shown in FIG. 20 is for illustration only. Other embodiments could be used without departing from the scope of the present disclosure.

In one example, the PRACH transmission waveform in NR unlicensed can be continuous similar to NR in licensed band, which is applicable to both 2-step RA and 4-step RA. This is feasible by utilizing the regulation for the OCB to be temporarily below the required bandwidth.

In another example, applicable to both 2-step RA and 4-step RA, the PRACH waveform for NR unlicensed can be constructed through an interlaced structure; or N times repetition of PRACH Msg1 in the frequency domain, where the repetitions of PRACH are equally distributed in the frequency domain to satisfy the OCB requirement. In addition, the PRACH Msg1 can use one of the formats defined in the above section 2.

As illustrated in FIG. 20, the PRACH waveform for operation in unlicensed spectrum can be applied to both interlaced-PRACH and direct repetition of PRACH.

In one instance, in the case of direct repetition, each PRACH Msg1 occupies M RBs, and all N repetitions of PRACH Msg1 are equally distributed with an interval of L RBs between adjacent PRACH Msg1.

In another instance, in the case of interlaced waveform, each frequency unit for PRACH interlace occupies M RBs, and each PRACH interlace consists of N such frequency units which are equally distributed with an interval of L RBs between adjacent units.

The PRACH resources associated with each gNB, (or certain SS/PBCH block of the gNB), need to be identified by a combination of PRACH sequences, timing interval, and frequency interval information including the number of RBs M, the interval L, and frequency offset of the first PRACH Msg1 from RB #0 (e.g., $S_2$ in FIG. 20).

For a total nominal bandwidth of $N_{tot}$ RBs, the OCB regulation requires that $MN+L(N-1)/N_{tot} \leq \eta$ (e.g., $\eta$ is 80% for the 5 GHz band or 70% for the 60 GHz band). For instance, with direct repetition, for 15 KHz SCS with 20 MHz system bandwidth (i.e., $N_{tot}$=100 resource blocks), PRACH Msg1 can be repeated N=4 times in the frequency domain with each PRACH Msg1 occupying M=12 resource blocks, and each PRACH Msg1 is separated by L=12 resource blocks. This also allows 2 PRACH occasions to be FDM'ed.

In another sub-example, the bandwidth over which LBT is performed for PRACH transmissions with the PRACH waveform for operation in unlicensed spectrum can be the entire total nominal bandwidth. Alternatively, a UE can perform LBT over certain sub-bands and this is further described in the section 5.

In another example, applicable to both 2-step RA and 4-step RA, in order to ensure a large probability for Msg1 detection by a gNB, especially for the data part of Msg1 with 2-step RA, the PRACH transmission waveform can be designed so that inter-cell interference and intra-cell interference from other PRACH transmissions, as well as the interference from PUSCH/PUCCH, is randomized or minimized.

In one sub-example, the inter-cell interference of PRACH transmissions can be reduced by assigning orthogonal PRACH resources in frequency and/or time domain among neighboring gNBs. Alternatively, the PRACH resources can be divided into multiple partitions in frequency and/or time domain, and each gNB is assigned a partition randomly.

In another sub-example, in order to reduce the intra-cell interference of PRACH transmissions, the data parts of each UE can be multiplexed with orthogonal codes, so that UEs associated with a same gNB can transmit PRACH simultaneously using the same time/frequency resources. The gNB can determine the orthogonal code used by the UE to modulate the data information from the corresponding PRACH preamble sequence.

In another sub-example, in order to reduce the intra-cell interference of PRACH transmissions, each UE can choose a subset of the PRACH resources associated with a serving gNB (or certain SS/PBCH block of the gNB), to orthogonalize PRACH transmissions and reduce intra-cell interference of PRACH transmissions.

Figure 21:
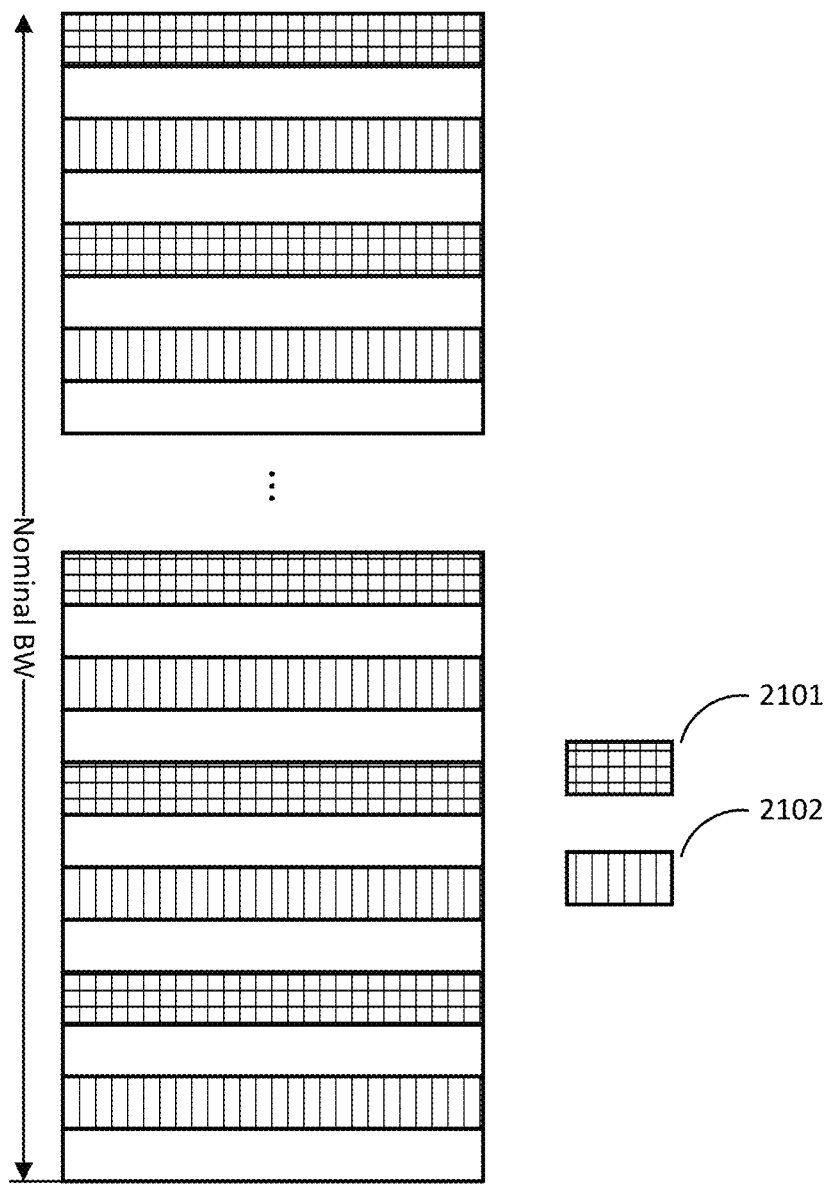
FIG. 21 illustrates another exemplary PRACH waveform for operation in unlicensed spectrum according to one embodiment of the present disclosure.

FIG. 21 illustrates another exemplary PRACH waveform for operation in unlicensed spectrum according to one embodiment of the present disclosure. The embodiment shown in FIG. 21 is for illustration only. Other embodiments could be used without departing from the scope of the present disclosure.

As shown in FIG. 21, the shaded areas represent the PRACH resource associated with the gNB (or certain SS/PBCH block of the gNB), and the UEs associated with the gNB can choose to transmit PRACH using the resources denoted by pattern 2101 or pattern 2102 in FIG. 21. Given the OCB requirement, this option is more suitable when multiple component carriers with nominal bandwidth over 100 RBs are supported.

In another sub-example, in order to reduce interference from PUSCH/PUCCH transmissions, a gNB can avoid scheduling PUSCH/PUCCH on resources that can be used for PRACH transmissions. This is effective in avoiding PUSCH transmissions that are already time aligned from blocking PRACH transmissions that are not time aligned during the initial access phase. The gNB can also use power control to lower a transmission power or an MCS level of PUSCH/PUCCH that can overlap with PRACH transmissions.

In another example, a direct repetition of PRACH preambles in the frequency domain facilitates transmission of the data part for 2-step RA, especially when the data part is relatively large.

In one sub-example, when a total amount of data that a UE needs to transmit in the first step of a random access process is N bits, the UE can encode all data into each Msg1 that can be repeated across the frequency domain as shown in FIG. 21. This frequency domain repetition can offer frequency diversity gain that can increase a detection probability for data part.

Figure 22:
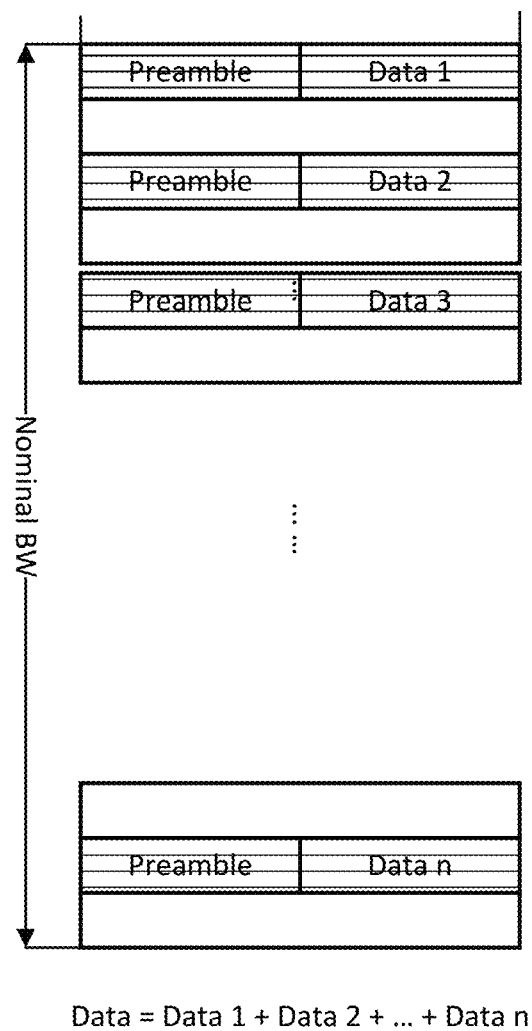
FIG. 22 illustrates exemplary resource structure for the Msg1 for operation in unlicensed spectrum according to one embodiment of the present disclosure.

FIG. 22 illustrates exemplary resource structure for the Msg1 for operation in unlicensed spectrum according to one embodiment of the present disclosure. The embodiment shown in FIG. 22 is for illustration only. Other embodiments could be used without departing from the scope of the present disclosure.

A total amount of N information bits can be coded across frequency domain using very low coding rate as illustrated in FIG. 22. For each frequency occasion of Msg1, the data part can use a lower MCS level to improve robustness against noise and interference. The gNB can indicate the type of PRACH transmission through broadcast information associated with an SS/PBCH block that the UE has detected during cell search. Upon receiving the PRACH transmission from the UE, the gNB is able to decode the data parts across frequency domain into the complete data message, as illustrated in FIG. 22.

In another example, for 2-step RA, the OCB regulation can be met for an Msg1, by properly choosing the radio resource configuration of the PRACH preamble part and data part of the Msg1, as well as the number of PRBs for the preamble part and data part respectively; such that the frequency range of the Msg1 can meet the requirement from the OCB regulation. For instance, this can be achieved by choosing a longer sequence for PRACH with larger bandwidth than that of Rel-15 NR with 12 PRBs; and/or a larger number of PRBs for the data part compared to PRACH; and/or by allowing data part to use different frequency resources with the PRACH part potentially with frequency hopping from PRACH to data part of the Msg1.

5. Wideband LBT Down-selection for Faster PRACH Transmission in NR Unlicensed

This section is focused a wideband LBT down-selection process for PRACH that can be applied to both 2-step RA and 4-step RA.

The random access process needs to be completed reliably and quickly, but the listen-before-talk regulation in unlicensed band increases an associated latency. In order to reduce a time required for a UE to complete a RA procedure, LBT mechanisms leading to higher channel access probability are beneficial. Considering that a PRACH waveform can be repeated across the frequency domain to satisfy the OCB regulation; or a number of FDM'ed PRACH occasions can be allocated to a UE; a wideband LBT down-selection procedure can be used for fast PRACH transmission. In general, instead of requiring a UE to succeed in LBT over the entire nominal bandwidth or initial active UL BWP, this LBT down-selection procedure can allow the UE to transmit PRACH over certain sub-bands that can succeed in LBT, wherein each sub-band can be of the bandwidth for a PRACH sequence or the Msg1.

Figure 23:
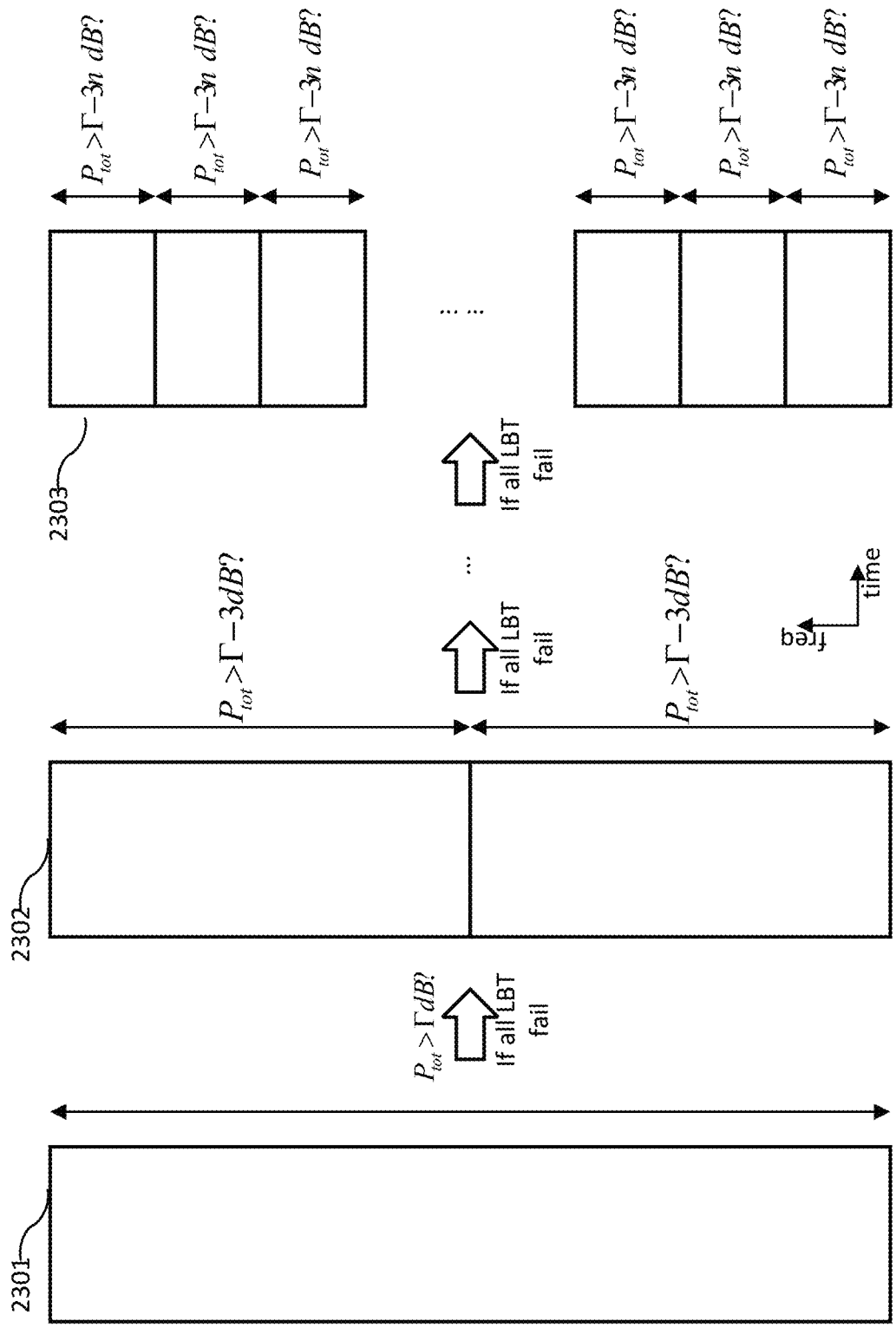
FIG. 23 illustrates an exemplary LBT down-selection operation according to one embodiment of the present disclosure.

FIG. 23 illustrates an exemplary LBT down-selection operation according to one embodiment of the present disclosure. The embodiment shown in FIG. 23 is for illustration only. Other embodiments could be used without departing from the scope of the present disclosure.

The LBT down-selection can follow an iterative process as illustrated in FIG. 23. Specifically, the UE first performs LBT over the entire bandwidth 2301. The UE can transmit PRACH when the energy level the UE observes over the entire bandwidth is below $\Gamma$ dB. Otherwise, the UE can segment a bandwidth for LBT, for example into two contiguous segments, and measure an energy level over each bandwidth segment 2302. When the energy level over any segment is below $(\Gamma-3)$ dB, the UE can transmit PRACH over the segment and the LBT process is completed. Otherwise, the UE continues to perform the down-selection process by further segmentation to perform LBT, until either LBT succeeds over one or more of the segments or the number of such down-selection processes has reached a maximum allowed number of times (i.e., n in FIG. 23). The gNB attempts to detect the Msg1 over the sub-bands/segments where the Msg1 from UE are received, wherein the detection complexity at the gNB will be increased. The LBT down-selection procedure for PRACH transmission can apply to both the 2-step RA and also 4-step RA.

In one sub-example, the gNB can indicate support of wideband LBT down-selection through broadcast information and/or PRACH configuration that UEs can obtain from an associated SS/PBCH block during cell search.

In another sub-example, the LBT energy detection threshold can vary in each iteration. When the LBT threshold over the whole nominal bandwidth is $\Gamma$ dB (e.g., -62 dB), the LBT threshold on the i-th iteration of the down-selection process should be $\Gamma-3>i$ dB when the sub-band/segment bandwidth in each iteration is halved from the previous iteration.

In another sub-example, a maximum number of iterations to perform the LBT down-selection process can depend on the SCS, the number of component carriers, and the nominal bandwidth of the NR unlicensed system. Specifically, when multiple component carriers (e.g., 4 or 8 component carriers with 20 MHz bandwidth each) are aggregated together for the wideband NR unlicensed system, a UE can perform the LBT down-selection process until LBT on each component carrier succeeds (i.e., n in FIG. 23 is the number of component carriers). In another example, when the NR unlicensed system has only one component carrier but with large SCS (e.g., 60 KHz or 120 KHz) and correspondingly wide bandwidth (e.g., 80 MHz or 160 MHz), the LBT down-selection process can be performed until the sub-band/segment bandwidth is 20 MHz (i.e., n in FIG. 23 is equal to the system bandwidth divided by 20 MHz). In one example, when a UE transmits PRACH over the sub-band(s)/segments composed as described above, the individual sub-band/segment bandwidth can be considered as the nominal channel bandwidth in order to satisfy the OCB regulation.

In another sub-example, when multiple, potentially disjoint, sub-bands/segments succeed in the LBT simultaneously, a UE can transmit PRACH over only one of such sub-bands/segments that the UE can either randomly select or determine to be the sub-band/segment with the least amount of measured energy. The gNB attempts detection over the sub-band/segment where the Msg1 from UE is received. Alternatively, the UE can simultaneously transmit PRACH over the non-adjacent sub-bands/segments that succeed in LBT, and the gNB attempts detection over the multiple sub-bands/segments where Msg1s from the UE are received.

6. Two-step Random Access Procedure Design for Beyond Rd-15 NR

Given the Msg1 format and waveform designs as specified in previous components, this component is focused on the procedure design for two-step random access of beyond Rel-15 NR. Specifically, this component focuses on the designs for Msg1 occasion configuration, random access response, and the overall 2-step random access procedure. By default, the designs in this component apply to the 2-step RA of NR unlicensed, unless otherwise mentioned in which some of the designs can apply to 4-step RA or NR in licensed.

A first design consideration is how the Msg1/RACH occasions (i.e., resources to transmit Msg1) are derived for the 2-step RA. In the 4-step RA procedure of Rel-15 NR, a UE can derive the time/frequency resource for its associated PRACH occasions through the higher layer parameters that the association between the SS/PBCH blocks and the PRACH occasions will be dependent on, such parameters can include SSB-perRACH-Occasion (i.e., number of SS/PBCH blocks associated with one PRACH occasion); msg1-FDM (i.e., number of FDM'ed PRACH occasions), msg1-frequency-start (i.e., offset of lowest PRACH occasion with respect to PRB 0), PRACHConfigurationIndex (i.e., the time-domain resource configuration for PRACH can be derived by mapping PRACHConfigurationIndex to PRACH configuration table). Through detecting these parameters from its detected SS/PBCH block and the pre-defined mapping rules of SS/PBCH block and PRACH occasions, the UE can determine its available PRACH occasions within an association period of SS/PBCH blocks to the PRACH occasions, which can be one or multiple PRACH configuration periods.

For 2-step RA of beyond Rel-15 NR, within an SS/PBCH block (SSB) to Msg1 occasion association period, one of the following approaches of how Msg1/RACH occasions (i.e., resources to transmit Msg1) are configured for 2-step RA can be utilized. In the following, the SSB to Msg1 occasion association period refers to one or multiple of the Msg1 configuration periods, such that the same mapping patterns from the SSBs to Msg1 occasion association will be repeated. For NR-U, the SSB to Msg1 occasion association period can be defined by assuming the LBT for SSB and LBT for Msg1 occasions are successful.

In a first approach of this component, UE is configured with a single Msg1 occasion, such that a UE detecting the SS/PBCH block can be associated with Msg1 resources on a per Msg1 occasion basis similar to Rel-15 NR; wherein the Msg1 is subject to LBT for NR-U. If LBT fails for the configured Msg1 occasion, a UE needs to wait until a next available Msg1 occasion that corresponds to a SS/PBCH block the UE selects and depends on an association rule between SS/PBCH block and Msg1 occasions. As a result, a transmission delay for Msg1 can be large due to failed LBT and therefore this approach, for either 2-step RA or 4-step RA, is more appropriate for lightly-loaded systems.

In one example of this approach, this can be achieved through the same mapping order of SS/PBCH block indexes to PRACH occasions as in Rel-15 NR, and possibly modifying or re-interpreting the higher layer parameters from Rel-15 NR to incorporate the Msg1 format of 2-step RA, and the LBT resource overhead for 2-step RA of NR-U.

In one sub-example, the time domain configurations for 2-step RA Msg1 can be determined from an Msg1ConfigurationIndex that maps to a time-domain configuration of Msg1 from an Msg1 configuration table, which is discussed in the section 2, while frequency domain configurations for 2-step RA Msg1 can be determined from an msg1-FDM according to the section 2. In addition, an SSB-perMsg1-Occasion can be introduced to indicate the number of time unit that contains each Msg1 occasion that an SS/PBCH block maps to, wherein the values of SSB-perMsg1-Occasion can be the same as Rel-15 NR (i.e., {1/8,1/4,1/2,1,2,4,8,16}) or different from Rel-15 NR; also the time unit that contains each Msg1 occasion can be each Msg1 occasion itself (e.g., for NR in licensed or when Msg1 occasion is fixed inside Msg1 slot), or the Msg1 slot(s) that can contain the Msg1 occasion when the Msg1 is configured with flexible starting OFDM symbol positions within the Msg1 slot(s) depending on the completion time of LBT (e.g., when CAT-4/CAT-3 LBT is used for Msg1).

In a second approach of this component, a burst of K>=1 Msg1 transmission occasions can be allocated together in time-domain to form an Msg1 occasion burst, wherein the number of Msg1 occasions within the burst can be K>=1.

Figure 24:
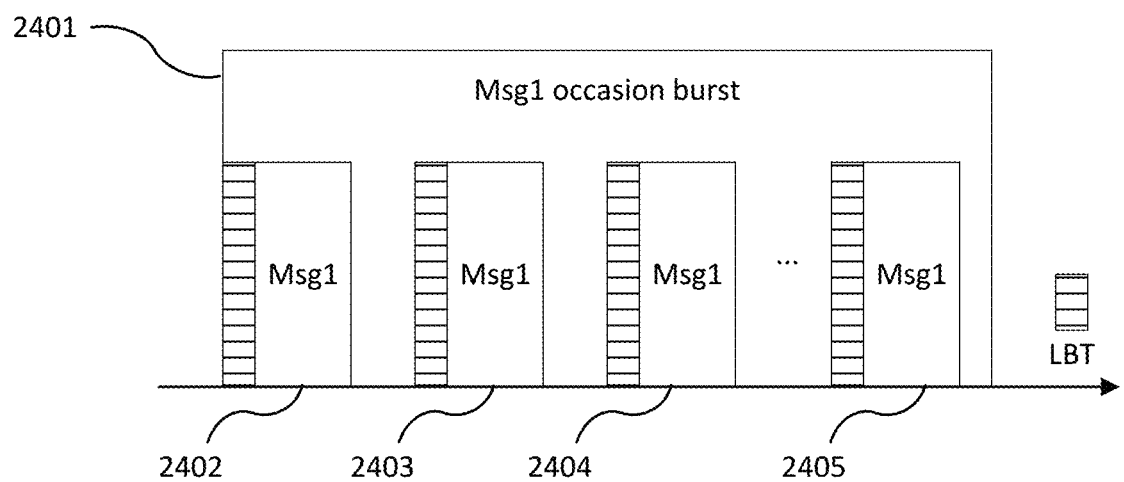
FIG. 24 illustrates an exemplary Msg1 occasion burst according to one embodiment of the present disclosure.

FIG. 24 illustrates an exemplary Msg1 occasion burst according to one embodiment of the present disclosure. The embodiment shown in FIG. 24 is for illustration only. Other embodiments could be used without departing from the scope of the present disclosure.

Within the Msg1 occasion burst 2401, a burst of K>=1 Msg1 occasions 2402-2405 are available for Msg1 transmissions (subject to LBT for NR-U), and all these Msg1 occasions 2402-2405 within the Msg1 occasion burst 2401 can be corresponding to a same SS/PBCH block (SSB); such that a UE detecting the SS/PBCH block can be associated with RACH resources on an Msg1 occasion burst basis.

The Msg1 occasion burst can be configured by allocating a burst of K>=1 Msg1 occasions associated with the actually transmitted SS/PBCH block(s) through one of the following examples.

In one example, 2-step RA for beyond Rel-15 NR can exploit the mapping between actually transmitted SS/PBCH blocks and the ROs specified in the first approach of this component, such that UE can be allocated multiple time-domain Msg1 occasions within an SSB to Msg1 association period. In one sub-example, this can be used when the number of available time-domain Msg1 occasions within an SSB to Msg1 association period is much larger than the number of actually transmitted within the period, such as when SSB-perMsg1-Occasion is less than 1. In another sub-example, the Msg1 occasions within an Msg1 occasion burst may not be consecutive in time-domain, which means for two neighboring Msg1s within the burst of Msg1 occasions allocated to a UE, there may exist Msg1(s) allocated to other UEs. In another sub-example, Msg1 occasion bursts can be FDM'ed in the frequency domain. For instance, the FDM'ed Msg1 occasion burst can be associated with the same SS/PBCH block, or different SS/PBCH blocks.

In another example, 2-step RA for beyond Rel-15 NR can map the burst of Msg1 occasions in K>=1 time-domain Msg1s consecutively; such that based on the higher layer parameters from the detected SSB and a SSB to Msg1 mapping rule, each time the UE can be associated with Msg1 resources on a basis of a burst of K>=1 consecutive time-domain Msg1s.

In one sub-example, in between two neighboring Msg1s within the same burst of Msg1 occasions allocated to a UE, there does not exist Msg1 allocated to other UEs.

In another sub-example, Msg1 occasion bursts can be FDM'ed in the frequency domain. For instance, the FDM'ed Msg1 occasion burst can be associated with the same SS/PBCH block, or different SS/PBCH blocks.

In another sub-example, within one SSB to Msg1 occasion association period, UEs associated with the actually transmitted SS/PBCH block(s) can be allocated one or multiple Msg1 occasion burst(s) to attempt Msg1 transmission.

In another sub-example, when mapping actually transmitted SSBs to Msg1 occasions, the time domain allocation of Msg1 occasions can be in the unit of K>=1 time-domain Msg1 occasions. This can be achieved by changing the mapping order from SSBs to Msg1 occasions, such that the time domain allocation of Msg1 occasions can be in the unit of K>=1 time-domain Msg1 occasions. For instance, the mapping order can be: first, in increasing order of preamble indexes for the K>=1 time-domain Msg1 occasions; second, in increasing order of frequency resource indexes for frequency multiplexed Msg1 occasions; third, in increasing order of time resource indexes for K>=1 time-domain Msg1 occasions within a number of $N_K$ Msg1 slots (e.g., the number $N_K$ is at least enough to contain K>=1 time-domain Msg1 occasions); fourth, in increasing order of indexes for the next $N_K$ number of Msg1 slots.

The Msg1 occasion burst can be utilized by both NR operations in licensed band and unlicensed band; and can be applied to both 2-step RA and 4-step RA. In one example, for NR-U, due to the uncertainty of LBT outcome, the Msg1 occasion burst can be utilized in increasing the probability for the UE to transmit the Msg1. In one sub-example, within an Msg1 occasion burst, the UE can attempt up to K>=1 times in transmitting the Msg1 for any LBT option of Msg1 (e.g., single-shot/CAT-3/CAT-4). In another sub-example, when LBT is CAT-4 or CAT-3, Msg1 occasion burst can also be utilized by the UE such that the LBT can start at the beginning of the Msg1 occasion burst, and the Msg1 occasion(s) after the time instance when LBT is completed within the Msg1 occasion burst can be utilized for transmitting Msg1. In another example, for 2-step RA, the Msg1 occasion burst can be used to increase the probability for a successful completion of 2-step RA.

In addition, for NR-U, one of the following Msg1 transmission behaviors for the UE within the Msg1 occasion burst can be used:

In one example, for NR-U, a UE can transmit at most one Msg1 within its configured Msg1 occasion burst subject to successful LBT, and the UE does not transmit in Msg1 occasions after an Msg1 transmission. When all Msg1 occasions fail LBT within the occasion burst, the UE waits until a next available Msg1 occasion burst to retry. This approach is beneficial in increasing a LBT success probability for a UE to transmit Msg1, controlling an interference from Msg1 transmissions among different UEs, and simplifying a RAR design. A tradeoff is that an overhead for Msg1 transmissions increases, especially considering that Msg1 occasions after an Msg1 transmission are not used. This approach can apply, for example, when a number of Msg1 occasions within a Msg1 occasion burst is not large (e.g., 2-4 occasions), or when a UE has beam-correspondence so that UE UL transmit beam-sweeping is not required.

In another example, a UE attempts to transmit in every Msg1 occasion within an Msg1 occasion burst, subject to successful LBT if NR operates in unlicensed bands. In one sub-example, at an Msg1 occasion, after a UE succeeds LBT and transmits Msg1, the UE can switch a transmit beam direction when the UE does not have beam-correspondence to facilitate UE UL transmit beam-training. In another sub-example, at an Msg1 occasion, after a UE succeeds LBT and transmits Msg1, the UE can continue to use a same transmit beam direction in case of beam-correspondence to increase a probability that a gNB correctly receives an Msg1 the UE transmits. In another sub-example, when a next PRACH occasion is still within the MCOT scheduled by a previous PRACH occasion and the two consecutive PRACH occasions are separated by at most the SIFS duration (e.g., 16 µs for 5 GHz band), the UE can skip LBT at the next PRACH occasion and transmit Msg1 without performing LBT. This method can increase a collision probability of Msg1 transmissions among different UEs within an Msg1 occasion.

In another example, when LBT fails on a Msg1 occasion within a Msg1 occasion burst, a UE can select one of the following options for the next available Msg1 occasion: (1) When there is beam correspondence at the UE, the UE can transmit again on the same beam direction in the next Msg1 occasion, subject to LBT for NR-U; (2) When there is not beam correspondence at the UE, the UE can either transmit again on the same beam direction in the next Msg1 occasion, or transmit on another beam direction in the next Msg1 occasion, subject to LBT for NR-U. Since adjacent Msg1 occasions are separated by a relatively short time interval, an interference level on a beam direction where the UE fails LBT is not likely to drop below the energy detection threshold in the next available Msg1 occasion. Therefore, when the UE does not have beam-correspondence, the UE can transmit Msg1 on a new beam direction in the next Msg1 occasion when the UE fails LBT in a current Msg1 occasion.

In another example, in different Msg1 occasions within the Msg1 occasion burst, the UE can select the PRACH preamble sequence in one of the following options: (1) UE selects same PRACH preamble sequence across the burst of Msg1 occasions; (2) UE selects different PRACH preamble sequences across the burst of Msg1 occasions, wherein the PRACH preamble sequence can be randomly re-selected.

After a UE has successfully transmitted Msg1 plus some additional time offset (e.g., zero or a few NR-U OFDM symbols), the UE starts attempting to detect a PDCCH with CRC scrambled by a UE RNTI for the 2-step RA, and receive a corresponding a random access response (RAR, or Msg2 equivalently) during a RAR window. To differentiate the nominal RA-RNTI from Rel-15 NR, the UE RNTI for receiving RAR in 2-step RA is referred to as RA2-RNTI in this disclosure. Within the RAR window, a gNB transmits a PDCCH scrambled with its detected RA2-RNTI and a corresponding RAR message (subject to LBT for NR-U) to the UE when the gNB successfully detects the RA preamble in an Msg1 transmitted from the UE. In another example, it is also possible for a PDSCH conveying a RAR to be transmitted without an associated PDCCH; for instance, a UE can directly attempt to decode a PDSCH conveying a RAR for a number of predetermined resource allocations or MCS that are indicated by a system information block, for example as part of the random access configuration setup.

One design consideration is how to determine the RA2-RNTI and what information can be carried in RA2-RNTI. In Rel-15 NR, the RA-RNTI is of 16 bits that can determine the radio resources that are used to transmit the PRACH, including the first OFDM symbol, the index of the first slot within a system frame, the index of PRACH in frequency domain (if PRACH occasions are FDM'ed), and whether PRACH is transmitted on nominal UL carrier supplemental UL carrier.

In one example which is applicable to NR operation in both unlicensed band and licensed band, for 2-step RA, the RA2-RNTI can be determined based on one or multiple of the following factors: (1) the radio resource (e.g., time/frequency and/or carrier) used to transmit PRACH part of Msg1; (2) the radio resource (e.g., time/frequency and/or carrier) used to transmit data part of Msg1; (3) the PRACH preamble sequence (e.g., the root and cyclic shift of PRACH); and (4) partial or all the UE-ID carried in data part of Msg1.

In one sub-example, the RA2-RNTI can be of 16 bits and only based on the radio resource used to transmit PRACH part of Msg1 (i.e., factor (1)) same as Rel-15 RA-RNTI.

In another sub-example, the RA2-RNTI can be based on the radio resource used to transmit both PRACH part and data part of Msg1, i.e., both factor (1) and factor (2). In one instance, the time resource for Msg1 can further depends on the format of Msg1, such as the number of repetitions of PRACH sequence in time domain. In another instance, for Msg1 in NR-U, the time/frequency resource used to transmit Msg1 can also be dependent on the result of LBT.

In another sub-example, the RA2-RNTI can be based on the radio resource used to transmit both PRACH part and data part of Msg1, i.e., both factor (1) and factor (2); as well as part or all of the UE-ID from Msg1. In one instance, the RA2-RNTI can be determined first from the radio resources to transmit Msg1 as a field RNTI_1 (e.g., of 16 bits); and then the UE-ID from Msg1 can be divided into multiple disjoint subsets, i.e., UE-ID=ID_1 ∪ ID_2 ∪ . . . ∪ ID_n, such that the RA2-RNTI can be determined as scrambling RNTI_1 with ID_1, ID_2, . . . , ID_k, with $1<=k<=n$. If $k<n$, the remaining UE-ID information can be carried in the RAR message.

In another sub-example, if the UE has already been assigned a C-RNTI, the UE-ID included in data part of Msg1 can be C-RNTI. In one instance, if RA2-RNTI is configured to be based on UE-ID, the C-RNTI can also be directly utilized by the UE as the RA2-RNTI.

In another sub-example, if the UE has not yet been assigned a C-RNTI, the UE-ID can be a contention resolution identity assigned by higher layer (e.g., UE contention resolution identity MAC CE with 48 bits). In one instance, if RA2-RNTI is configured to be based on UE-ID, part or all of the UE-ID can potentially be utilized in determining RA2-RNTI.

In another sub-example, the RA2-RNTI can be determined from a pre-defined or configurable mapping function/rule, which can map the factors that RA2-RNTI is based on to RA2-RNTI; and this mapping function/rule is common to both gNB and UE.

In another sub-example, if the UE can correctly detect PDCCH with CRC scrambled with its own RA2-RNTI, the UE can determine that the factor(s) that determine its RA2-RNTI is correctly received by gNB.

In another example, the RA2-RNTI can be of 16 bits same as the Rel-15 NR.

In yet another example, the RA2-RNTI can be more than 16 bits due to more factors in determining the RA2-RNTI compared to RA-RNTI of Rel-15 NR.

Another design consideration is the information to carry in the RAR, and one or multiple of the following examples can be carried in the RAR, which is applicable to both NR operation in licensed bands and unlicensed bands.

In one example, a RAR for 2-step RA can include one or multiple of the following fields similar to 4-step RA from Rel-15: RAPID (random access preamble ID), backoff indicator, UL grant, and timing advance command. In one sub-example, the RAPID identifies the PRACH preamble sequence (e.g., the root and cyclic shift of PRACH) that is transmitted in Msg1 same as Rel-15 NR; and RAPID may not be included in RAR if the PRACH preamble sequence is one of the factors in generating RA2-RNTI; or the MAC subheader for RAR only consists of backoff indicator. In another sub-example, the RAPID for 2-step RA can be determined from both the PRACH preamble sequence, and information within the data part.

In another example, for a 2-step random access, a RAR can also include the UE identity (UE-ID) in Msg1 or part of the UE-ID in Msg1, when Msg1 decoding is successful at gNB; otherwise, the UE-ID field can be empty or the gNB can transmit an explicit message (e.g., NACK) to indicate a failure of UE-ID detection in Msg1. In one sub-example, if part of the UE-ID is utilized in generating RA2-RNTI, the remaining UE-ID can be transmitted in the RAR; and if all the UE-ID is utilized in generating RA2-RNTI, the UE-ID may not be transmitted in the RAR. In another sub-example, if partial or all the UE-ID is utilized in generating RA2-RNTI, but the UE-ID cannot be uniquely determined from the RA2-RNTI (i.e., different UE-IDs can map to same RA2-RNTI), the entire UE-ID or the remaining UE-ID that cannot be uniquely determined from the RA2-RNTI needs to be transmitted in RAR.

In another example, if a C-RNTI is not yet assigned to the UE, a temporary UE identity (e.g., TC-RNTI) can be carried in RAR and UE can change this temporary UE identity into C-RNTI after the RAR is correctly received. In one sub-example, the temporary UE identity can be explicitly transmitted in the RAR message. For instance, the TC-RNTI can be of 16 bits same as Rel-15 NR. In another sub-example, the temporary UE identity can be implicitly determined by mapping all or a subset of {UE-ID, RAPID, RA2-RNTI} into a temporary UE identity through a predefined or configurable function, which is common to both gNB and UE. For instance, this function can map a 48 bits UE-ID into a 16 bits TC-RNTI that is unique or at least unique to address UE in the cell. In another sub-example, the temporary UE identity can be jointly determined by all or a subset of {UE-ID, RAPID, RA2-RNTI}, as well as some other information carried in RAR, through a predefined or configurable function common to gNB and UE, such that the corresponding temporary UE identity can uniquely identify the UE. In another sub-example, if C-RNTI is already assigned to the UE, the UE can continue to use the C-RNTI if the RAR is correctly received.

Another design information is how to determine the 2-step RA is successful.

In one example, for both NR operations in licensed bands and unlicensed bands, the 2-step RA is considered successful if after successfully transmitting a Msg1, the UE can detect/receive the following information from the gNB, such that the information detected/received from the gNB is the same as that corresponds to the transmitted Msg1: (1) the radio resource (e.g., time/frequency and/or carrier and/or spatial filter) that the UE used to transmit the Msg1; which can be either the PRACH part of a Msg1, or both PRACH part and data part of a Msg1; and (2) the PRACH preamble sequence (e.g., the root and cyclic shift of PRACH) of the Msg1; and (3) the UE-ID carried in the data part of the Msg1.

In one sub-example, the required information to determine if 2-step RA is successful, can be derived by the UE, through being able to detect PDCCH scrambled with a correct RA2-RNTI that corresponds to a transmitted Msg1, and the information from corresponding RAR, such as RAPID and all or a subset of the UE-ID if they are configured.

In another sub-example, in response to a successful 2-step RA, the UE can promote the temporary UE identity to C-RNTI and respond to gNB the HARQ-ACK information through PUCCH/PUSCH.

In another sub-example, if any of the information is in-correct or missing (e.g., RA2-RNTI is not detected within RAR monitoring window), the 2-step random access process that corresponds the transmitted Msg1 is considered unsuccessful, and further actions by the UE/gNB depends on the configuration of Msg1 and Msg2. These 2-step RA RAR design related aspects, such as the Msg1 and RAR transmission occasions, and UE behavior upon reception of the RAR are subsequently specified.

Another design consideration is the LBT type for granting RAR transmission of NR-U. Note the PDCCH scheduling the RAR and the corresponding RAR message can either be transmitted within the same NR-U slot, or the NR-U gNB can schedule downlink transmissions consecutively such that no separate LBT processes will be needed in granting the transmission of the PDCCH scheduling the RAR and the corresponding RAR message. Therefore, in one example, the PDCCH scheduling the RAR and the corresponding RAR message (in PDSCH) can be subject to the same LBT process.

In one example, this single-shot LBT can be of PIFS duration (e.g., 25 µs in 5 GHz unlicensed band).

In another example, LBT for the PDCCH scheduling the RAR and the corresponding RAR message can be subject to a CAT-4 based LBT with a variable contention window size, and the PDCCH scheduling the RAR and the corresponding RAR message can be transmitted if the CAT-4 LBT is completed within certain time duration, which can be the RAR window. In one sub-example, this CAT-4 LBT can be of high LBT priority class.

In another example, LBT for the PDCCH scheduling the RAR and the corresponding RAR message can be subject to a CAT-3 based LBT, which has fixed contention window size.

In addition, the actual LBT type for RAR message can be chosen as follows.

In one example, the LBT type and corresponding parameters for each RAR message can be fixed in the specification.

In one example, the LBT type and corresponding parameters for each RAR message can be configurable to single-shot LTE or CAT-4 LBT or CAT-3 LBT at a given time, such as through system information or higher layer parameter.

In another example, the LBT type for each RAR message can also be flexible. In one sub-example, this can depend on the LBT type for Msg1; such that if Msg1 is transmitted using CAT-3 or CAT-4 LBT, and RAR message is scheduled within the MCOT corresponds to Msg1 LBT, the LBT for RAR can be single-shot LBT; otherwise the LBT for RAR can be CAT-3 or CAT-4.

In the following, for simplicity and without loss of generality, a RAR message is referred to as both the PDSCH conveying the RAR and the corresponding PDCCH scheduling the RAR.

Another design consideration is the number of RAR occasions that gNB transmits in response to the Msg1(s) from a UE received by the gNB, wherein a RAR occasion refers to the radio resources (e.g., time/frequency resource) that RAR message will be transmitted at.

In one example, when UE is either configured with an Msg1 occasion burst or UE is configured with a single Msg1 occasion, gNB can transmit in only one RAR occasion in response to the one of the detected Msg1(s). For NR-U, the gNB can transmit the RAR message if the LBT process for RAR is completed in time for the RAR message to be transmitted within the RAR window that UE monitors; while if the current LBT process for RAR message fails (e.g., single-shot LBT), the gNB can re-attempt the LBT process to transmit the RAR message (e.g., in next slot), such that the LBT process for gNB can be completed in time for the RAR message to be transmitted within the RAR window. In one sub-example, when UE is configured with an Msg1 occasion burst, this option can be used when at most 1 Msg1 occasion is transmitted within the Msg1 occasion burst.

Figure 25:
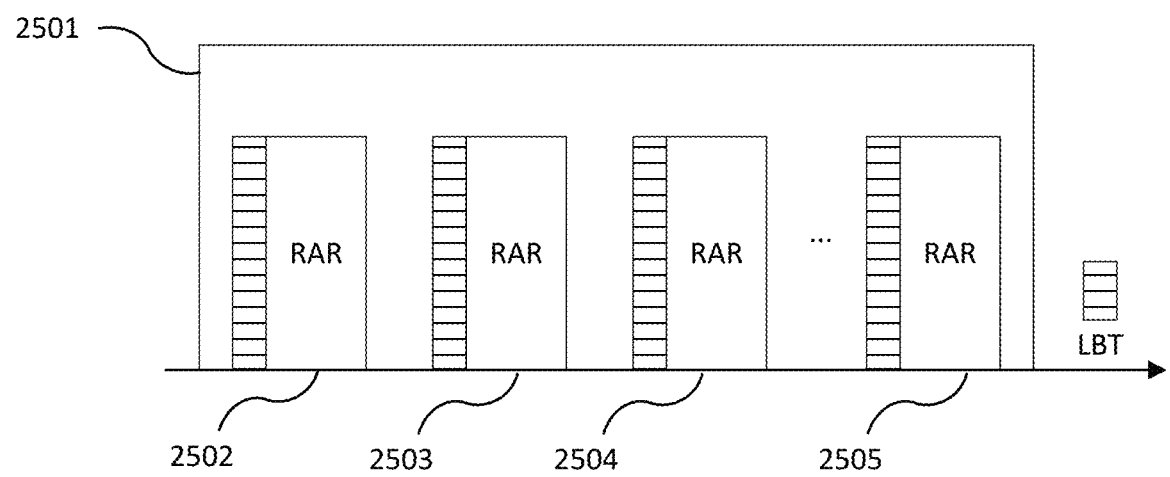
FIG. 25 illustrates an exemplary RAR occasion in response to the detected Msg1(s) from the Msg1 occasion burst according to one embodiment of the present disclosure.

FIG. 25 illustrates an exemplary RAR occasion in response to the detected Msg1(s) from the Msg1 occasion burst according to one embodiment of the present disclosure. The embodiment shown in FIG. 25 is for illustration only. Other embodiments could be used without departing from the scope of the present disclosure.

In another example, when UE is configured with an Msg1 occasion burst, gNB can transmit in up to N>=1 RAR occasion in response to the detected Msg1(s) from the Msg1 occasion burst. As illustrated in FIG. 25, there are N>=1 occasions 2502-2505 for RAR transmission in response to an Msg1 occasion burst, with each RAR occasion subject to LBT for NR-U.

In one sub-example, having a maximum of N>=1 RAR occasions in response to an Msg1 occasion burst can be utilized to transmit multiple (up to N) RAR messages within the RAR window(s) that UE monitors. For instance, if UE transmits multiple Msg1s within the Msg1 occasions burst, the gNB can utilize the N RAR occasions 2502-2505 within the RAR window(s) to transmit the corresponding RAR message to the UE. The details for RAR window will be detailed later in timing relation between Msg1 transmission and RAR window.

In another sub-example, having N>=1 RAR occasions for the gNB can be utilized to increase a probability for successful completion of a 2-step RA. Specifically, when the gNB does not successfully decode both preamble and UE-ID simultaneously for each Msg1 of a 2-step RA, a corresponding RAR message transmission from the gNB does not result to a successful 2-step RA. Therefore, in order to increase a probability for successful completion of a 2-step RA, the gNB can transmit multiple RAR messages. For instance, when the gNB receives multiple Msg1s, the gNB transmits respective RAR messages (subject to LBT) in a sequential order relative to the received Msg1s. Using a RA2-RNTI determined from a resource of a detected Msg1 occasion, the gNB can implicitly indicate to the UE the Msg1 corresponding to the RAR message from the gNB. In addition, the gNB can suspend RAR transmissions within the RAR window until the gNB transmits a RAR message that corresponds to both successfully decoded preamble and UE-ID for 2-step RA, or a RAR message that corresponds to a correctly detected preamble for 4-step RA.

Figure 26:
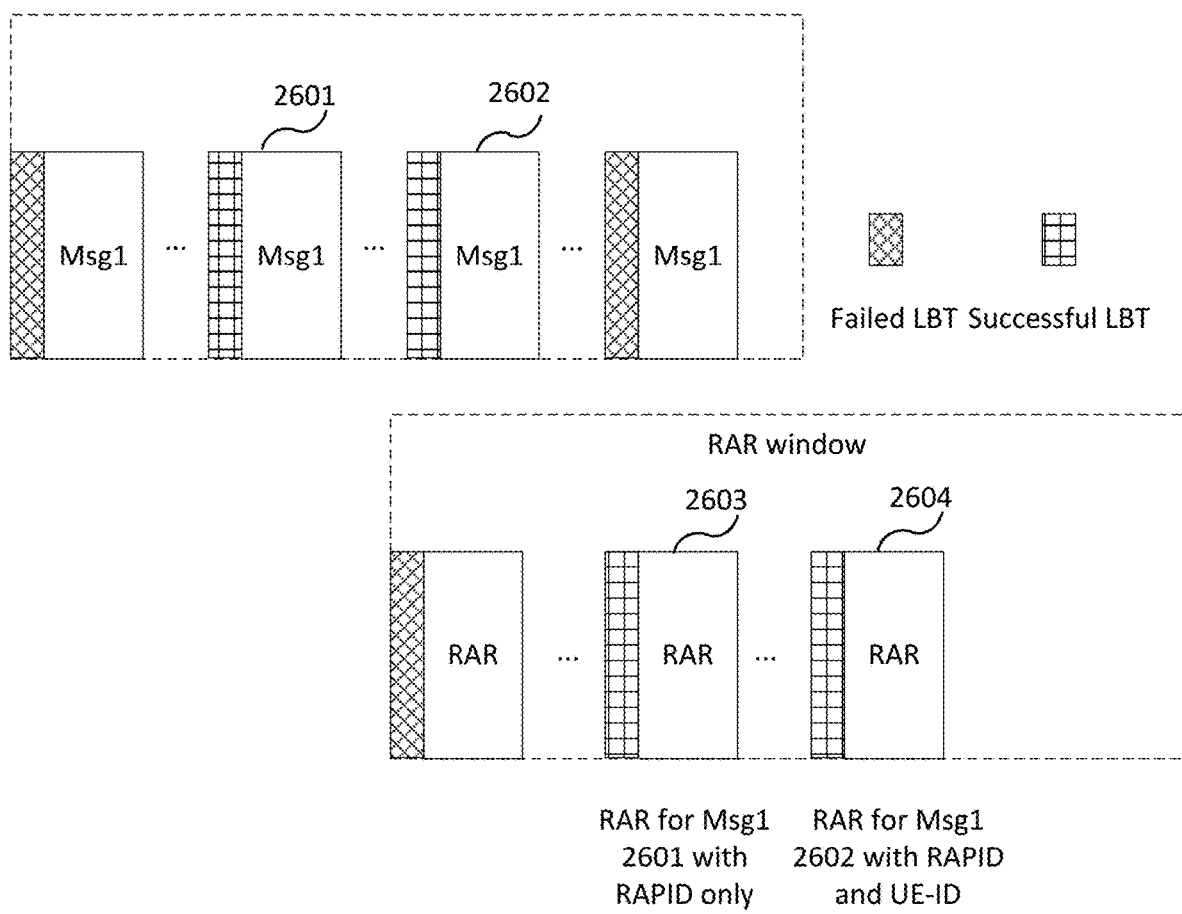
FIG. 26 illustrates an exemplary Msg1 detection occasions according to one embodiment of the present disclosure.

FIG. 26 illustrates an exemplary Msg1 detection occasions according to one embodiment of the present disclosure. The embodiment shown in FIG. 26 is for illustration only. Other embodiments could be used without departing from the scope of the present disclosure.

As illustrated in FIG. 26, a gNB detects only a preamble for Msg1 occasion 2601 with the corresponding RAR message 2603 that includes a RAPID only and detects both preamble and UE-ID for Msg1 occasion 2602 for a 2-step RA with the corresponding RAR message in 2604 that includes both RAPID and UE-ID.

In another sub-example, having N>=1 RAR occasions for the gNB can be utilized to increase a probability for successful transmission of a RAR in response to Msg1, and correspondingly probability for the UE to receive a RAR message. For instance, after the gNB receives an Msg1 from the UE, the gNB can attempt up to N LBT attempts 2502-2505 to transmit RAR messages, which increases the probability for the UE to receive a correct RAR message. This sub-example can be applied regardless if the Msg1 occasion burst is used or not. For instance, the gNB transmits RAR (subject to LBT) that corresponds to the first Msg1 that the gNB receives from a UE. The gNB transmits the RAR message when a respective LBT succeeds. The gNB does not utilize remaining RAR occasions. Otherwise, when the LBT fails, the gNB can attempt to transmit the RAR message in the next RAR occasion, until LBT succeeds so that the gNB transmits the RAR message, or until the gNB fails LBT in all RAR occasions within the RAR window(s) that UE monitors.

Figure 27:
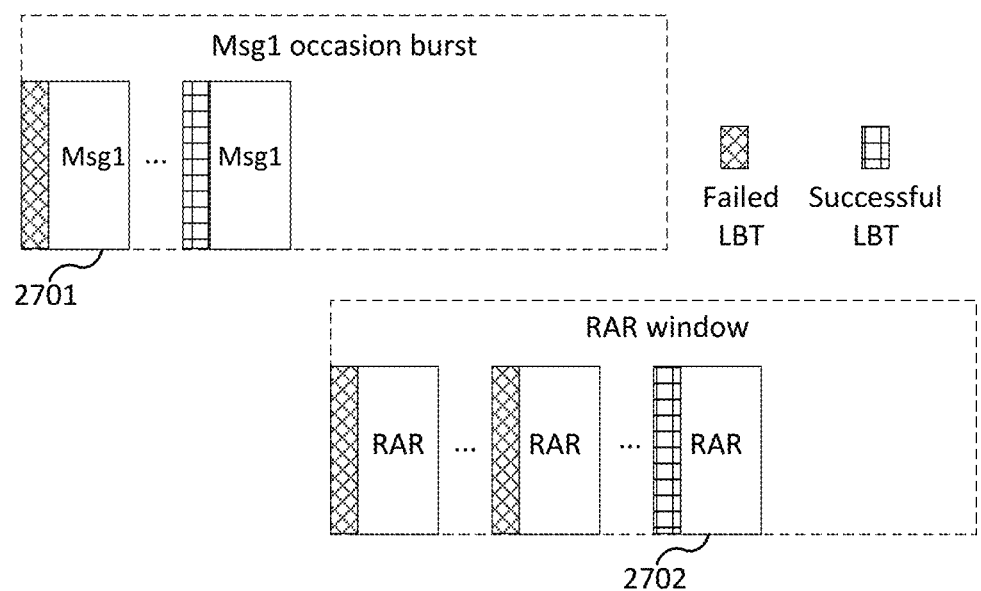
FIG. 27 illustrates another exemplary Msg1 detection occasions according to one embodiment of the present disclosure.

FIG. 27 illustrates another exemplary Msg1 detection occasions according to one embodiment of the present disclosure. The embodiment shown in FIG. 27 is for illustration only. Other embodiments could be used without departing from the scope of the present disclosure.

As shown in FIG. 27, a UE fails to transmit Msg1 within the Msg1 occasion burst until it succeed in LBT to transmit Msg1 in occasion 2701, and a gNB fails to respond a RAR message after it receives Msg1 2701, until the gNB succeeds in LBT to transmit the RAR message to the UE in occasion 2702 within the RAR window. The RAR occasions within the RAR window after 2702 are not utilized.

In another sub-example, the maximum number of RAR occasions N>=1 can either be fixed by specification, or configured through system information, or configured through higher layer parameter, or can be the same as the number of configured Msg1 occasions within the Msg1 occasion burst.

In another sub-example, the actual number of RAR occasions and corresponding radio resource for the transmitted RAR occasion within a RAR window can be flexible, which will depend on the LBT type for each RAR and its corresponding completion time instance for each RAR.

In another sub-example, a RAR window length with N>1 can be extended compared to N=1 and the UE can attempt to receive a RAR message within the RAR window for a longer time than for N=1.

When a UE detecting the SS/PBCH block can be associated with RACH resources on an Msg1 occasion burst basis, i.e., multiple Msg1 transmission occasions are allowed within an Msg1 occasion burst, the following timing relation between Msg1 transmission and RAR window can apply.

In one example, a single RAR window can apply after a UE transmits a first Msg1 subject to LBT. The UE starts to attempt to receive the RAR message within the RAR window after the first successful Msg1 occasion, and the UE can transmit Msg1 in other Msg1 occasions within the Msg1 occasion burst before the RAR window ends. In one sub-example, the gNB can either transmit RAR in up to one RAR occasion within the single RAR window; or transmit multiple RAR messages in multiple RAR occasions within the single RAR window.

In another example, the UE monitors a separate RAR window for every Msg1 the UE transmits within the Msg1 occasion burst subject to successful LBT. In one sub-example, the gNB can transmit up to one RAR message within the single RAR window; and multiple RAR occasions (up to the number of Msg1 configured within a Msg1 occasion burst) can be transmitted by the gNB in respond to its detected Msg1(s) from the Msg1 occasion burst.

The previous two examples are applicable to both 2-step RA and 4-step RA.

FIGS. 28A and 28B illustrate exemplary timing relations between Msg1 transmission and RAR window according to embodiments of the present disclosure. The embodiments shown in FIGS. 28A and 28B are for illustration only. Other embodiments could be used without departing from the scope of the present disclosure.

FIG. 28A illustrates that a single extended RAR window 2801 corresponding to the transmitted Msg1s 2802-2803 is applied in option 1. FIG. 28B illustrates that a separate RAR window 2806-2807 that corresponds to each transmitted Msg1 2804-2805 respectively is applied in option 2. In another example, applicable to previous two examples, the RAR window duration can be extended from Rel-15 NR, such as to incorporate the effect of LBT. In one sub-example, the maximum supported RAR window length can be increased to be larger than 80 NR-U U slots, such as 100, 160, 200, or 320 slots, etc. In another sub-example, the maximum supported RAR window length in millisecond can be increased to be greater than 10 ms, such as $10 \times 2/\!\sqrt{}$ ms with u>0.

In addition, when multiple Msg1s are transmitted within the Msg1 transmission burst, UE can use one of the following options for the beam direction in receiving the RAR.

In one example, when multiple Msg1s are transmitted within the Msg1 occasion burst, and the multiple transmitted Msg1s are using as the same transmit beam direction by the UE, the UE can detect the corresponding RAR(s) using the same beam direction within the RAR window.

In another example, when UE supports hybrid beamforming, then UE can detect the RAR over multiple beam directions simultaneously within the monitored RAR window(s); wherein each receive beam direction can correspond to the beam direction that UE used to transmit an Msg1 within the Msg1 occasion burst.

In another example, if UE only supports analog beamforming and can receive through only one beam direction at a time; then UE can detect the RAR using an omnidirectional beam or quasi-omni-directional beam within the monitored RAR window(s).

In another example, if UE only supports analog beamforming and can receive through only one beam direction at a time; then at a given time within the monitored RAR window(s), UE can detect the RAR through only one receive beam direction that corresponds to one of the transmit beam directions it used in transmitting an Msg1 within the Msg1 occasion burst; and UE can switch to another receive beam direction if one RAR message has been detected.

In another example, for all the examples above of UE receiving beam directions for RAR(s), if a RAR message is correctly detected, the UE can know which transmitted Msg1 the RAR message corresponds to, through detecting from the detected RAR message which radio resource (e.g., time/frequency and/or carrier and/or spatial filter) for the Msg1 that the RAR corresponds to.

Given the potential support of both Msg1 occasion burst and multiple RAR occasions for gNB, UE can use of the following options in receiving RAR.

In one example, UE can assume a single RAR transmission and the UE stops monitoring for RAR once the UE detects any RAR message for the UE. This can apply to both when a UE transmits a single Msg1 and when the UE transmits multiple Msg1 within an Msg1 occasion burst. In addition, when UE transmits multiple Msg1s within an Msg1 transmission burst and monitors a separate RAR window for each transmitted Msg1, after UE has detected a first RAR from one of the monitored RAR windows, the UE does not monitor for RAR in other RAR window(s).

In another example, UE can assume a single RAR transmission within a RAR window and the UE does not monitor the RAR window once the UE detects a RAR message for the UE. This can apply to both when a UE transmits a single Msg1 and when the UE transmits multiple Msg1 within an Msg1 occasion burst. In addition, when UE transmits multiple Msg1s within an Msg1 transmission burst and monitors a separate RAR window for each transmitted Msg1, after UE has detected RAR from one monitored RAR window, the UE can still monitor for RAR in other RAR window(s).

In another example, in case of multiple Msg1 transmissions within an Msg1 occasion burst, the UE can continue to monitor its RAR window until either the UE detects a RAR message that corresponds to its Msg1 such that a successful 2-step RA can be achieved; or UE detects a RAR that corresponds to correct information of PRACH preamble radio resource and PRACH sequence, such that a fallback to 4-step RA is available (which will be detailed later); or the end of the RAR window is reached. This can apply to when UE monitors a single extended RAR window; or a separate RAR window for each transmitted Msg1, wherein this example applies to each of the monitored RAR window of the UE. This example leads to a longer monitoring period for the RAR window(s) with larger power consumption at the UE but also to larger probability for successful random access.

For a 2-step RA wherein a UE transmits both preamble sequence and UE-ID in Msg1, the following scenarios can apply at a gNB when the gNB receives an Msg1 from the UE.

In one example, the gNB successfully detects both PRACH preamble part and UE-ID part of the Msg1, and therefore the gNB transmits in a RAR (including the PDCCH scrambled by RA2-RNTI and corresponding PDSCH) that contains the information regarding the radio resource, the PRACH preamble sequence and the UE-ID that the gNB obtained from the detected Msg1.

In another example, the gNB detects the preamble part but fails to detect the UE-ID part of the an Msg1, and correspondingly the gNB can transmit in a RAR that contains the information regarding the radio resource and PRACH preamble sequence of the detected Msg1. In addition, gNB can implicitly indicate incorrect decoding of the UE-ID by not including the detected UE-ID information in the RAR, or the gNB transmits an explicit UE-ID decoding failure message (e.g., an NACK) in the RAR.

In another example, the gNB fails to detect the preamble and the gNB does not transmit a RAR.

At the UE side, after the UE successfully transmitted Msg1(s), the UE expects to detect/receive the following information from a RAR that corresponds to its transmitted Msg1(s): (1) the radio resource (e.g., time/frequency and/or carrier and/or spatial filter) that the UE used to transmit the Msg1; which can be either the PRACH part of a Msg1, or both PRACH part and data part of a Msg1; and this can conveyed through the RA2-RNTI; and (2) the PRACH preamble sequence (e.g., the root and cyclic shift of PRACH) of the Msg1, which can be conveyed through the RAPID from RAR message, or the RA2-RNTI; and (3) the UE-ID carried in the data part of the Msg1, and this can be conveyed through the RA2-RNTI, or the RAR message. The following scenarios and corresponding UE behaviors are possible, after UE has detected a RAR message within the monitored RAR window; note RAR message refers to both the PDCCH which is scrambled with RA2-RNTI that schedules the RAR, and the corresponding PDSCH which conveys the RAR.;

In a first example, which is referred to as scenario 1, UE detects a RAR message that contains the correct information of the radio resource, PRACH preamble sequence, and UE-ID of a transmitted Msg1.

In one sub-example, the 2-step RA is successful in this case. The UE can establish RRC connection and UL synchronization with the gNB. Furthermore, the UE can promote the TC-RNTI into C-RNTI if C-RNTI is not available yet, and transmits a HARQ-ACK in response to the correctly received RAR. This is referred to as UE action 1.

In a second example, which is referred to as scenario 2, UE detects a RAR message that contains the correct information of the radio resource and PRACH preamble sequence, but not the corresponding UE-ID of a transmitted Msg1. This scenario occurs when the RA2-RNTI is correctly detected; and the UE-ID information is either un-detected from RAR, or that at least part of the UE-ID information from the detected RAR message does not match with the actual UE-ID that UE transmitted in Msg1.

In one sub-example, the UE can select a random access preamble and transmit the Msg1 in the next available Msg1 occasion, which can possibly be in the next Msg1 occasion burst. For instance, if the Msg1 retransmission occurs within the same Msg1 occasion burst, the UE can either use the same PRACH preamble, or randomly re-select another PRACH preamble; while when the Msg1 retransmission occurs outside the Msg1 occasion burst, the UE can randomly select another PRACH preamble. This is referred to as UE action 2.

In another sub-example, the UE can continue monitoring the RAR window(s) until the UE receives a RAR message that corresponds to its correct UE-ID, radio resource and PRACH preamble sequence of Msg1; or until the end of RAR window(s) is reached. This sub-example is suitable when the UE can transmit multiple Msg1s within an Msg1 occasion burst and can result to smaller RA delay but also to larger UE power consumption at UE since the UE needs to monitor RAR for a longer time period. In addition, this sub-example can also be applied to when UE monitors a separate RAR window for each transmitted Msg1 occasion, in which case the UE can continue monitoring all its RAR windows, until the end of the all the monitored RAR windows corresponding to the Msg1 occasion burst is reached. This is referred to as UE action 3.

In another sub-example, the UE can fall back to a 4-step RA procedure and transmit (subject to LBT) the UE-ID in Msg3. The Msg3 and Msg4 transmissions will follow similar procedure as Rel-15 NR but subject to LBT before each transmission, wherein the UE-ID will be transmitted by the UE in Msg3, and the gNB detected UE-ID will be responded in Msg4. The fallback 4-step RA procedure is successful if the gNB detected UE-ID in Msg4 matches the UE-ID in Msg3, in which case the UE will transmit HARQ-ACK in respond to the detected Msg4; otherwise the random access process will be re-initiated. This is referred to as UE action 4.

In a third example, which is referred to as scenario 3, UE detects a RAR message that contains the correct information of the radio resource, but not the corresponding PRACH preamble sequence of a transmitted Msg1 and the corresponding UE-ID. This scenario occurs when the RA2-RNTI is detected; and the PRACH preamble sequence information is undetected or is detected from the RAR message (e.g., RAPID) but does not match with the actual PRACH sequence that UE transmitted in Msg1; and the UE-ID is undetected or at least part of the UE-ID information from the detected RAR message does not match with the actual UE-ID that UE transmitted in Msg1. Therefore, the received RAR may be intended to another UE.

In one sub-example, the UE can follow UE action 2, such that it selects a random access preamble and transmit the Msg1 in the next available Msg1 occasion.

In another sub-example, the UE can follow UE action 3, such that the UE can continue monitoring the RAR window(s) until the UE receives a RAR message that corresponds to its correct UE-ID, radio resource and PRACH preamble sequence of Msg1; or until the end of RAR window(s) is reached.

In a forth example, which is referred to as scenario 4, UE detects a RAR message that contains the correct information of the radio resource and the corresponding UE-ID, but not the corresponding PRACH preamble sequence of a transmitted Msg 1. This scenario occurs when the RA2-RNTI is correctly detected, but the PRACH preamble sequence information is either undetected from the RAR, or the PRACH preamble sequence information from the detected RAR message (e.g., RAPID) does not match with the actual PRACH sequence that UE transmitted in Msg1. Since PRACH preamble sequence is not correctly detected, the corresponding estimated timing advance value can be incorrect.

In one sub-example, the UE can follow UE action 2, such that it selects a random access preamble and transmit the Msg1 in the next available Msg1 occasion.

In another sub-example, the UE can follow UE action 3, such that the UE can continue monitoring the RAR window(s) until the UE receives a RAR message that corresponds to its correct UE-ID, radio resource and PRACH preamble sequence of Msg1; or until the end of RAR window(s) is reached.

In a fifth example, which is referred to as scenario 5, UE detects a RAR message that contains the correct information of the corresponding PRACH preamble sequence and the UE-ID, but not the radio resource of a transmitted Msg1. This scenario occurs when RA2-RNTI does not depend on the radio resource of a transmitted Msg1, and RA2-RNTI is correctly detected; and the radio resource information of the transmitted Msg1 from the RAR is either undetected, or does not have a match with that of UE transmitted Msg1. Since Msg1 radio resource is not correctly detected, the detected RAR may be intended to Msg1 transmitted by another UE.

In one sub-example, the UE can follow UE action 2, such that it selects a random access preamble and transmit the Msg1 in the next available Msg1 occasion.

In another sub-example, the UE can follow UE action 3, such that the UE can continue monitoring the RAR window(s) until the UE receives a RAR message that corresponds to its correct UE-ID, radio resource and PRACH preamble sequence of Msg1; or until the end of RAR window(s) is reached.

In a sixth example, which is referred to as scenario 6, UE detects a RAR message that contains the correct information of the corresponding PRACH preamble sequence, but not the radio resource and the corresponding UE-ID of a transmitted Msg1. This scenario occurs when the RA2-RNTI depends on the PRACH preamble sequence.

In one sub-example, the UE can follow UE action 2, such that it selects a random access preamble and transmit the Msg1 in the next available Msg1 occasion.

In another sub-example, the UE can follow UE action 3, such that the UE can continue monitoring the RAR window(s) until the UE receives a RAR message that corresponds to its correct UE-ID, radio resource and PRACH preamble sequence of Msg1; or until the end of RAR window(s) is reached.

In a seventh example, which is referred to as scenario 7, UE detects a RAR message that contains the correct information of the corresponding UE-ID, but not the radio resource and the corresponding PRACH preamble sequence of a transmitted Msg1. This scenario occurs when the RA2-RNTI only depends on the UE-ID.

In one sub-example, the UE can follow UE action 2, such that it selects a random access preamble and transmit the Msg1 in the next available Msg1 occasion.

In another sub-example, the UE can follow UE action 3, such that the UE can continue monitoring the RAR window(s) until the UE receives a RAR message that corresponds to its correct UE-ID, radio resource and PRACH preamble sequence of Msg1; or until the end of RAR window(s) is reached.

In an eighth example, which is referred to as scenario 8, UE does not detect a RAR message. This scenario occurs when the PDCCH scrambled with RA2-RNTI is not detected within the RAR window by the UE.

In one sub-example, If UE only monitors a single RAR window, or UE monitors multiple RAR windows for the Msg1 occasion burst but the end of last monitored RAR window is reached, the 2-step RA for a respective Msg1 or Msg1 occasion burst fails; and the UE can again apply a 2-step RA at the next available Msg1 occasion burst. In particular, in the next Msg1 occasion burst, the UE can use the same TX beam or a different TX beam as in the previous Msg1 occasion burst, and/or different transmit power for Msg1 by continuing a power ramping between successive Msg1 transmissions unless the UE has reached a maximum transmission power. This is referred to as UE action 5.

In another sub-example, If UE monitors multiple RAR windows for the Msg1 occasion burst, and the end of one of its monitored RAR windows except for the last monitored RAR window is reached, the UE continues to monitor the remaining RAR window(s) until a RAR message is detected; otherwise it will follow the UE action 5. This is referred to as UE action 6.

In another example, for each scenario, either one UE action can be selected; or different UE actions can be used in combination. In one sub-example, the UE action selection can be fixed by specification; or configurable through system information, DCI, or higher layer parameters. For instance, for scenario 2, the UE action 3 can be the preferred option, after which either UE action 2 or UE action 4 can be performed by the UE.

Given the above design options for a RAR transmission by a gNB, the following examples illustrate a specific instances when the RA2-RNTI is determined from the radio resource of the transmitted Msg1, and the RAR message further contains (in PDSCH) the information of detected PRACH preamble sequence from Msg 1 through the RAPID, and the detected UE-ID from the Msg1, and UE monitors for a single extended RAR window.

Figure 29:
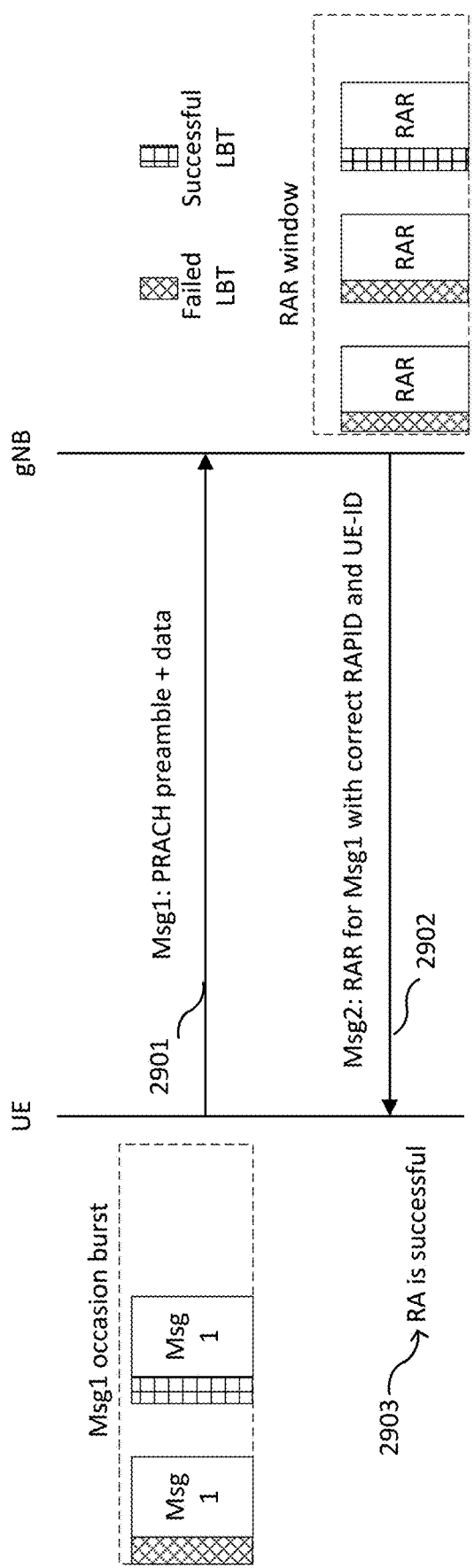
FIG. 29 illustrates an exemplary flowchart for the 2-step RA process according to one embodiment of the present disclosure.

FIG. 29 illustrates an exemplary flowchart for the 2-step RA process according to one embodiment of the present disclosure. The embodiment shown in FIG. 29 is for illustration only. Other embodiments could be used without departing from the scope of the present disclosure.

As illustrated in FIG. 29, the UE detects a RAR message 2902 with a correct RAPID and a correct UE-ID. In this case, the 2-step RA is successful and the UE can establish RRC connection and UL synchronization with the gNB. Furthermore, the UE promotes the TC-RNTI into C-RNTI and transmits a HARQ-ACK in response to the correctly received RAR. In general, the UE behavior of this example can be extended to apply to scenario 1.

In one example, the UE detects a RAR message with a correct RAPID and an incorrect UE-ID, or UE detects a RAR message with only a correct RAPID. This event can occur when a gNB correctly detects a preamble transmission by the UE, but fails to correctly decode the UE-ID, such as due to an error at the gNB in decoding UE-ID when the gNB receives a Msg1 from the UE, or due to a second UE transmitting Msg1 using a same RA preamble sequence as the UE and the gNB detecting the Msg1 from the second UE; such that the UE receives from RAR either an explicit message that indicates failure by the gNB to detect the UE-ID, or the UE-ID field is missing from RAR.

Figure 30:
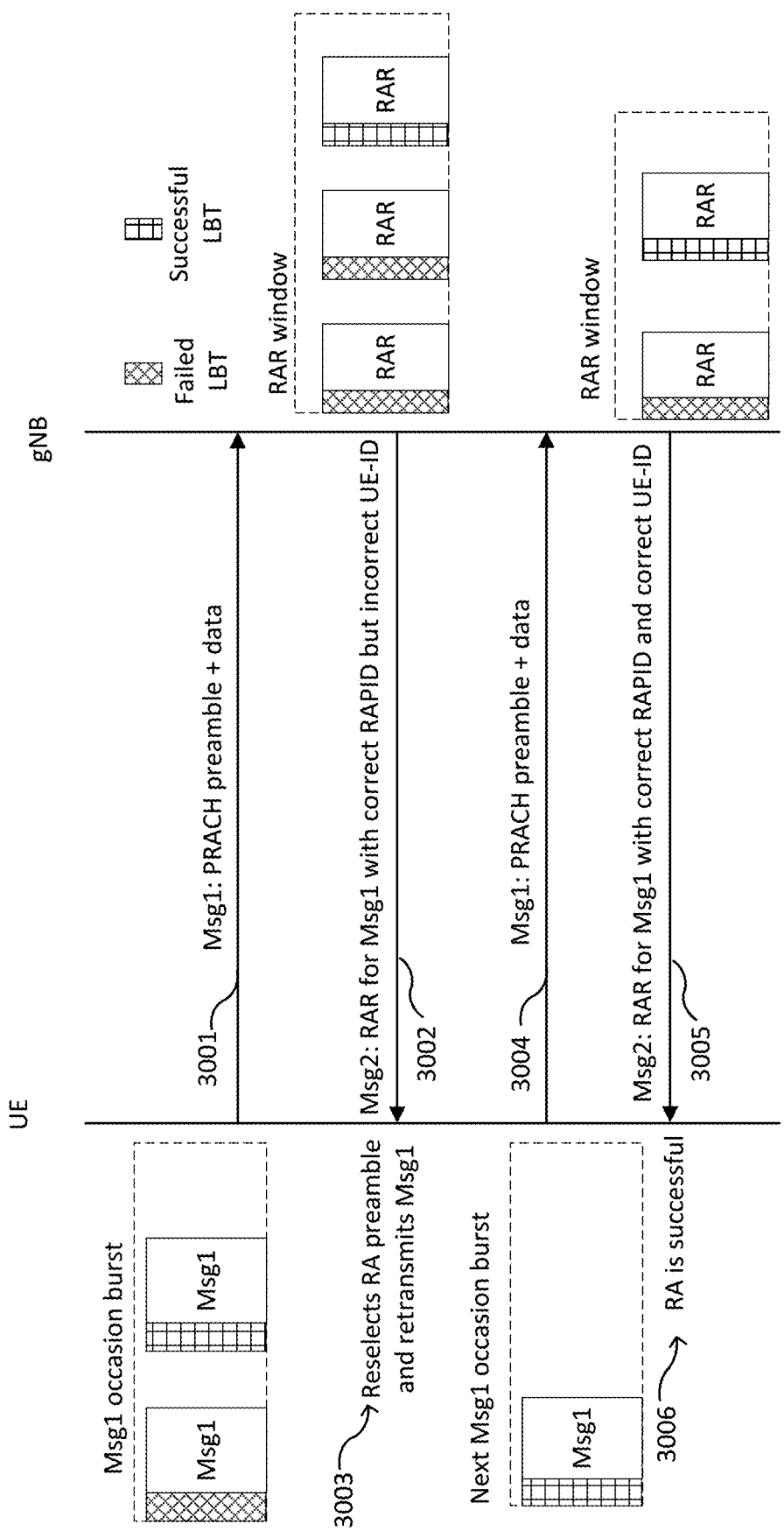
FIG. 30 illustrates another exemplary flowchart for the RA process according to one embodiment of the present disclosure.

FIG. 30 illustrates another exemplary flowchart for the RA process according to one embodiment of the present disclosure. The embodiment shown in FIG. 30 is for illustration only. Other embodiments could be used without departing from the scope of the present disclosure.

As illustrated in FIG. 30, a UE detects a RAR message with a correct RAPID and an incorrect UE-ID 3002. The UE can select a random access preamble 3003 and transmit the Msg1 in the next available Msg1 occasion 3004, which can possibly be in the next Msg1 occasion burst, i.e., UE action 2.

The UE can continue monitoring the RAR window(s) until the UE receives a RAR message that corresponds to its RAPID and UE-ID, or until the end of RAR window(s) is reached, i.e., UE action 3.

Figure 31:
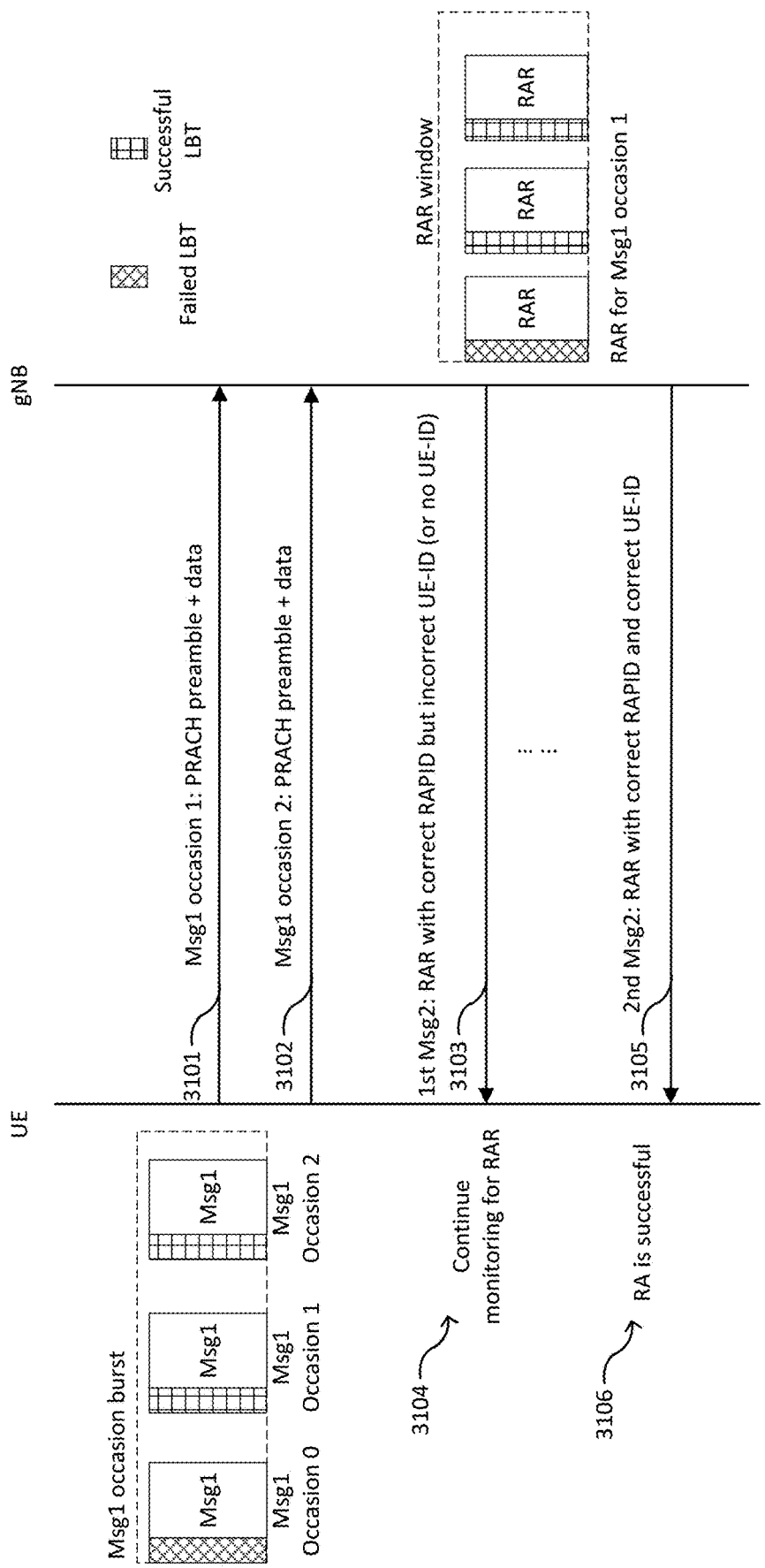
FIG. 31 illustrates yet another exemplary flowchart of the RA process according to one embodiment of the present disclosure.

FIG. 31 illustrates yet another exemplary flowchart of the RA process according to one embodiment of the present disclosure. The embodiment shown in FIG. 31 is for illustration only. Other embodiments could be used without departing from the scope of the present disclosure.

The embodiment illustrated in FIG. 31 shows a reception by a UE of an incorrect UE-ID in a first Msg2/RAR 3103, due to either a decoding error for the data part of Msg1 at a gNB or a preamble collision with another UE; and a correct reception of a second Msg2 3105 corresponding to an Msg1 transmission on Msg1 occasion 2, wherein the UE continues to monitor RAR window after it receives the first Msg2 3104.

Figure 32:
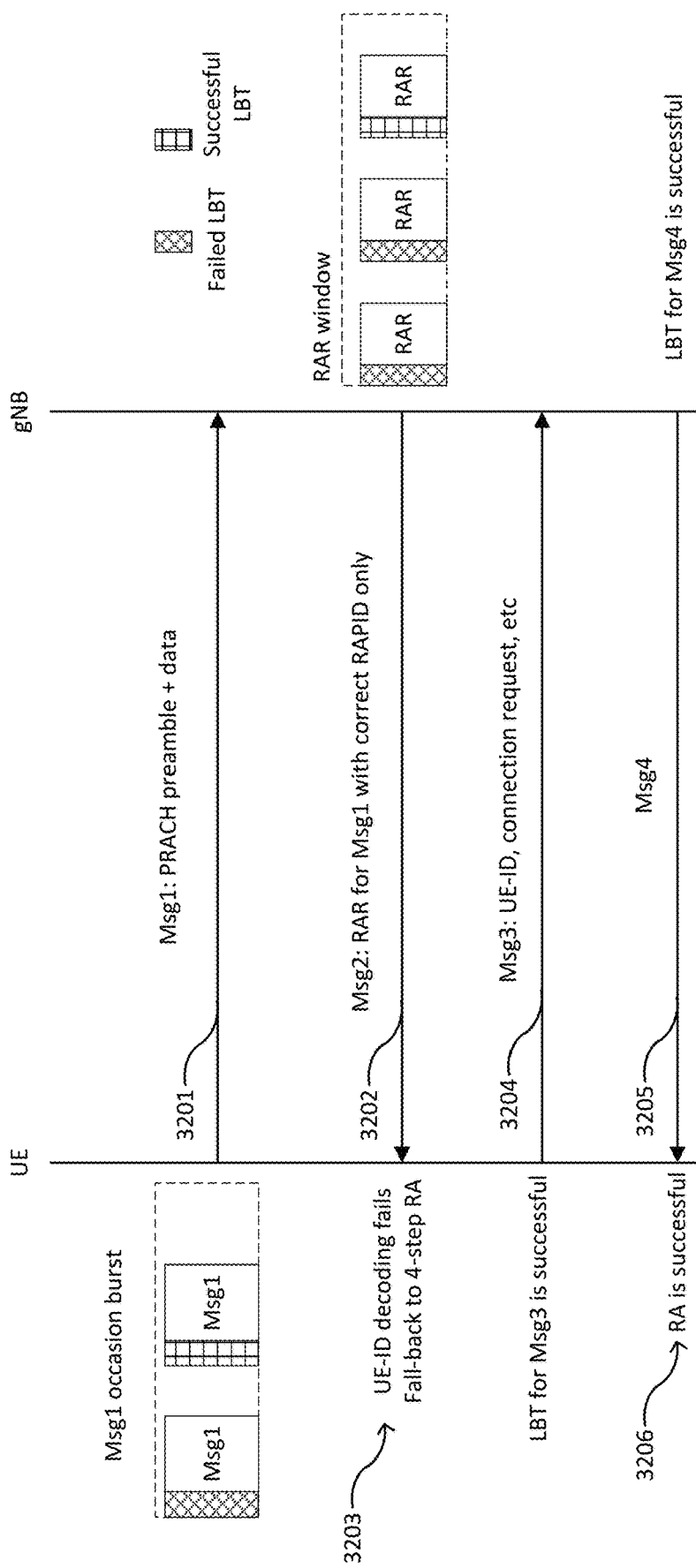
FIG. 32 illustrates yet another exemplary flowchart for the 2-step RA process according to one embodiment of the present disclosure.

FIG. 32 illustrates yet another exemplary flowchart for the 2-step RA process according to one embodiment of the present disclosure. The embodiment shown in FIG. 32 is for illustration only. Other embodiments could be used without departing from the scope of the present disclosure.

As another sub-example of the RA process illustrated in FIG. 29, the UE can fall back to a 4-step RA procedure and transmit (subject to LBT) the UE-ID in Msg3, i.e., UE action 4.

Figure 33:
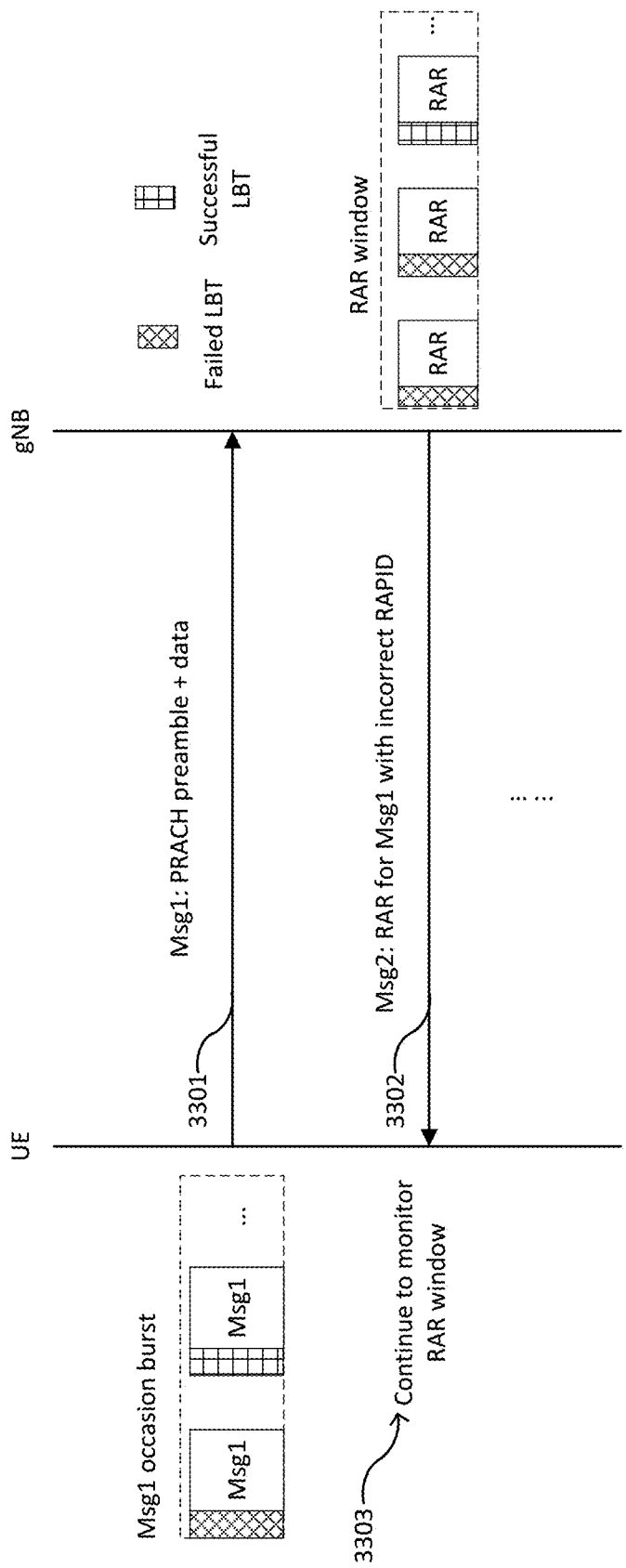
FIG. 33 illustrates yet another exemplary flowchart for the 2-step RA process according to one embodiment of the present disclosure.

FIG. 33 illustrates yet another exemplary flowchart for the 2-step RA process according to one embodiment of the present disclosure. The embodiment shown in FIG. 33 is for illustration only. Other embodiments could be used without departing from the scope of the present disclosure.

In the example, a UE receives a RAR message with an incorrect RAPID. This can occur when the RAR message is intended to other UEs. FIG. 33 illustrates the case when UE receives a RAR message with an incorrect RAPID 3302.

In one sub-example, the UE can continue to monitor the RAR window for a RAR message reception, until either the UE receives a RAR that corresponds to the correct RAPID or the end of the RAR window is reached, i.e., UE action 3. When the end of RAR window is reached, the UE behavior can be as when the UE does not receive a RAR message within the RAR.

Figure 34:
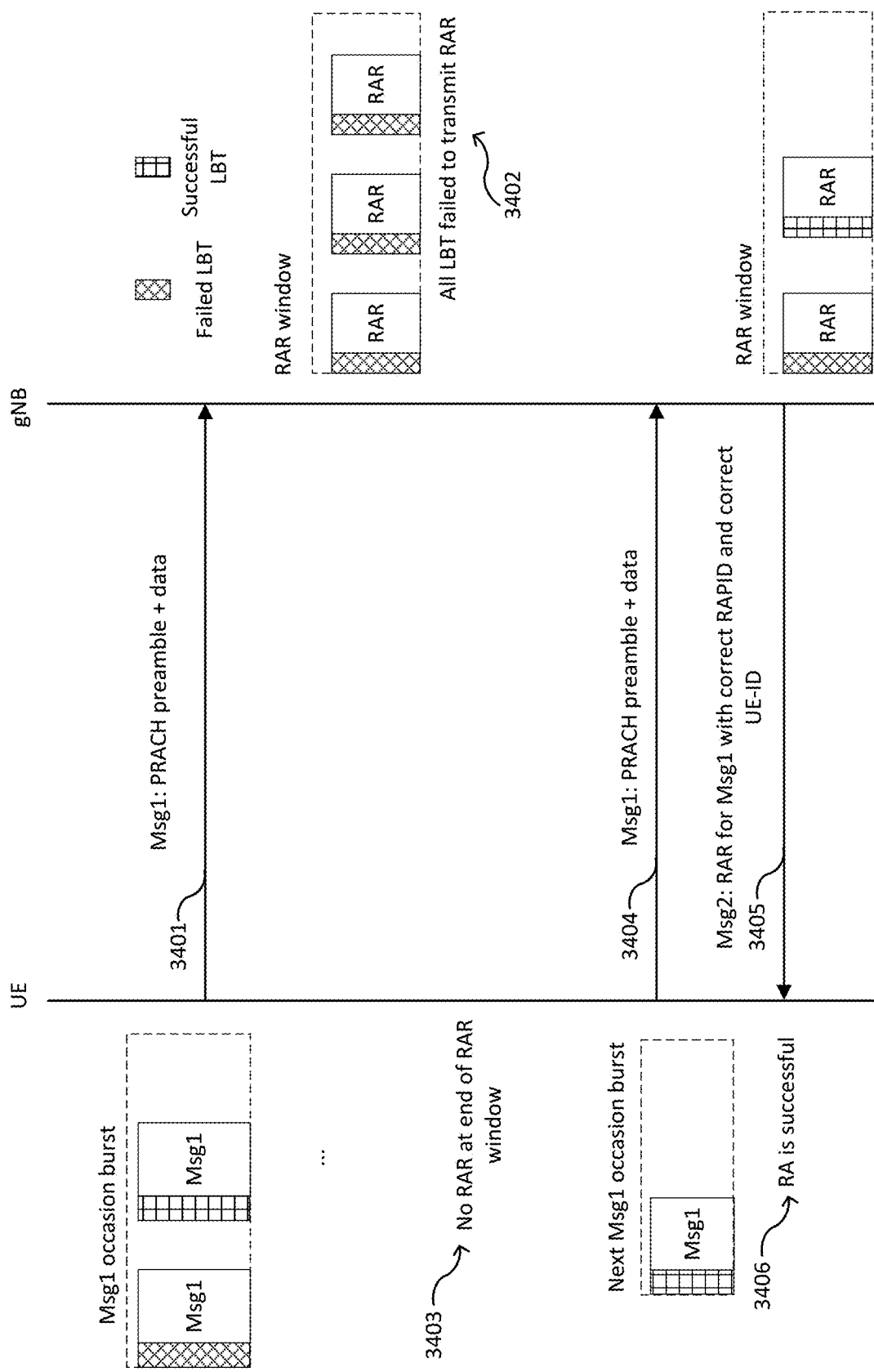
FIG. 34 illustrates an exemplary flowchart for 2-step RA process where UE does not receive a RAR message within the RAR window.

FIG. 34 illustrates an exemplary flowchart for 2-step RA process where UE does not receive a RAR message within the RAR window, according to one embodiment of the present disclosure. The embodiment shown in FIG. 34 is for illustration only. Other embodiments could be used without departing from the scope of the present disclosure.

In one embodiment, UE does not receive a RAR message within the RAR window 3402. This can occur when a gNB does not detect an Msg1 from the UE, for example due to beam misalignment, or when all RAR occasions failed LBT and the gNB did not transmit any RAR 3402.

In one sub-example, If UE only monitors a single RAR window, or UE monitors multiple RAR windows for the Msg1 occasion burst but the end of last monitored RAR window is reached, the 2-step RA for a respective Msg1 or Msg1 occasion burst fails; and the UE can again apply a 2-step RA at the next available Msg1 occasion burst 3404, i.e., UE action 5. FIG. 34 illustrates a successful RA process in a next Msg1 occasion 3405-3406.

In another sub-example, If UE monitors multiple RAR windows for the Msg1 occasion burst, and the end of one of its monitored RAR windows except for the last monitored RAR window is reached, the UE continues to monitor the remaining RAR window(s) until a RAR message is detected, i.e., UE action 6; otherwise it will follow the first sub-example of this example, i.e., UE action 5.

In another example, for a 4-step RA procedure, the following UE behaviors can apply after the UE transmits Msg1 and monitors a respective RAR window for a RAR message reception.

In one example, the UE receives a RAR message with correct RAPID.

Figure 35:
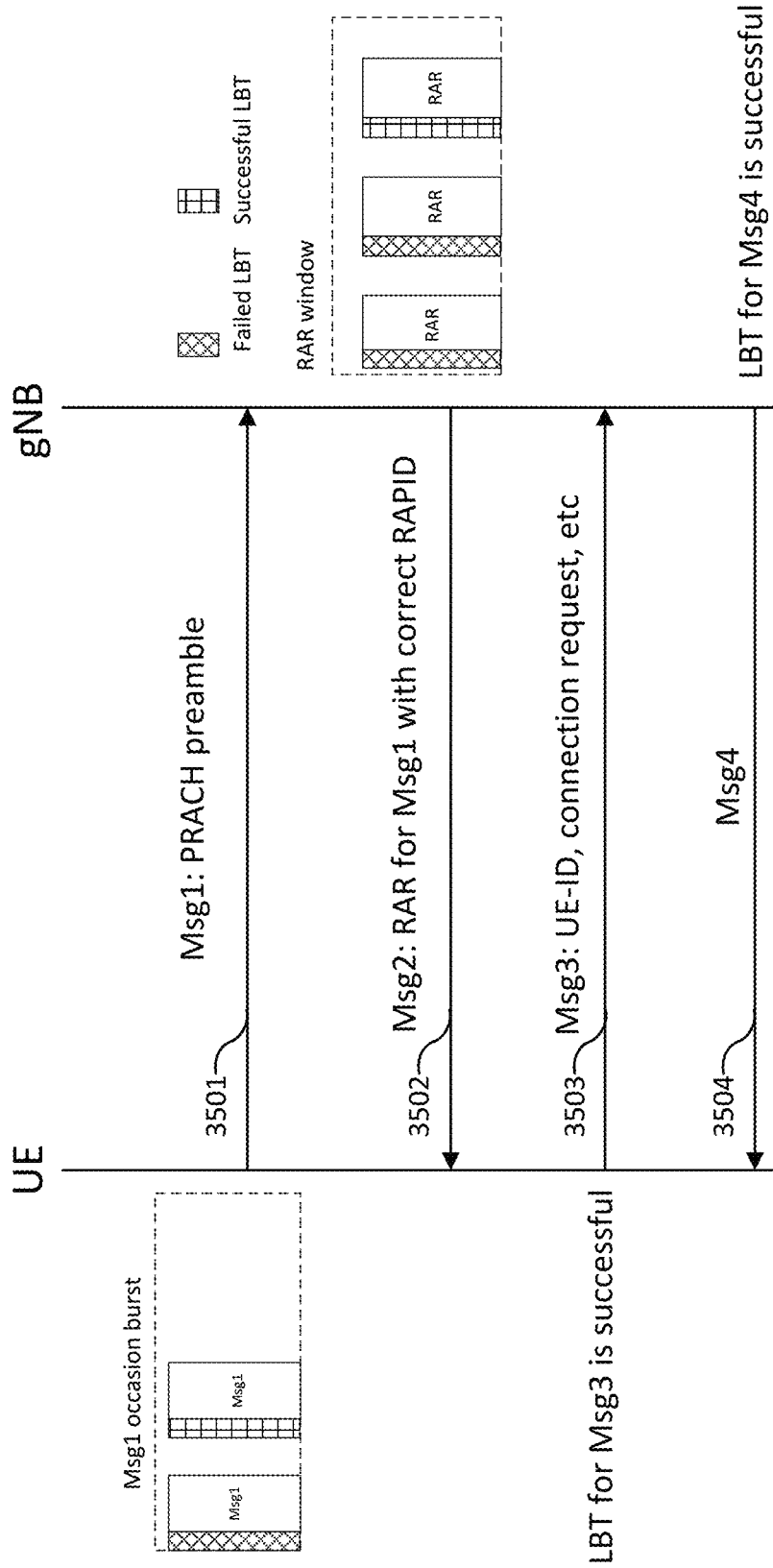
FIG. 35 illustrates a flowchart for 4-step RA procedure according to one embodiment of the present disclosure.

FIG. 35 illustrates a flowchart for 4-step RA procedure according to one embodiment of the present disclosure. In the embodiment, the UE receives a RAR message with correct RAPID 3502 for 4-step RA. Then, as the RAR message is intended for the UE, the UE can transmit Msg3 subject to LBT 3503 as illustrated in FIG. 35.

In one example, the UE receives a RAR message with incorrect RAPID.

Figure 36:
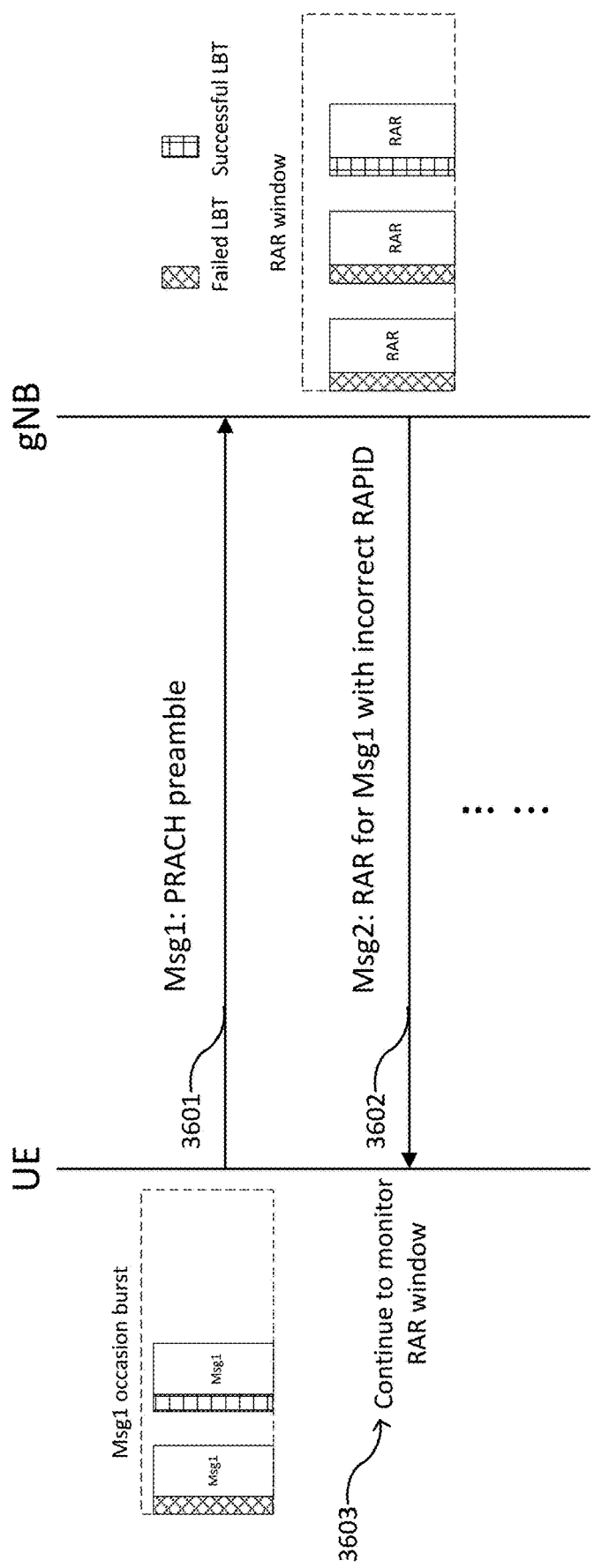
FIG. 36 illustrates another flowchart for 4-step RA procedure according to one embodiment of the present disclosure.

FIG. 36 illustrates another flowchart for 4-step RA procedure according to one embodiment of the present disclosure. In the embodiment, the UE receives a RAR message with incorrect RAPID 3602 for the 4-step RA. This can occur when the RAR message is intended to another UE. The UE continues to monitor the RAR window 3603 until either the UE receives a RAR that includes the correct RAPID or the end of the RAR window is reached. When the end of RAR window is reached without the UE receiving the RAR that corresponds to the correct RAPID, the UE behavior can be as in the case where the UE does not receive a RAR message within the RAR window.

In one example, a UE does not receive a RAR message within the RAR window.

Figure 37:
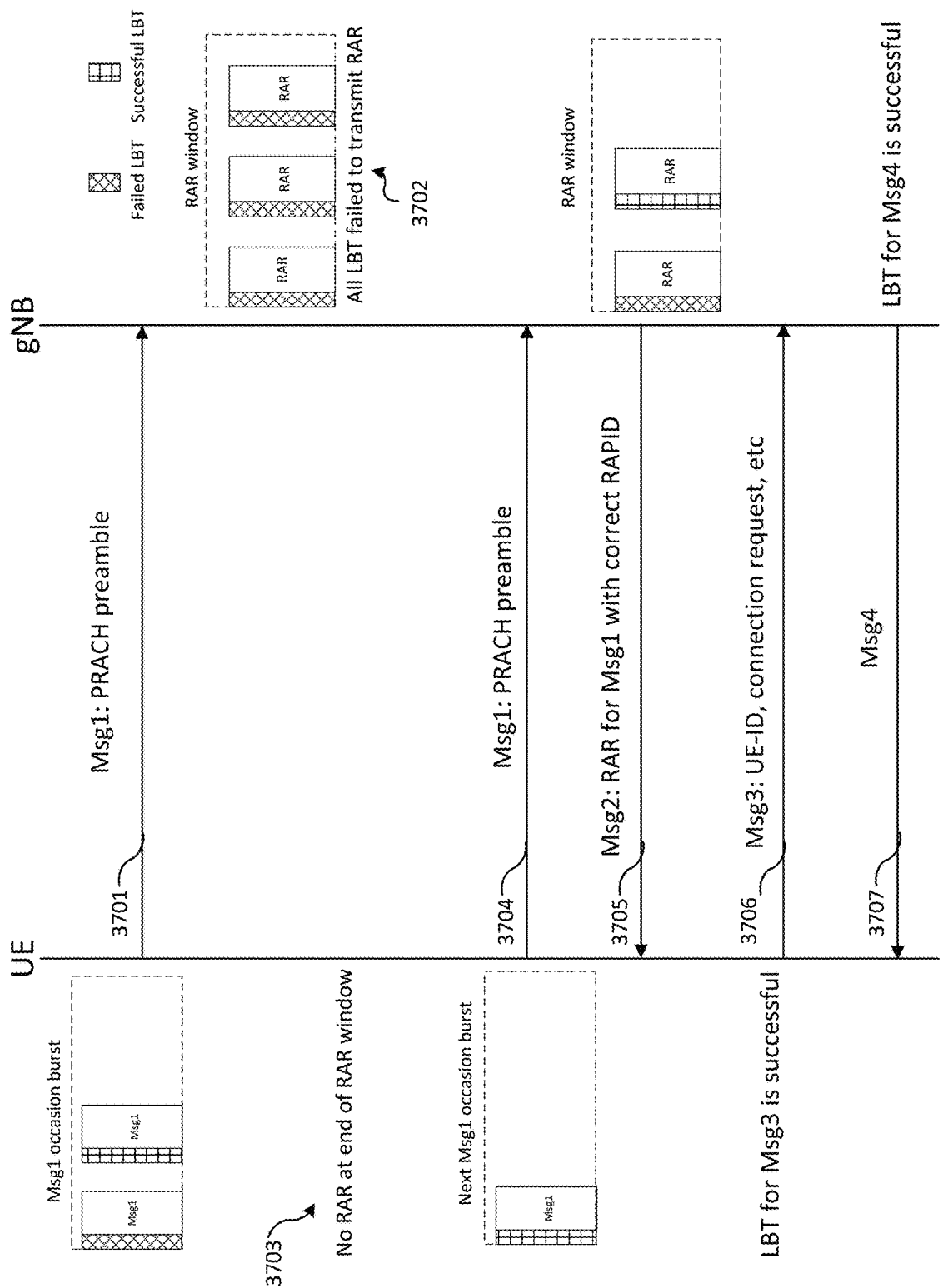
FIG. 37 illustrates yet another flowchart for 4-step RA procedure according to one embodiment of the present disclosure.

FIG. 37 illustrates yet another flowchart for 4-step RA procedure according to one embodiment of the present disclosure. In particular, FIG. 37 illustrates a failure by a UE to receive any RAR corresponding to the Msg1 in a first Msg1 occasion burst 3701. This can occur when a gNB does not detect a Msg1 from the UE, for example due to beam misalignment, or when the gNB fails LBT in all RAR occasions and does not transmit any RAR 3702, or when the UE fails to detect a RAR from the gNB. Then, the 4-step RA for a current Msg1 occasion burst fails, and the UE can again apply a 4-step RA in a next available Msg1 occasion burst 3704. FIG. 37 further illustrates that the UE receives a RAR with a correct RAPID 3705 corresponding to a next Msg1 occasion 3704.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE) in a wireless communication network, the UE comprising:
 a processor configured to:
  generate a random access (RA) message comprising:
   a preamble portion including one or more repeated preambles constructed using a same sequence, and a cyclic prefix (CP) that precedes repeated preamble sequences; and
   a data portion including one or more data segments with each data segment including a number of repeated data symbols and a CP that precedes the repeated data symbols, wherein a UE identity (UE-ID) is included in the data portion; and
  perform a listen-before-talk (LBT) operation for the RA message in an unlicensed spectrum; and
 a transceiver operably connected to the processor, the transceiver configured to:
  transmit, subject to a result of the LBT operation, the RA message in the unlicensed spectrum to a base station (BS); and
  receive a responded random access (Re-RA) message in response to the transmitted RA message within a random access response (RAR) window,
 wherein a first portion of the Re-RA message is carried by a physical downlink control channel (PDCCH) with a cyclic redundancy check (CRC) scrambled with a two-step random access radio network temporary identifier (RA2-RNTI) of the UE, and a second portion of the Re-RA message is carried by a physical downlink shared channel (PDSCH) scheduled by the PDCCH, and
 wherein the RA2-RNTI of the UE is determined based on a radio resource used to transmit a preamble of the RA message, the radio resource including a time domain resource, a frequency domain resource, and a carrier index.

2. The UE of claim 1, wherein:
 the preamble portion of the RA message includes one of 1, 2, 4, 6 and 12 repeated preamble sequences,
 each data segment in the data portion of the RA message includes one of 1, 2, 4, 6 and 12 repeated data symbols,
 a set of OFDM symbols are reserved prior to a configured starting time of the RA message in the unlicensed spectrum, and the set of OFDM symbols is one of:
- a predefined set of OFDM symbols when the LBT operation is performed with a fixed sensing duration;
- a predefined set of OFDM symbols when the LBT operation is performed with a configurable sensing duration and a contention window size is one of adaptable and non-adaptable; and
- a configurable set of OFDM symbols when the LBT operation is performed with a configurable sensing duration and the contention window size is one of adaptable and non-adaptable.

3. The UE of claim 1, wherein the preamble portion of the RA message and the data portion of the RA message are multiplexed in one of:
- a frequency domain with sharing a same time domain resource allocation;
- a time domain with no gap between the preamble portion and the data portion, with sharing a same frequency domain resource allocation; or
- a combination of the time domain and the frequency domain, wherein the preamble portion and the data portion do not share the same time domain resource and the frequency domain resource.

4. The UE of claim 1, wherein:
the transceiver is further configured with a RA message occasion burst that includes one or more RA message occasions in a time domain; and
only a first RA message of the one or more RA message occasions within the RA message occasion burst is transmitted if the LBT operation is successful, or each of the one or more of RA messages within the RA message occasion burst is transmitted if a respective LBT operation is successful, and
the LBT operation is successful if a result of the LBT operation associated with a RA message allows the RA message to be transmitted.

5. The UE of claim 1, wherein the processor is further configured to:
perform the LBT operation on an entire bandwidth to be searched;
when the LBT operation on the entire bandwidth is failed, segment the entire bandwidth into multiple sub-bandwidths and perform LBT operations on each of the multiple sub-bandwidths; and
when none of the LBT operations on each of the multiple sub-bandwidths is successful, repeat segmenting each of the sub-bandwidths into multiple next-level sub-bandwidths and re-performing the LBT operations on each of the multiple next-level sub-bandwidths, until at least one of the LBT operations on at least one sub-bandwidth is successful.

6. The UE of claim 1, wherein the processor is further configured to determine that a random access procedure is successful if:
the Re-RA message in response to the transmitted RA message is received within the RAR window; and
the Re-RA message includes:
- an indication for a physical random access channel (PRACH) preamble sequence included in the preamble portion of the RA message;
- an identity for the UE that is the same as a UE-identifier (ID) included in the data portion of the RA message; and
- an indication for a radio resource that was included one of the preamble portion of the RA message, and both of the preamble portion and the data portion of the RA message.

7. The UE of claim 1, wherein the RA2-RNTI of the UE is further determined based on at least one of:
- a radio resource used to transmit the data portion of the RA message;
- a PRACH preamble sequence included in the preamble portion of the RA message; and
- at least a part of a UE-identification (ID) carried in the data portion of the RA message.

8. The UE of claim 1, wherein the processor is further configured to cause the transceiver to monitor a single RAR window after a first RA message is transmitted within a RA message occasion window or individual RAR windows corresponding to each of one or more RA messages transmitted within the RA message occasion window.

9. The UE of claim 8, wherein the processor is configured to:
suspend decoding operations if a Re-RA message is detected; or
continue to perform the decoding operations until a Re-RA message is detected that corresponds to a successful random access procedure, or includes an indication for a radio resource and a PRACH preamble sequence that were included in a preamble portion of a first RA message within an RA message occasion burst,
wherein the decoding operations for the Re-RA message are suspended if all of RAR windows for the decoding operations for a Re-RA message are complete.

10. The UE of claim 9, wherein:
if the Re-RA message includes the indication for the radio resource and the PRACH preamble sequence that were included in the preamble portion of the RA message and the random access procedure is determined not to be successful,
the processor is further configured to:
transmit in a third message including the UE-ID included the data portion of the RA message if an LBT operation associated with the third message allows the third message to be transmitted, and
perform decoding operations for a fourth message including the UE-ID that is included in the third message, and
the random access procedure is successful if an identity of the UE included in the fourth message is same as the identity of the UE included in the third message.

11. A base station (BS) comprising:
a transceiver configured to receive a random access (RA) message in an unlicensed spectrum from a user equipment (UE), the RA message comprising:
- a preamble portion including one or more repeated preambles constructed using a same sequence, and
- a data portion including one or more data segments with each data segment including a number of repeated data symbols, wherein a UE identity (UE-ID) is included in the data portion; and
a processor operably connected to the transceiver, the processor configured to control the transceiver to transmit a responded random access (Re-RA) message in response to the RA message within a random access response (RAR) window,
wherein transmission of the Re-RA message in the unlicensed spectrum is subject to a result of a listen-before-talk (LBT) operation in the unlicensed spectrum,
wherein the Re-RA message in response to the RA message is transmitted within the RAR window,
wherein a first portion of the Re-RA message is carried by a physical downlink control channel (PDCCH) with a cyclic redundancy check (CRC) scrambled with a two-step random access radio network temporary identifier (RA2-RNTI) of the UE, and a second portion of the Re-RA message is carried by a physical downlink shared channel (PDSCH) scheduled by the PDCCH, and wherein the RA2-RNTI of the UE in the first portion of the Re-RA message is determined based on a radio resource used to transmit a preamble of the RA message, the radio resource including a time domain resource, a frequency domain resource, and a carrier index.

12. The BS of claim 11, wherein:
the processor is further configured to configure a format of the RA message,
the configuration of the format of the RA message comprises:
a configuration of the preamble portion of the RA message, wherein the preamble portion includes one of 1, 2, 4, 6 and 12 repeated preamble sequences, and a cyclic prefix (CP) duration that precedes the repeated preamble sequences; and
a configuration of the data portion of the RA message, wherein the data portion includes a number of data segments, and each data segment in the data portion of the RA message includes one of 1, 2, 4, 6 and 12 repeated data symbols, and a CP duration that precedes the repeated data symbols; and
a set of OFDM symbols are reserved prior to a configured starting time of the RA message in the unlicensed spectrum, and
the set of OFDM symbols is one of:
a predefined set of OFDM symbols when the LBT operation is performed with a fixed sensing duration;
a predefined set of OFDM symbols when the LBT operation is performed with a configurable sensing duration and a contention window size is one of adaptable and non-adaptable; or
a configurable set of OFDM symbols when the LBT operation is performed with a configurable sensing duration and the contention window size is one of adaptable and non-adaptable.

13. The BS of claim 11, wherein:
the processor is further configured to configure a multiplexing pattern of the preamble portion of the RA message, and
the data portion of the RA message in one of:
a frequency domain with sharing a same time domain resource allocation;
a time domain with no gap between the preamble portion and the data portion, with sharing a same frequency domain resource allocation; or
a combination of the time domain and the frequency domain, wherein the preamble portion and the data portion do not share the same time domain resource and the frequency domain resource.

14. The BS of claim 11, wherein the processor is further configured to configure a RA message occasion burst that includes:
one or more RA message occasions in a time domain; and
only a first RA message of the one or more RA message occasions within the RA message occasion burst is transmitted if the LBT operation is successful, or each of the one or more RA messages within the RA message occasion burst is transmitted if a respective LBT operation is successful, and the LBT operation is successful if a result of the LBT operation associated with a message allows the message to be transmitted.

15. The BS of claim 11, wherein the RA2-RNTI of the UE in the first portion of the Re-RA message is further determined based on at least one of:
a radio resource used to transmit the data portion of the RA message;
a PRACH preamble sequence included in the preamble portion of the RA message; and
at least a part of a UE-identification (ID) carried in the data portion of the RA message.

16. The BS of claim 11, wherein the second portion of the Re-RA message includes at least one of:
a temporary cell radio network temporary identifier (TC-RNTI) for the UE;
a random access preamble ID that uniquely identifies a root sequence and cyclic shift of a preamble sequence of the received RA message;
at least a part of a UE-identification (ID) carried in the data portion of the received RA message;
a timing advanced command;
an uplink grant for the UE; and
a backoff indicator.

17. The BS of claim 11, wherein the LBT operation for transmission of each Re-RA message is performed with one of:
a fixed sensing duration,
a configurable sensing duration and an adaptable contention window size, or
a configurable sensing duration and non-adaptable contention window size.

18. The BS of claim 11, wherein:
the processor is further configured to configure a maximum number of Re-RA message occasions in response to the RA messages received from a RA message occasion window,
the maximum number of Re-RA message occasions are one of pre-defined or configurable, and
the BS configured to one of:
transmit multiple Re-RA messages within the respective RAR window of the Re-RA message, subject to the result of LBT operation for each Re-RA message, and the maximum number of Re-RA message occasions, or
transmit up to one Re-RA message within the RAR window, subject to the result of the LBT operation for the Re-RA message.

19. A method for operating a user equipment (UE) in a wireless communication network, the method comprising:
generating a random access (RA) message comprising:
a preamble portion including one or more repeated preambles constructed using a same sequence; and
a data portion including one or more data segments with each data segment including a number of repeated data symbols, wherein a UE identity (UE-ID) is included in the data portion; and
performing a listen-before-talk (LBT) operation for the RA message in an unlicensed spectrum;
when a result of the LBT operation for the RA message allows, transmitting the RA message in the unlicensed spectrum to a base station (BS); and
receiving a responded random access (Re-RA) message in response to the transmitted RA message within a random access response (RAR) window,
wherein a first portion of the Re-RA message is carried by a physical downlink control channel (PDCCH) with a cyclic redundancy check (CRC) scrambled with a two-step random access radio network temporary identifier (RA2-RNTI) of the UE, and a second portion of the Re-RA message is carried by a physical downlink shared channel (PDSCH) scheduled by the PDCCH, and wherein the RA2-RNTI of the UE is determined based on a radio resource used to transmit a preamble of the RA message, the radio resource including a time domain resource, a frequency domain resource, and a carrier index.

\* \* \* \* \*